US012117158B2

(12) United States Patent
Wald et al.

(10) Patent No.: US 12,117,158 B2
(45) Date of Patent: Oct. 15, 2024

(54) ENHANCED LIGHTING

(71) Applicant: Wangs Alliance Corporation, Port Washington, NY (US)

(72) Inventors: Shelley S. Wald, Austin, TX (US); Wai Ho Choy, Mineola, NY (US); Derrick A. Wald, Austin, TX (US); Changyong Li, Dongguan (CN)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/675,942

(22) Filed: May 28, 2024

(65) Prior Publication Data

US 2024/0310024 A1 Sep. 19, 2024

Related U.S. Application Data

(63) Continuation-in-part of application No. 18/443,623, filed on Feb. 16, 2024, which is a continuation of application No. 18/136,494, filed on Apr. 19, 2023, now Pat. No. 11,906,153, which is a continuation of application No. 17/737,921, filed on May 5, 2022, now Pat. No. 11,913,634.

(60) Provisional application No. 63/468,848, filed on May 25, 2023, provisional application No. 63/326,368, filed on Apr. 1, 2022, provisional application No. 63/193,238, filed on May 26, 2021, provisional application No. 63/184,309, filed on May 5, 2021.

(51) Int. Cl.
*F21V 5/00* (2018.01)
*F21Y 115/10* (2016.01)

(52) U.S. Cl.
CPC .......... *F21V 5/002* (2013.01); *F21Y 2115/10* (2016.08)

(58) Field of Classification Search
CPC ................................ F21V 5/002; F21L 15/02
See application file for complete search history.

(56) References Cited

U.S. PATENT DOCUMENTS 6,327,091 B1 * 12/2001 Agano ................ G02B 5/0226 359/452
9,618,680 B2 * 4/2017 Baker ................. G02B 5/0242
(Continued)

OTHER PUBLICATIONS

"Pictures of Dionia Light Fixture," first sold about Jan. 13, 2017.
(Continued)

*Primary Examiner* — Christopher E Dunay
(74) *Attorney, Agent, or Firm* — Weiss & Arons LLP

(57) ABSTRACT

Apparatus and methods are provided. The apparatus may include a light-emitting diode ("LED") light source having a front and a back. The apparatus may include a light-transmitting body. The light-transmitting body may have a surface. The surface may define a pattern. The light-transmitting body may have light-scattering grains bonded to the surface. The light-transmitting body may be disposed in a position that is in front of the LED light source. It may be that no structure that is configured to maintain the position intervenes between the LED light source and the light-transmitting body. The light-transmitting body may include glass, polymer or any other suitable material. The pattern may be formed in the glass, polymer or other material. The pattern may be molded, blown, grinded, sawn, cut, milled, drilled, applied or of any other approach.

30 Claims, 47 Drawing Sheets

(56) References Cited

U.S. PATENT DOCUMENTS

| | | | | |
|---|---|---|---|---|
| 11,181,251 | B1* | 11/2021 | Chen | F21V 23/002 |
| 2006/0112874 | A1* | 6/2006 | Yokota | H01L 29/1602 257/E29.082 |
| 2016/0146424 | A1* | 5/2016 | Chiu | H10K 50/854 362/311.03 |
| 2017/0175973 | A1* | 6/2017 | Dai | F21V 5/002 |
| 2018/0313985 | A1* | 11/2018 | Ishimori | G02B 5/0278 |
| 2019/0104577 | A1 | 4/2019 | Miller et al. | |
| 2020/0124264 | A1* | 4/2020 | Gong | F21V 29/503 |
| 2020/0142209 | A1* | 5/2020 | Dal Negro | G02B 27/42 |
| 2021/0003768 | A1* | 1/2021 | Sechi | G02B 6/0051 |
| 2021/0009826 | A1* | 1/2021 | Kizaki | G02F 1/133617 |
| 2022/0018992 | A1* | 1/2022 | Oya | C08F 290/12 |
| 2022/0135764 | A1* | 5/2022 | Azuma | G02B 7/02 524/401 |
| 2022/0154366 | A1* | 5/2022 | Edmonds | C23C 16/27 |

OTHER PUBLICATIONS

"Pictures of Enlace Light Fixture," first sold about Sep. 1, 2012.
"Pictures of Fenestri Light Fixture," first sold about Apr. 8, 2013.
"Pictures of RevealED Light Fixture," first sold about Apr. 12, 2011.
"Pictures of Trimini Light Fixture," first sold about Apr. 3, 2017.
Alia Akkam, "Lindsey Adelman Finds Paradise," https://www.architecturaldigest.com/story/lindsey-adelman-finds-paradise, Architectural Digest, Mar. 18, 2021.
Lindsey Adelman Studio on Instagram: "Paradise Chandelier in Brushed and Polished Brass, Clear Glass Colorway and Black Lashing," Mar. 18, 2021.
Photograph, annotated, front perspective view of Kuzco Exterior LED Lamp Wall Sconce EW53808, Kuzco Lighting, May 2019.
Photograph, back perspective view of Kuzco Exterior LED Lamp Wall Sconce EW53808, Kuzco Lighting, May 2019.
Photograph, view of Kuzco Exterior LED Lamp Wall Sconce EW53808, back plate exterior, Kuzco Lighting, May 2019.
Photograph, annotated, partial breakdown view of Kuzco Exterior LED Lamp Wall Sconce EW53808, Kuzco Lighting, May 2019.
Photograph, view of Kuzco Exterior LED Lamp Wall Sconce EW53808, back plate interior, Kuzco Lighting, May 2019.
Photograph, annotated, view of Kuzco Exterior LED Lamp Wall Sconce EW53808, grains, Kuzco Lighting, May 2019.
Photograph, view of Kuzco Exterior LED Lamp Wall Sconce EW53808, sample grains, Kuzco Lighting, May 2019.

* cited by examiner

2400

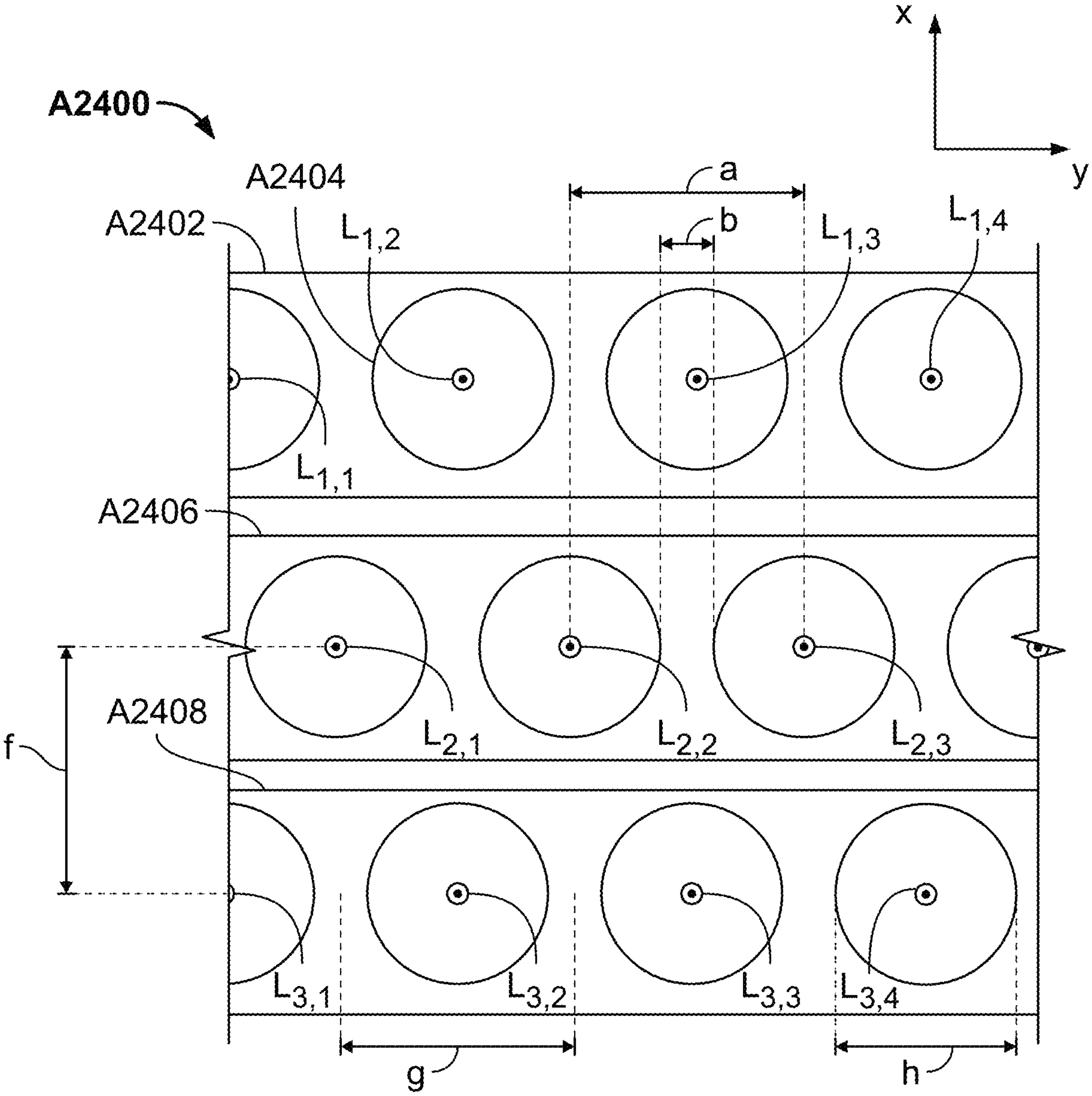
FIG. A24

FIG. A27

ENHANCED LIGHTING

CROSS REFERENCE TO RELATED APPLICATIONS

This application is a continuation in part of U.S. patent application Ser. No. 18/443,623, filed Feb. 16, 2024 which is a continuation of U.S. patent application Ser. No. 18/136,494, filed Apr. 19, 2023, now issued as U.S. Pat. No. 11,906,153 which is a continuation of U.S. patent application Ser. No. 17/737,921, filed May 5, 2022, now issued as U.S. Pat. No. 11,913,634 which is a nonprovisional of U.S. Provisional Applications Nos. 63/184,309, filed May 5, 2021, 63/193,238 filed May 26, 2021, and 63/326,368 filed on Apr. 1, 2022, all of which are hereby incorporated by reference in their entireties. This application is a nonprovisional of Provisional Application No. 63/468,848 filed on May 25, 2023. All of the foregoing applications are hereby incorporated by reference herein in their entireties.

BACKGROUND

Decorative lighting typically relies upon color separation of white light by highly refractive materials. Highly refractive materials may be expensive and may require extensive preparation for use in decorative lighting. Less-refractive materials may be less expensive to acquire and process, but their lack of refractive capability makes them less desirable for lighting.

It would therefore be desirable to provide apparatus and methods for enhanced lighting.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which.

FIG. A24 shows schematically illustrative apparatus in accordance with principles of the invention.

Figure 25:
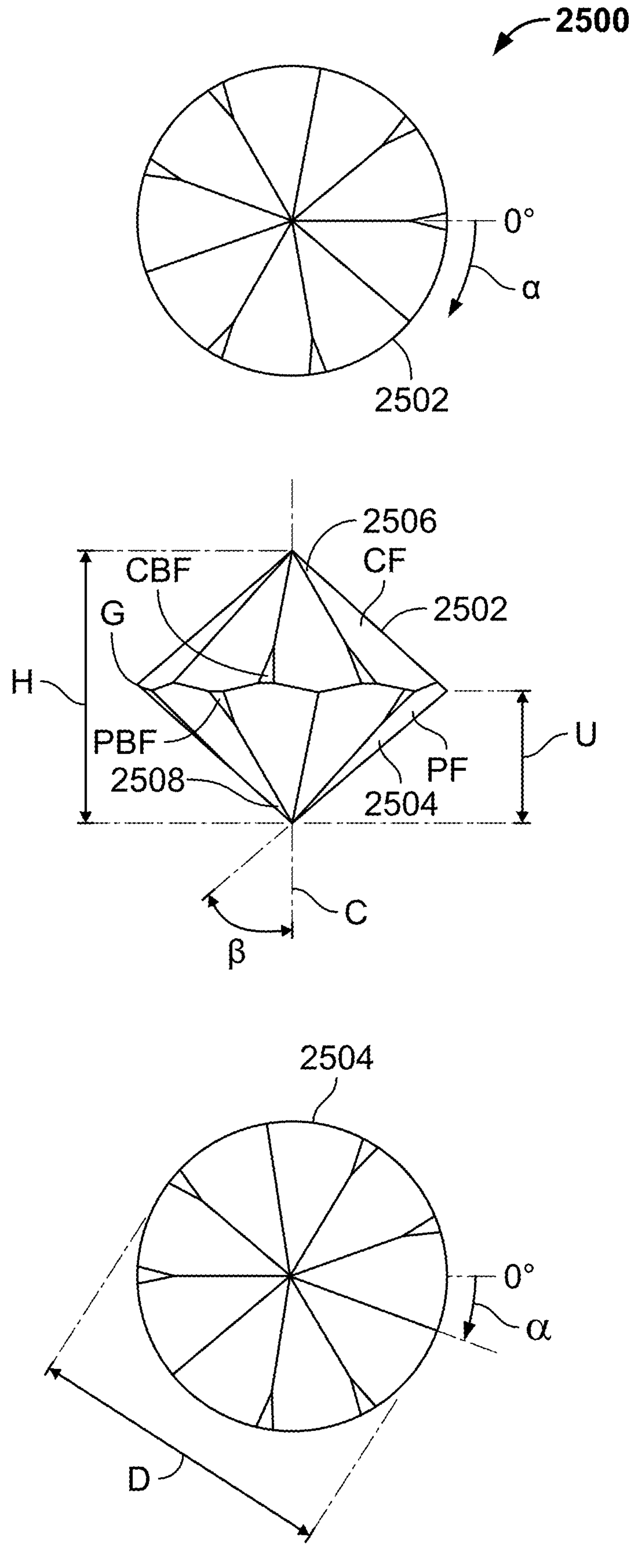

FIG. 25 shows schematically illustrative apparatus in accordance with principles of the invention.

Figure 26:
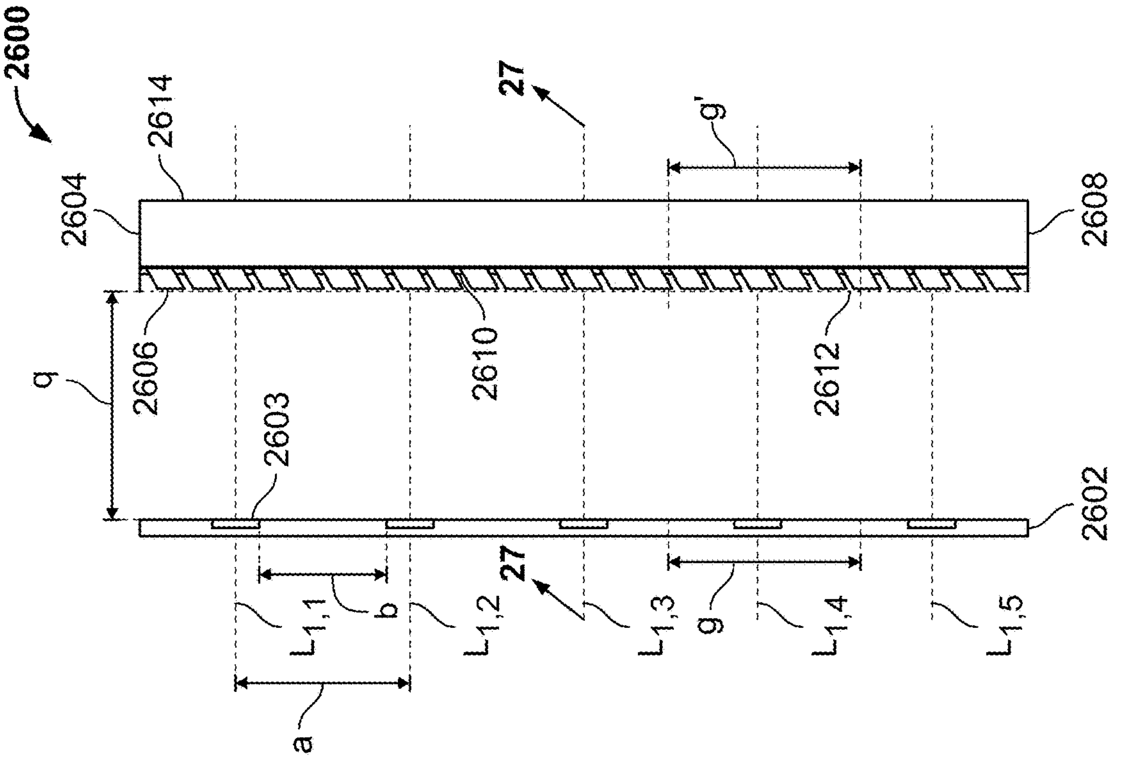

FIG. 26 shows schematically illustrative apparatus in accordance with principles of the invention.

Figure 27:
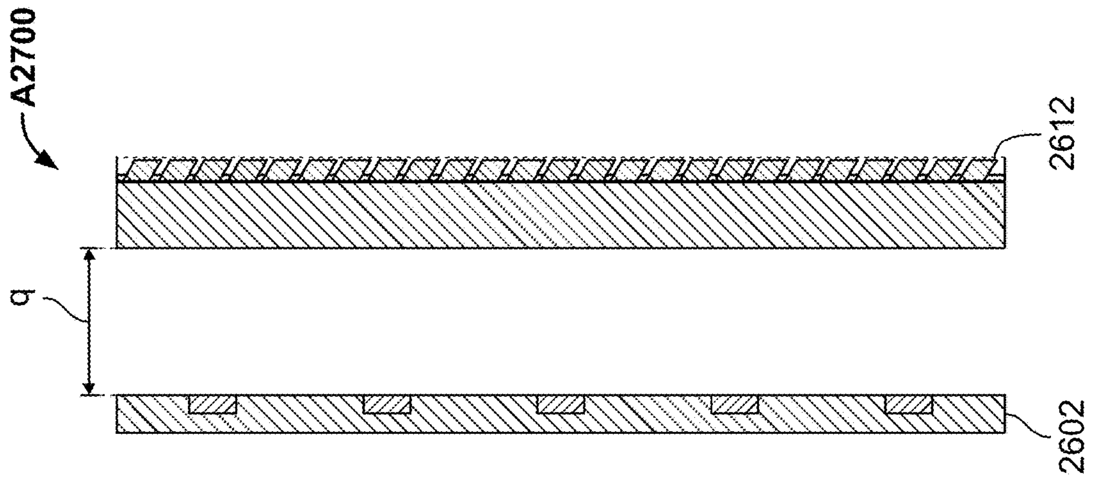
Figure 27:
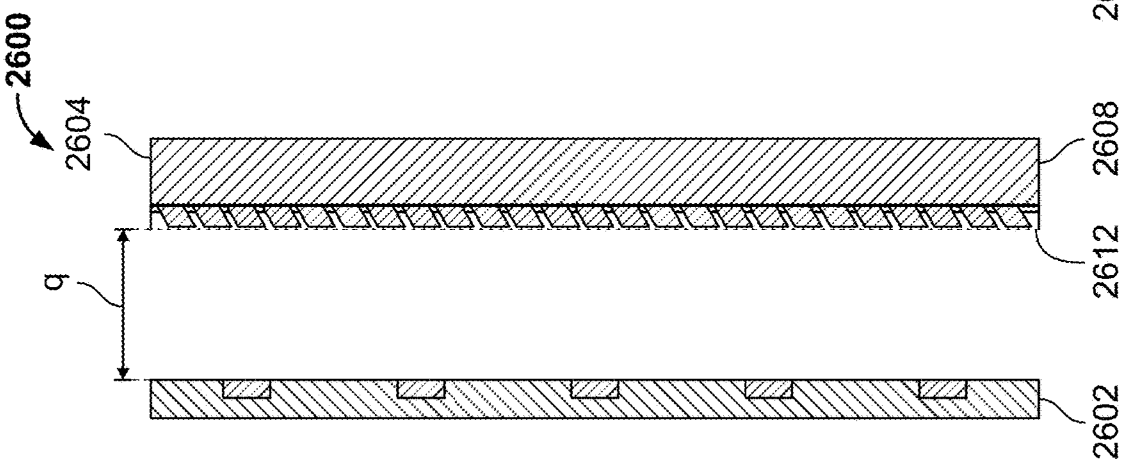

FIG. 27 shows schematically illustrative apparatus in accordance with principles of the invention.

FIG. A27 shows schematically illustrative apparatus in accordance with principles of the invention.

Figure 28:
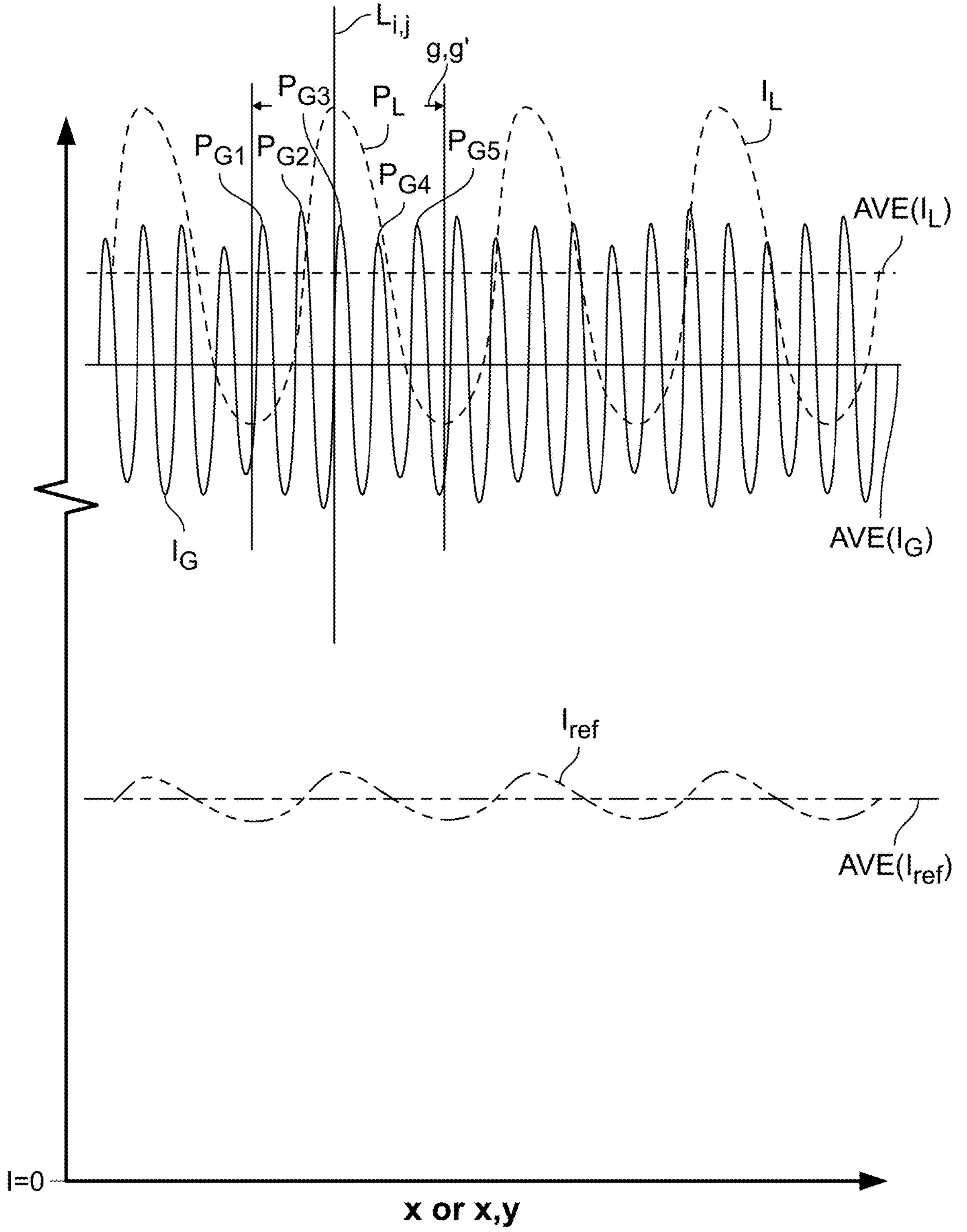

FIG. 28 shows schematically illustrative information in accordance with principles of the invention.

Figure 29:
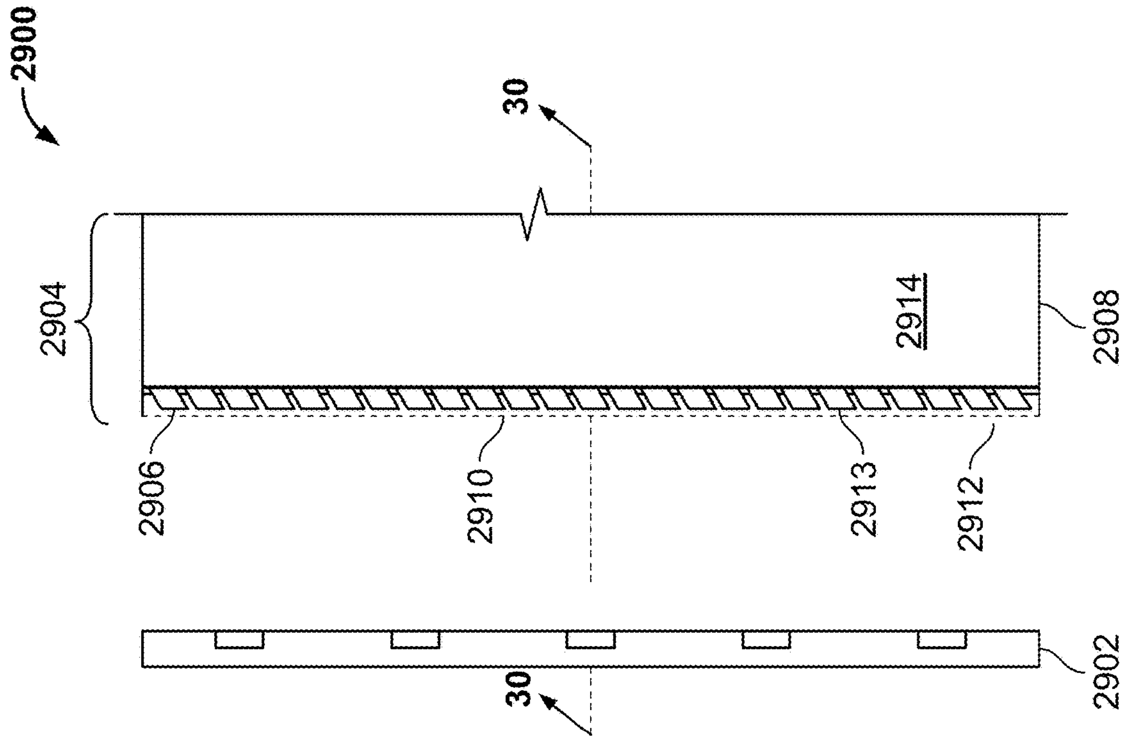

FIG. 29 shows schematically illustrative apparatus in accordance with principles of the invention.

Figure 30:
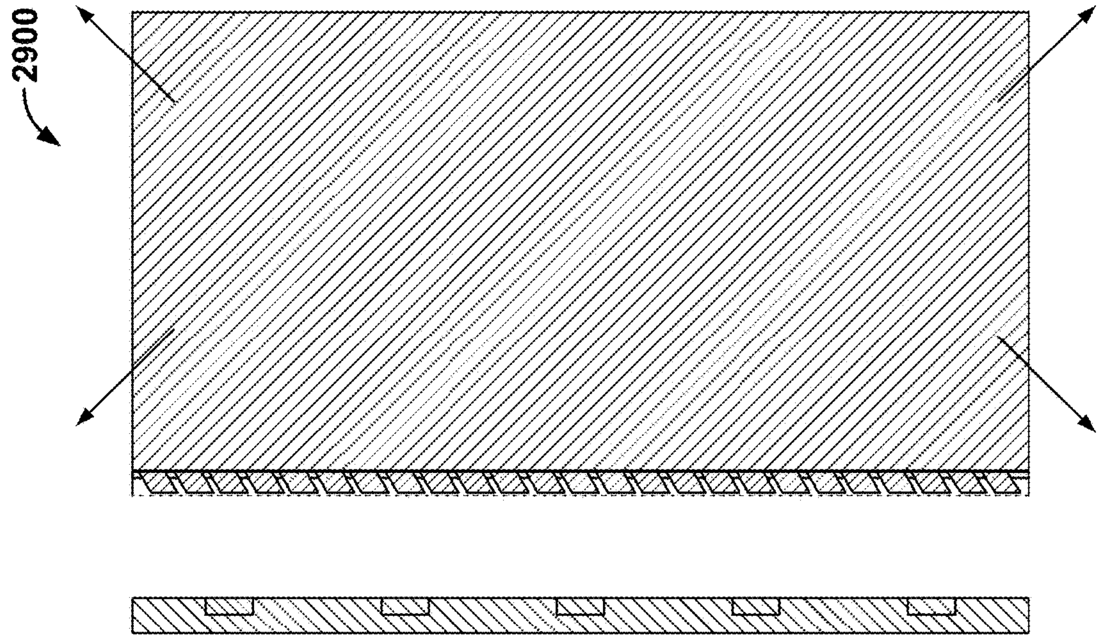

FIG. 30 shows schematically illustrative apparatus in accordance with principles of the invention.

Figure 31:
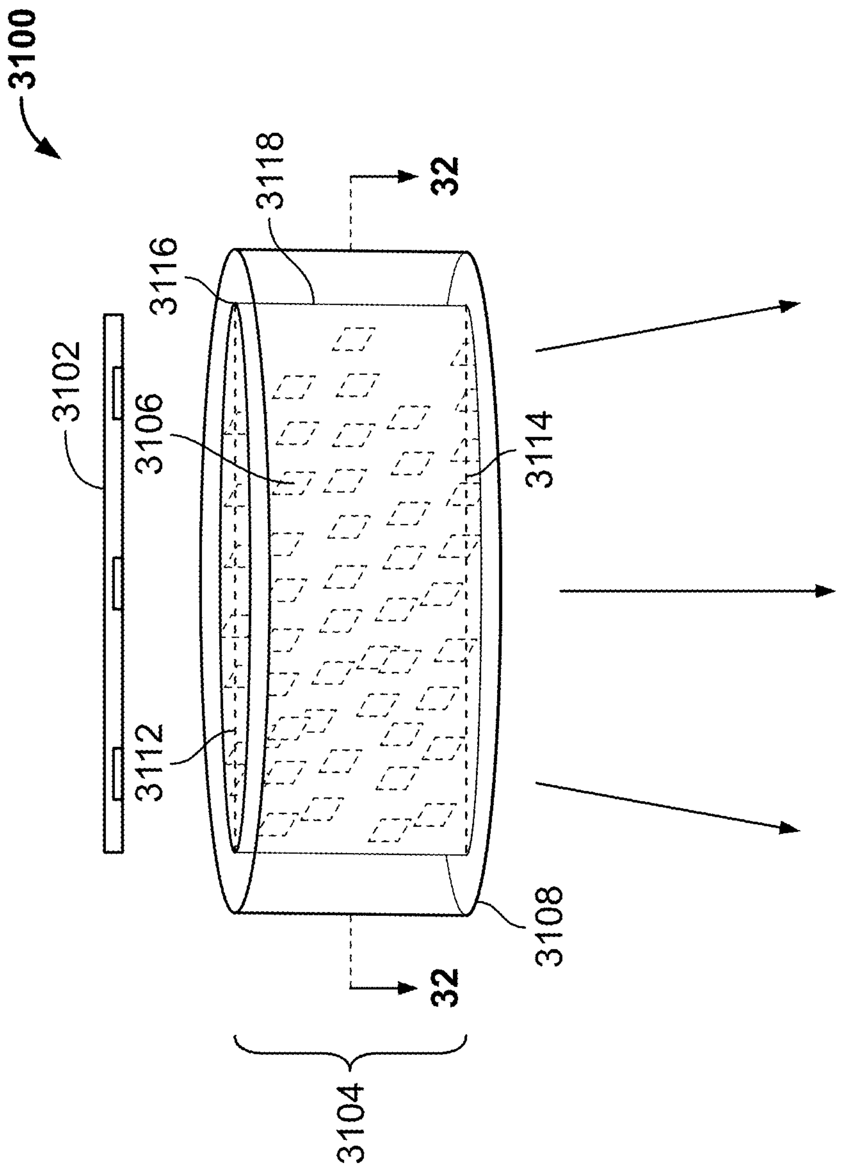

FIG. 31 shows schematically illustrative apparatus in accordance with principles of the invention.

Figure 33:
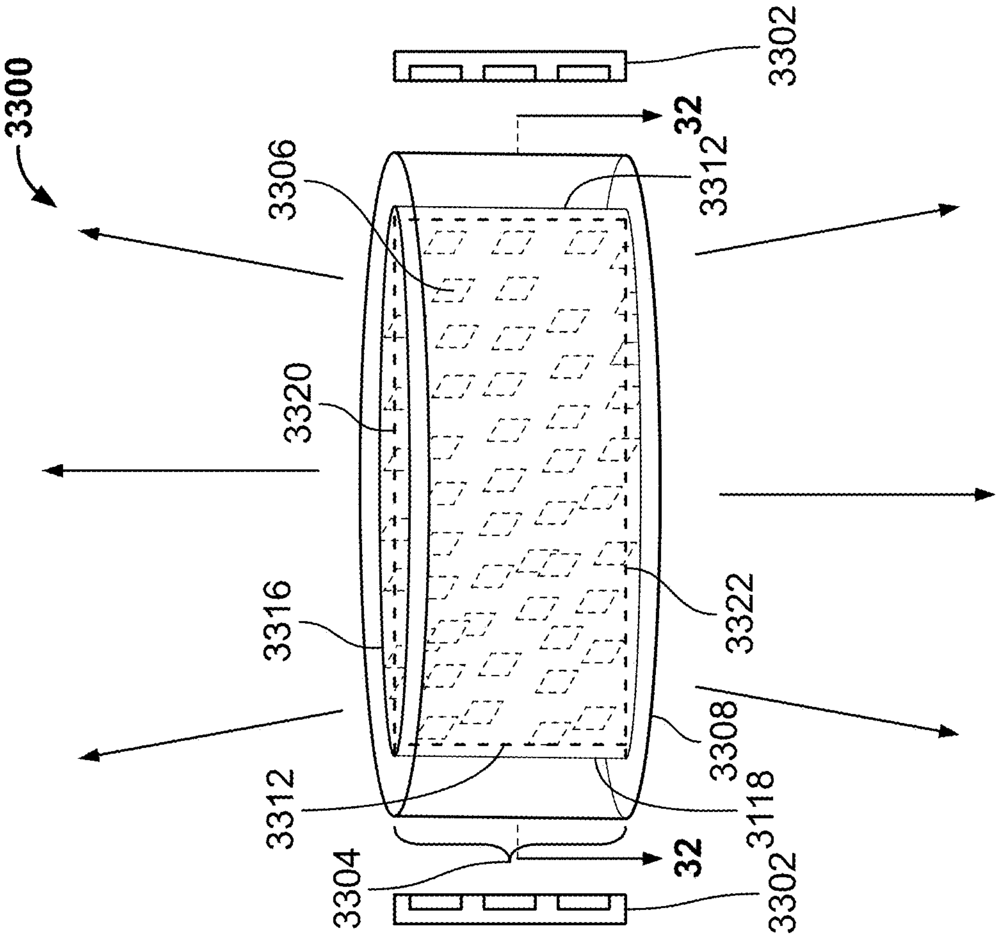
Figure 32:
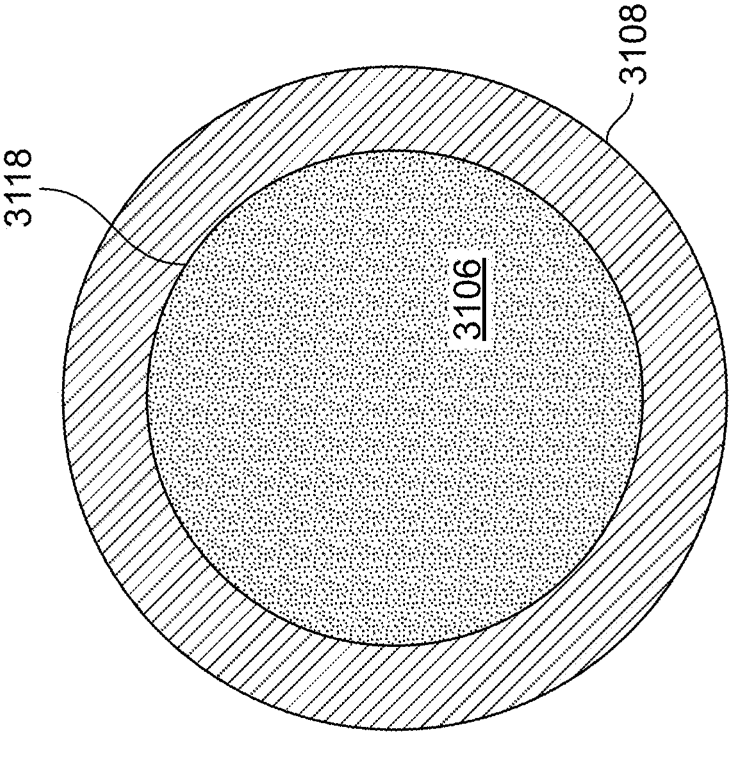

FIG. 32 shows schematically a partial cross-section of apparatus shown in FIGS. 31 and 33 taken along view lines 32-32 (shown in FIGS. 31 and 33, respectively).

FIG. 33 shows schematically illustrative apparatus in accordance with principles of the invention.

Figure 34:
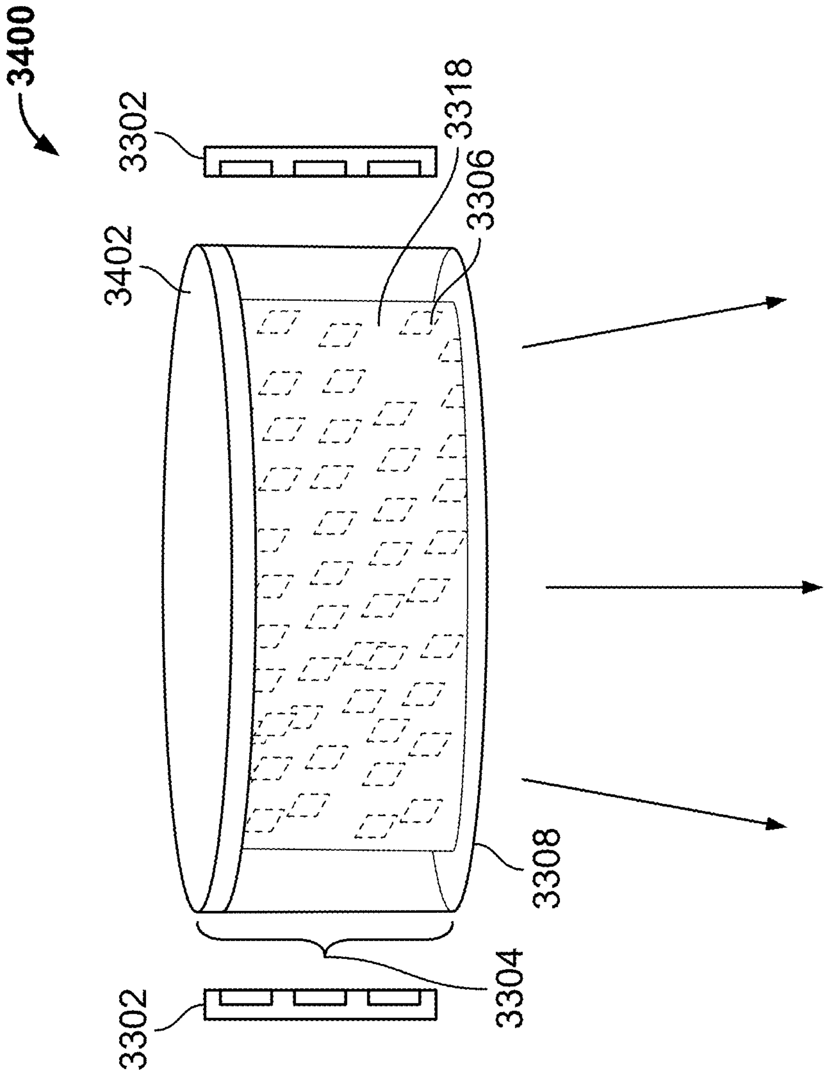

FIG. 34 shows schematically illustrative apparatus in accordance with principles of the invention.

Figure 35:
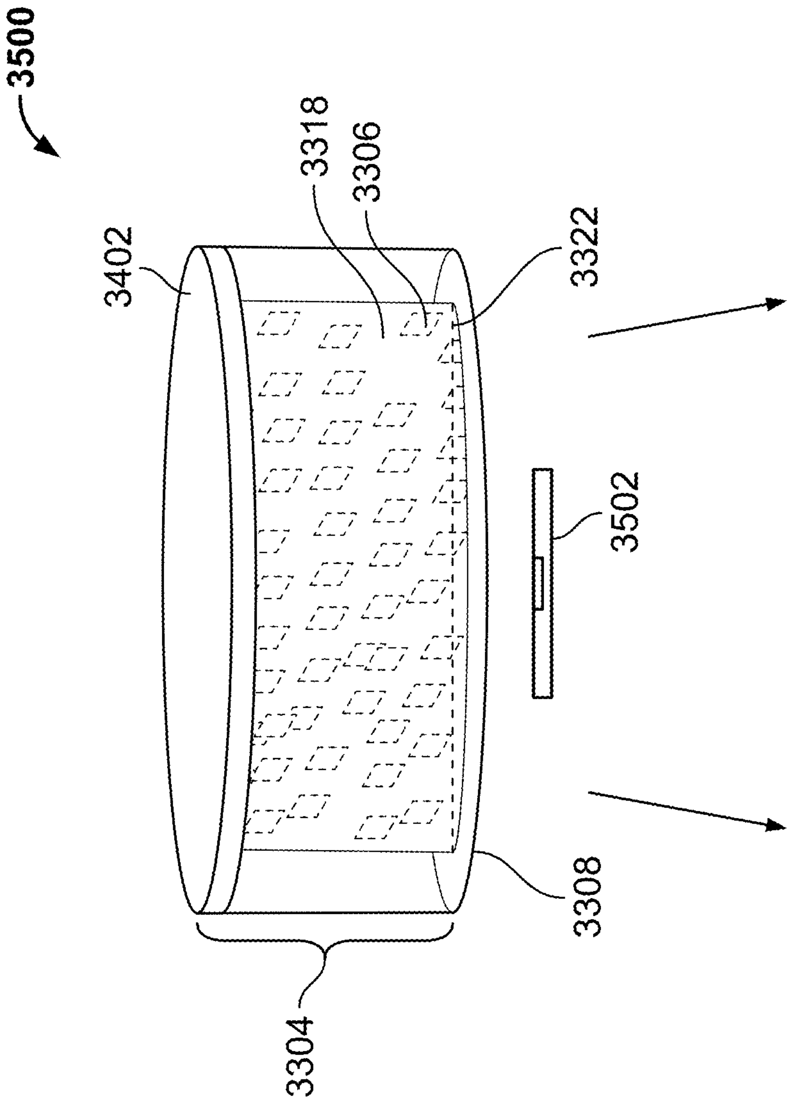

FIG. 35 shows schematically illustrative apparatus in accordance with principles of the invention.

Figure 36:
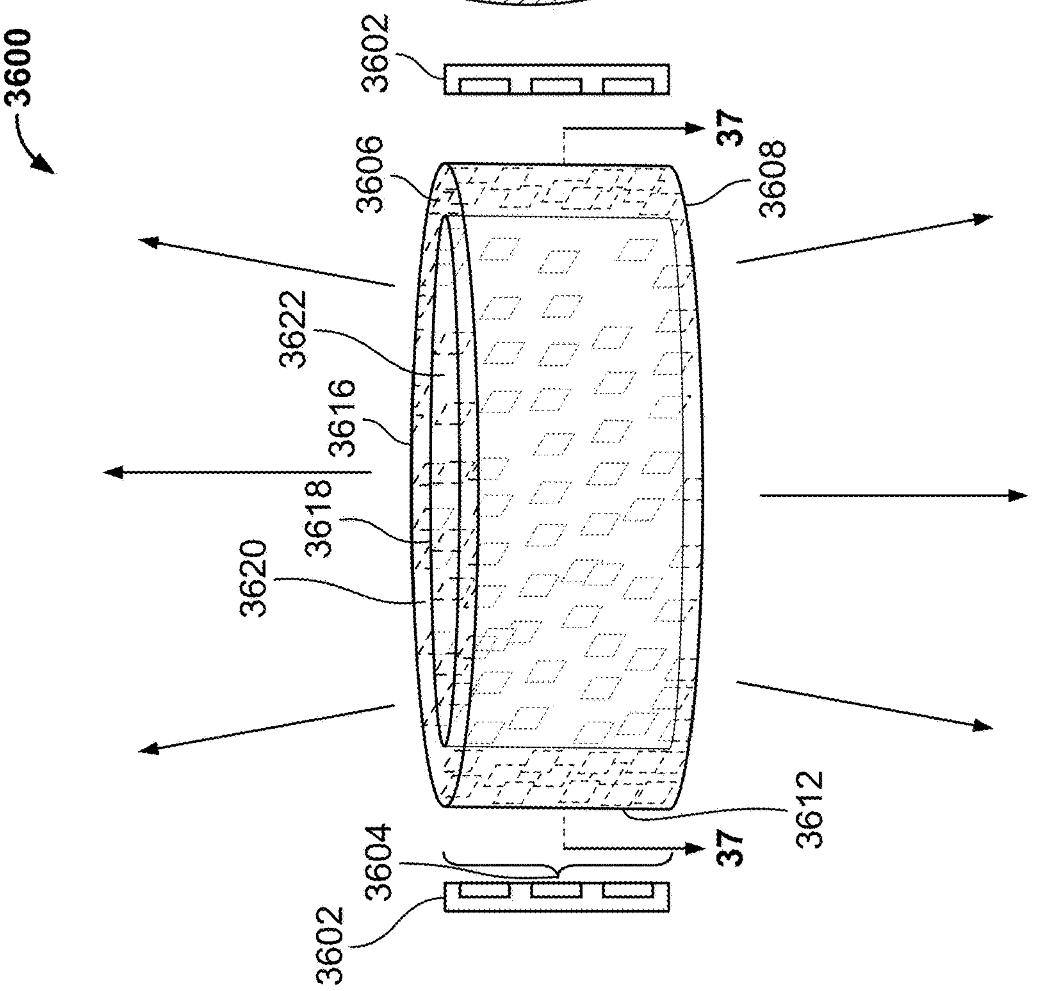

FIG. 36 shows schematically illustrative apparatus in accordance with principles of the invention.

Figure 37:
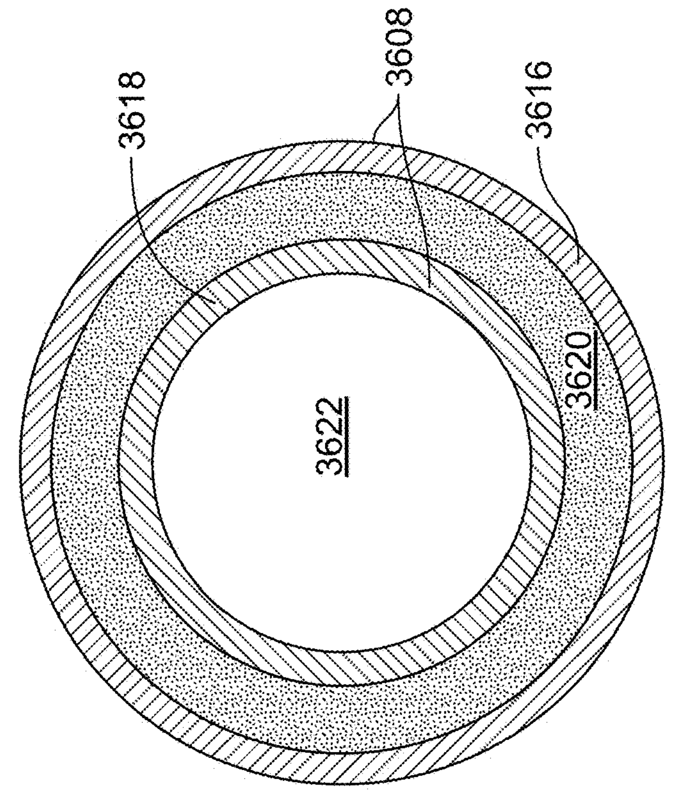
Figure 38:
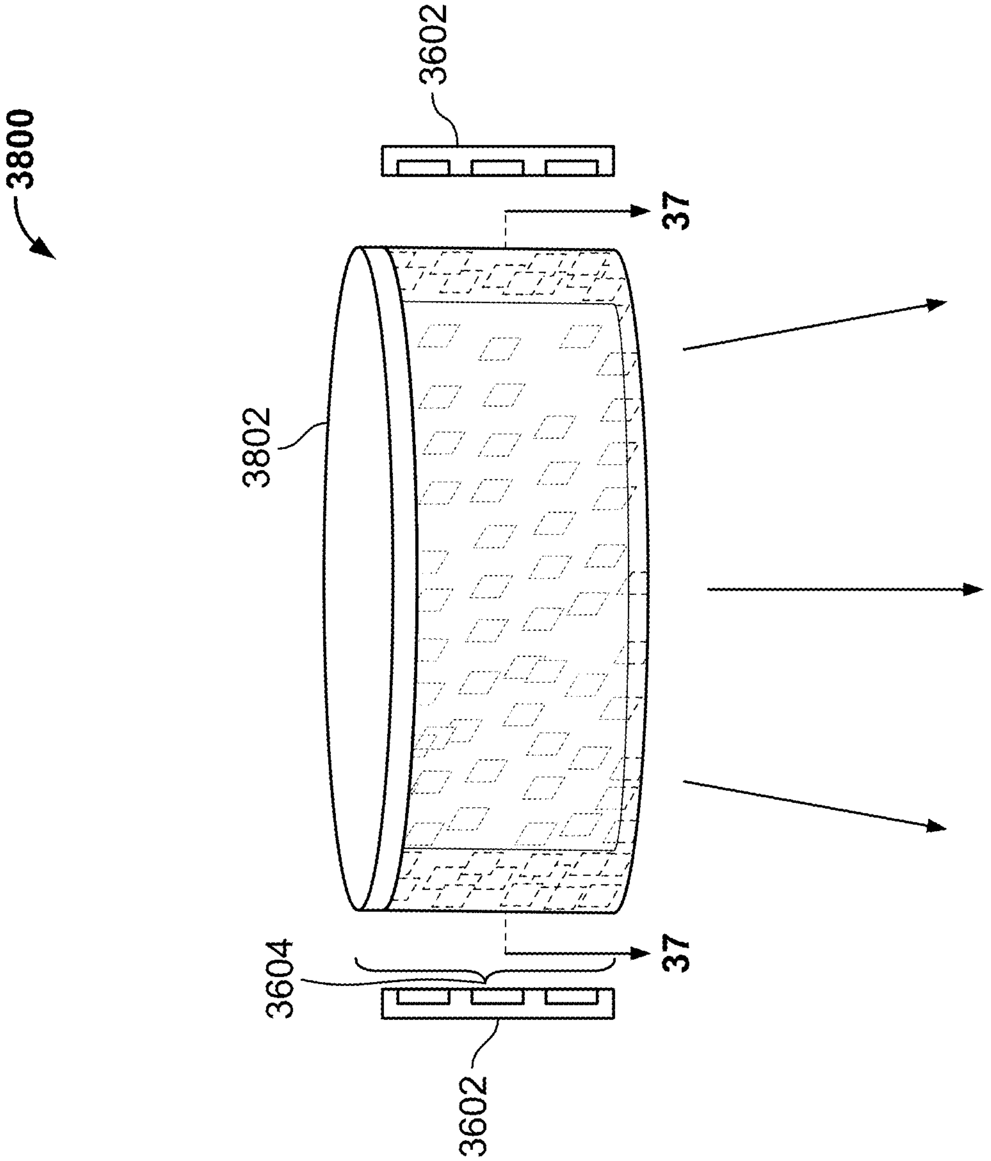

FIG. 37 shows schematically a partial cross-section of apparatus shown in FIGS. 36 and 38 taken along view lines 37-37 (shown in FIGS. 36 and 38, respectively).

FIG. 38 shows schematically illustrative apparatus in accordance with principles of the invention.

Figure 39:
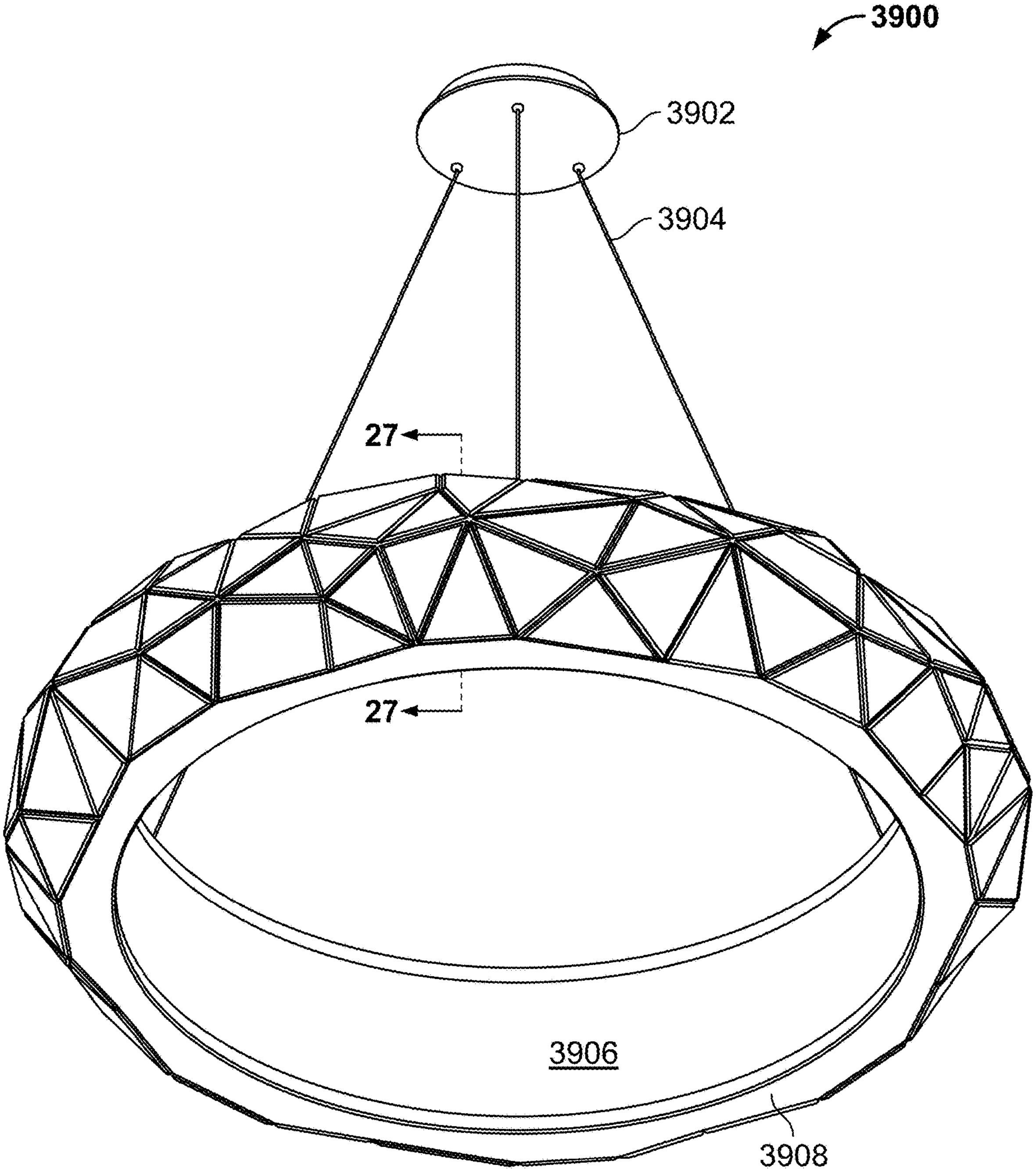

FIG. 39 shows schematically illustrative apparatus in accordance with principles of the invention.

Figure 40:
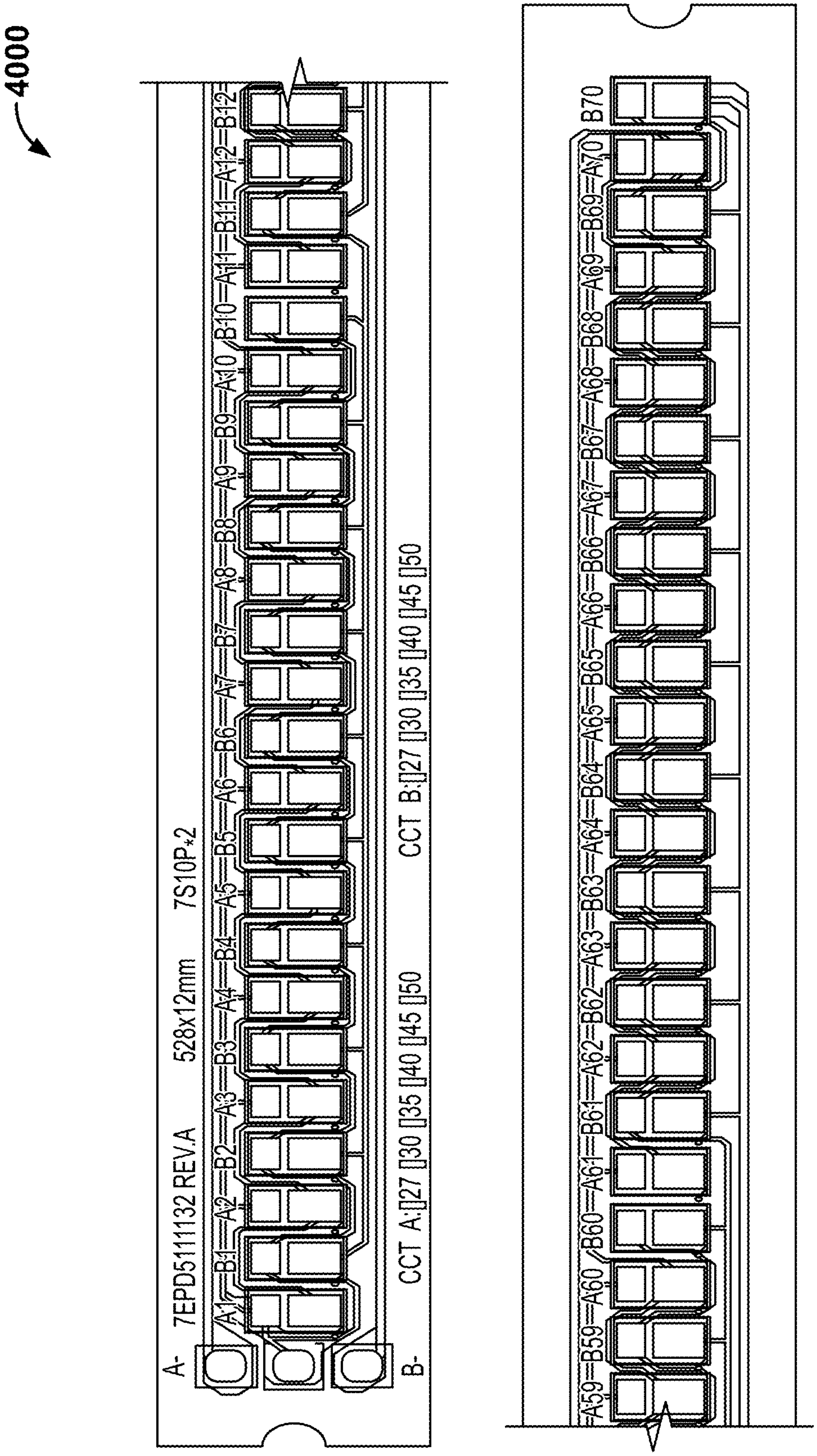

FIG. 40 shows schematically illustrative apparatus in accordance with principles of the invention.

Figure 41:
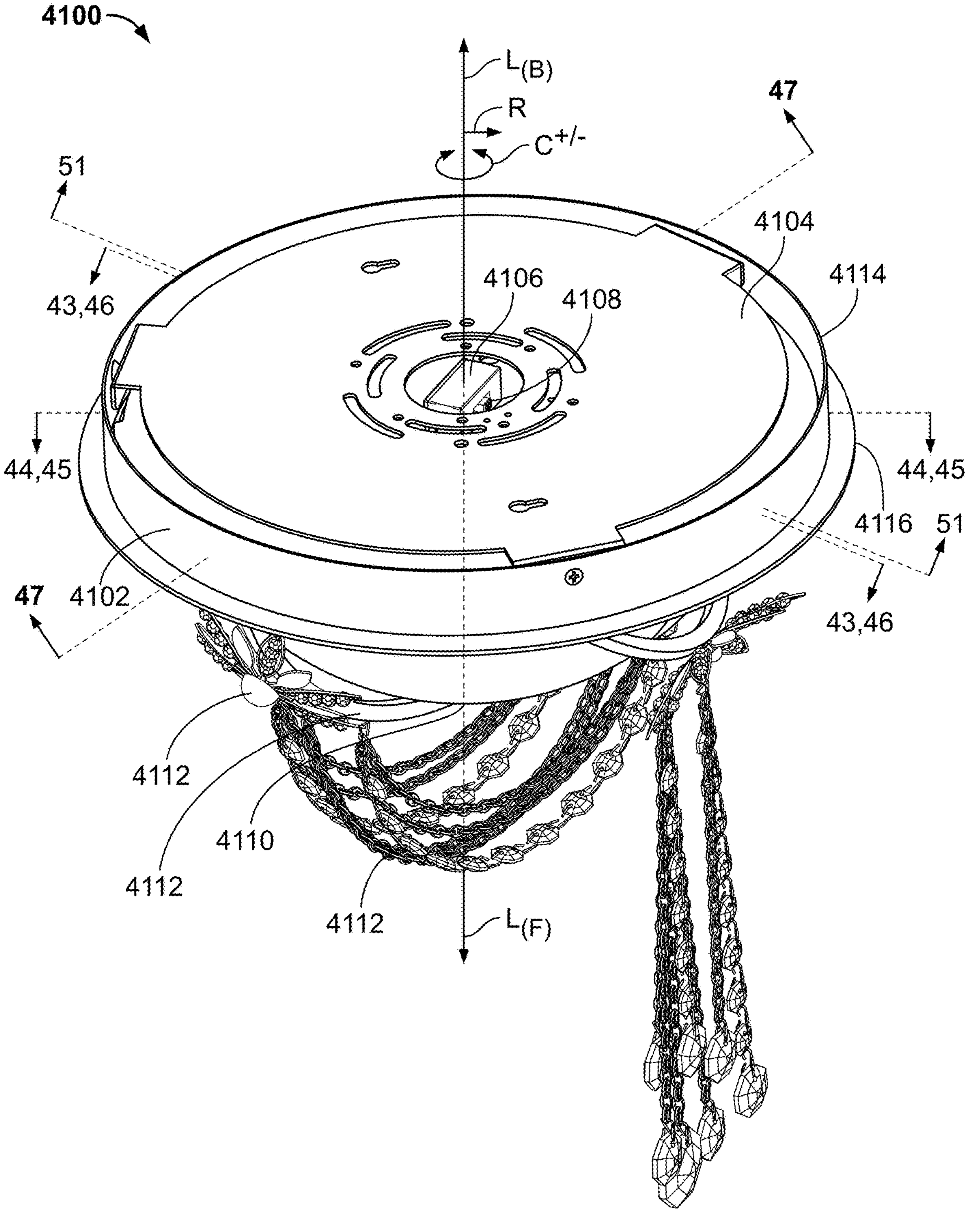

FIG. 41 shows illustrative apparatus in accordance with principles of the invention.

Figure 42:
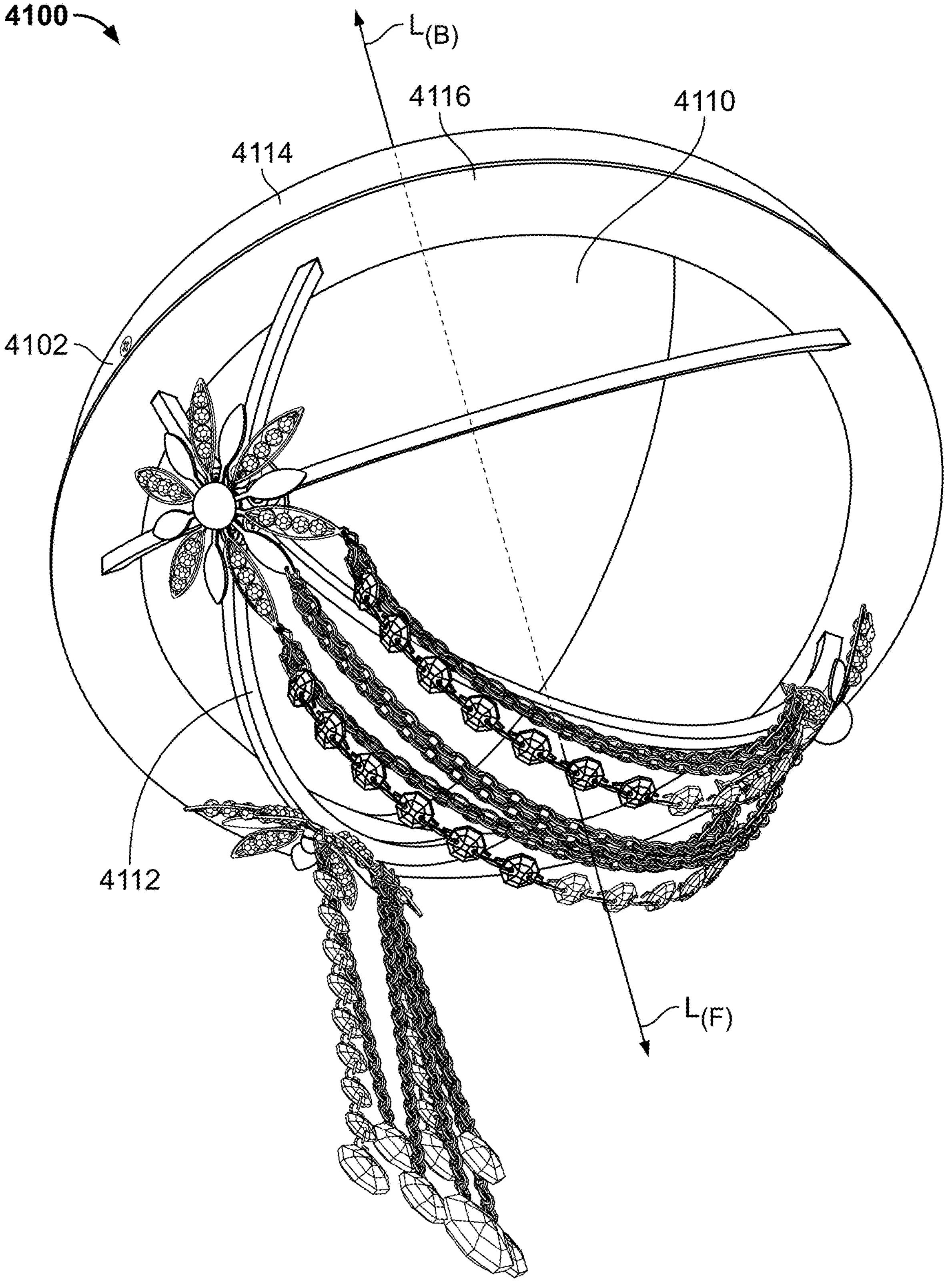

FIG. 42 shows illustrative apparatus in accordance with principles of the invention.

Figure 43:
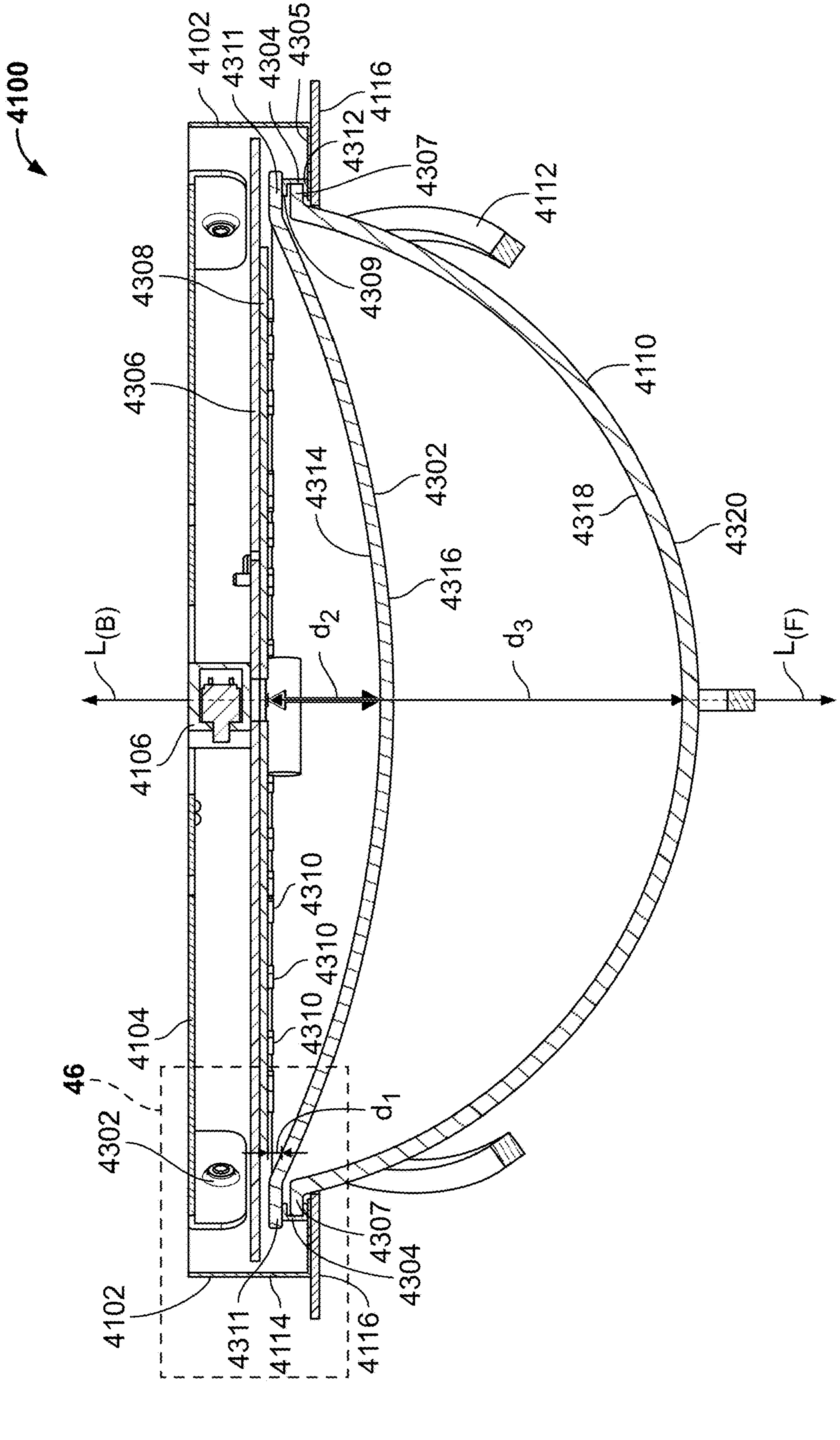

FIG. 43 is a partial cross-sectional view taken along view lines 43-43 shown in FIG. 41.

Figure 1:
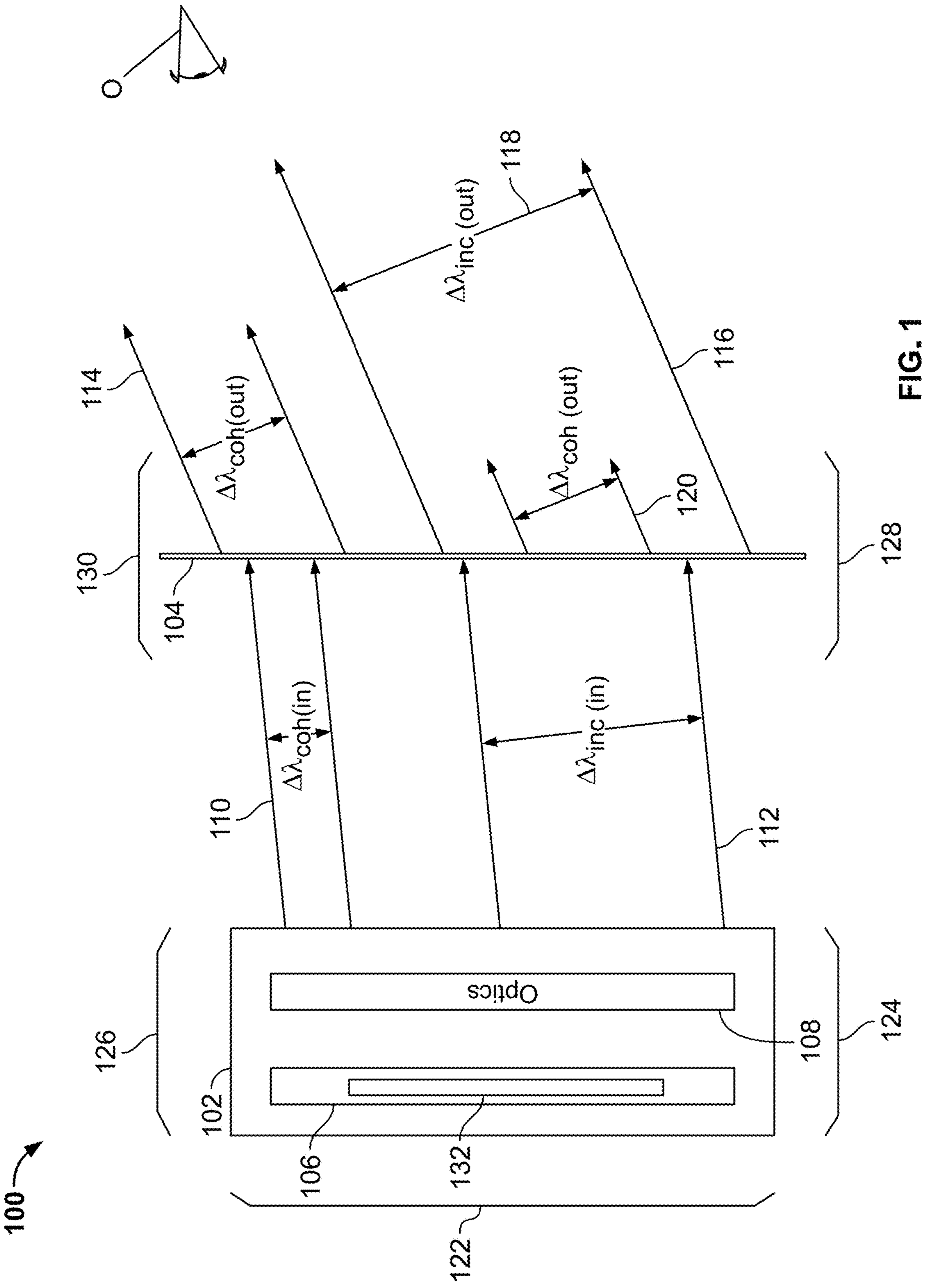
FIG. 1 shows schematically illustrative apparatus in accordance with principles of the invention.
Figure 44:
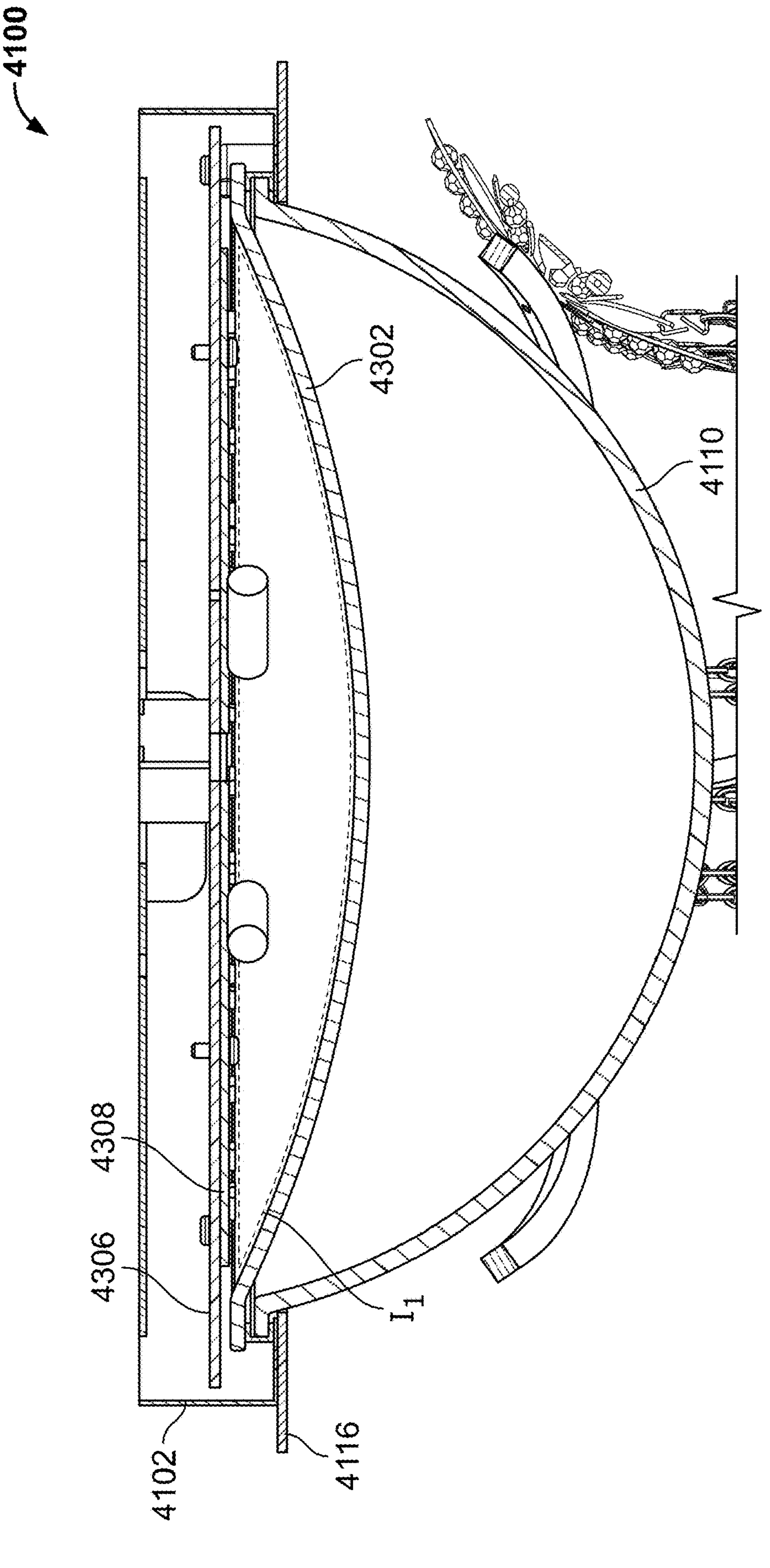

FIG. 44 is a partial cross-sectional view based on a view taken along view lines 44-44 shown in FIG. 1.

Figure 45:
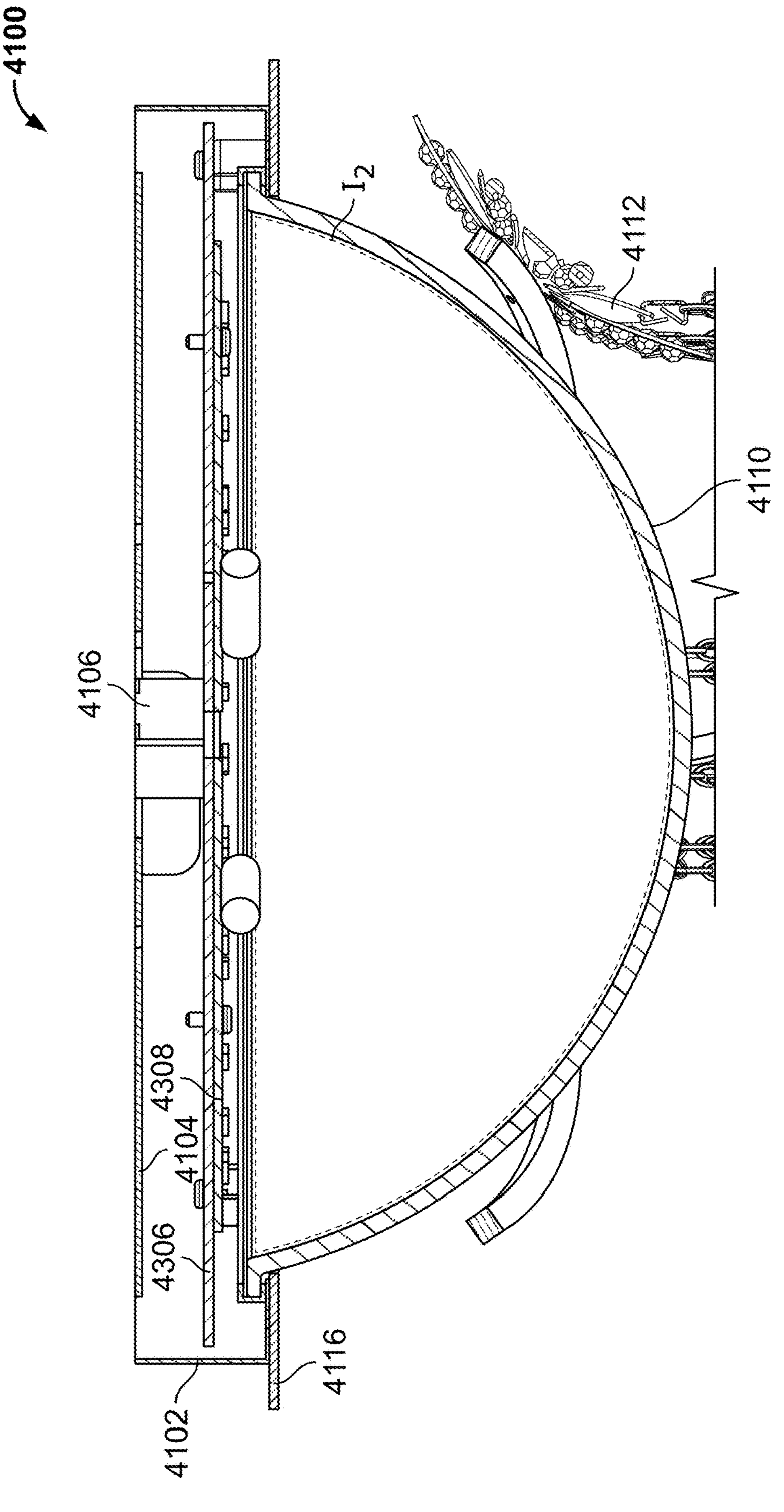

FIG. 45 is a partial cross-sectional view based on a view taken along view lines 45-45 shown in FIG. 1.

Figure 46:
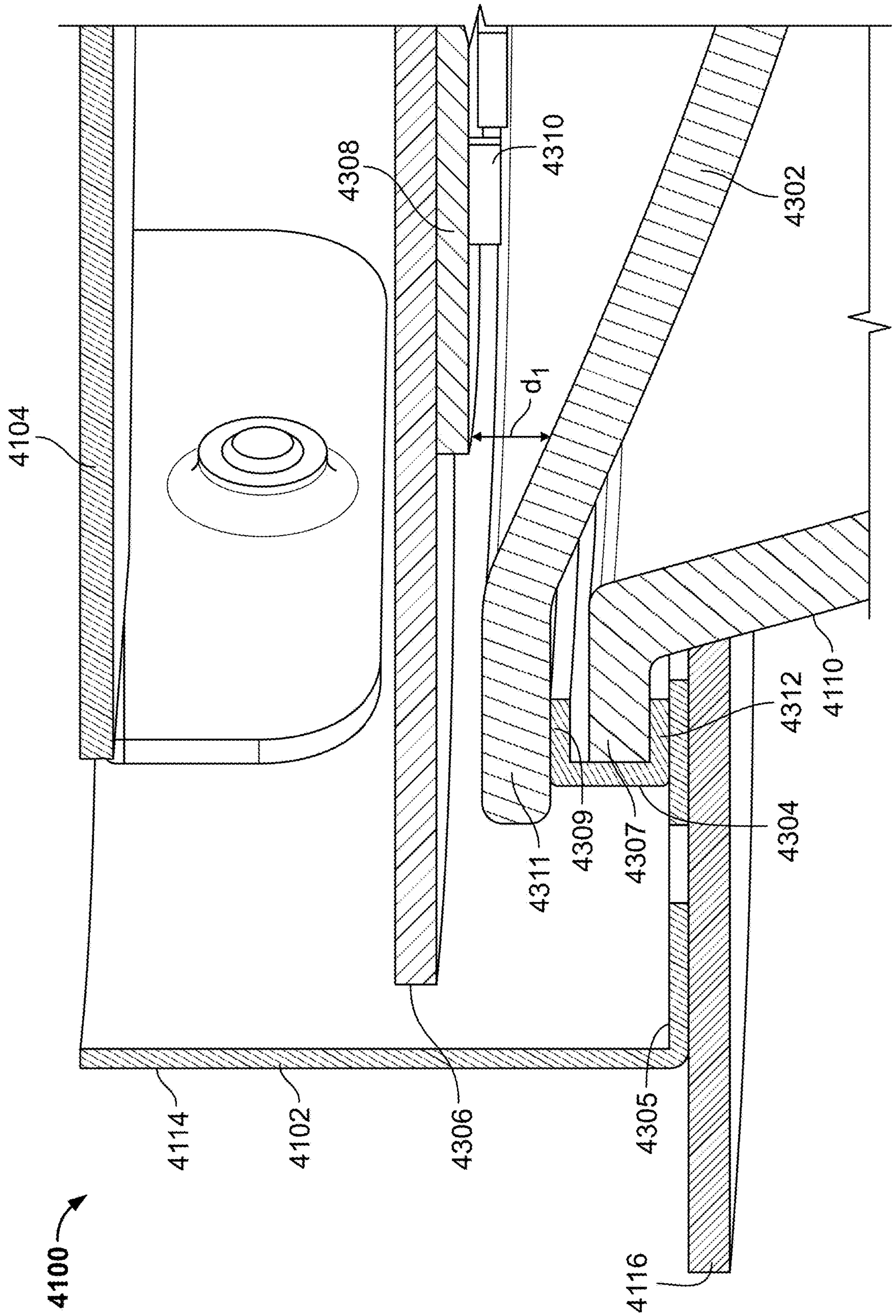

FIG. 46 is a partial cross-sectional view based on a view taken along view lines 46-46 shown in FIG. 1.

Figure 47:
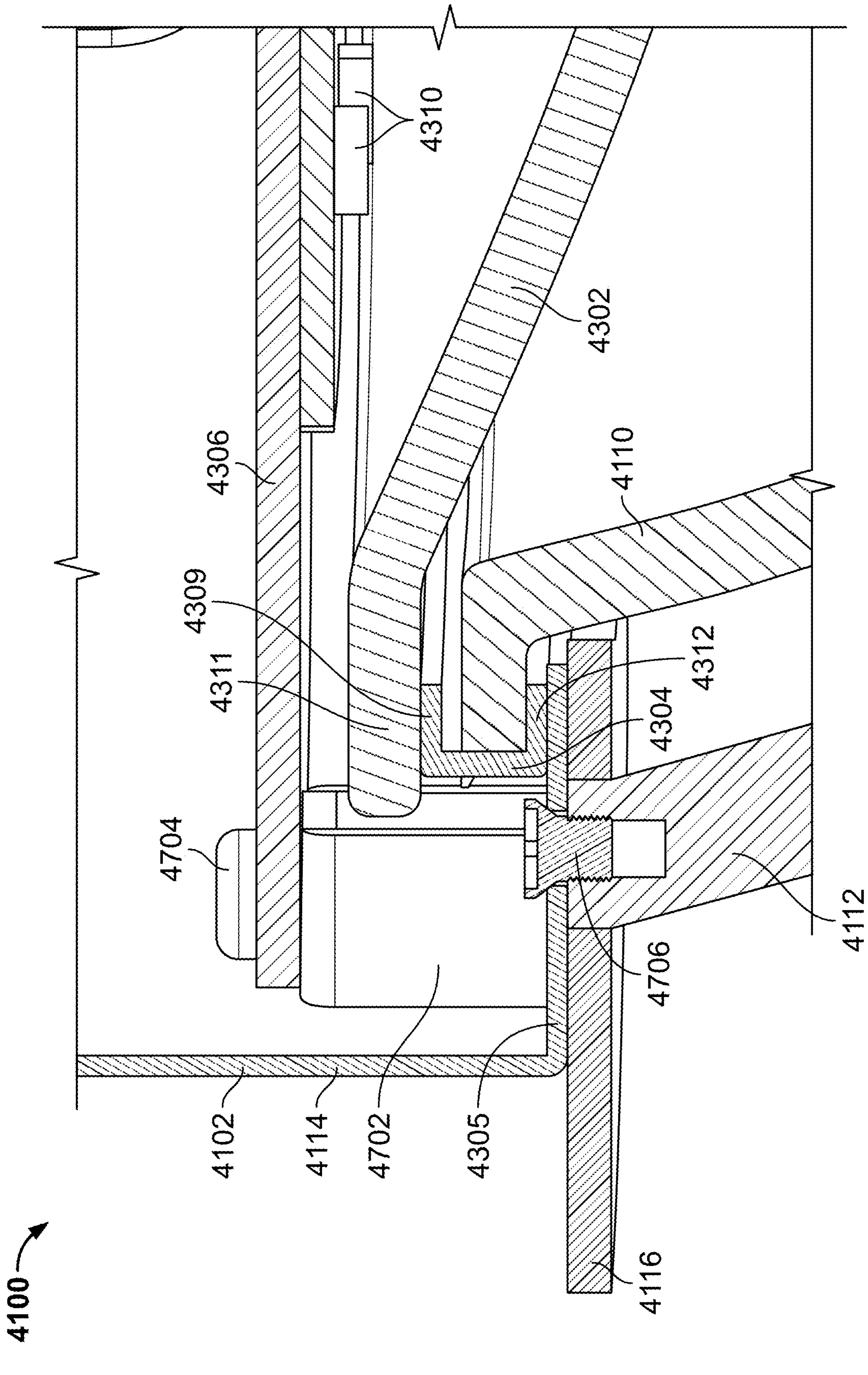

FIG. 47 is a partial cross-sectional view taken along view lines 47-47 shown in FIG. 1.

Figure 48:
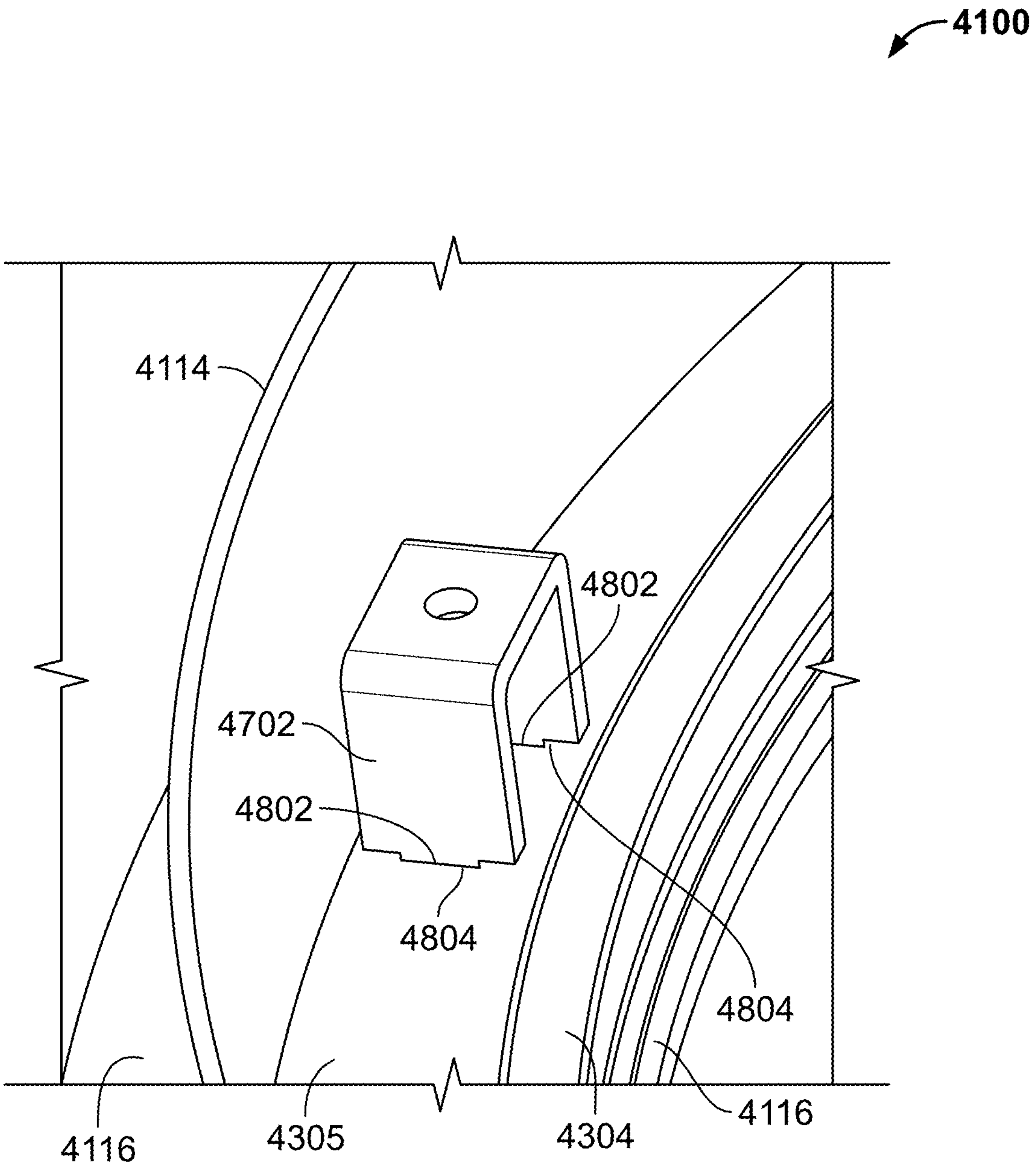

FIG. 48 shows illustrative apparatus in accordance with principles of the invention.

Figure 49:
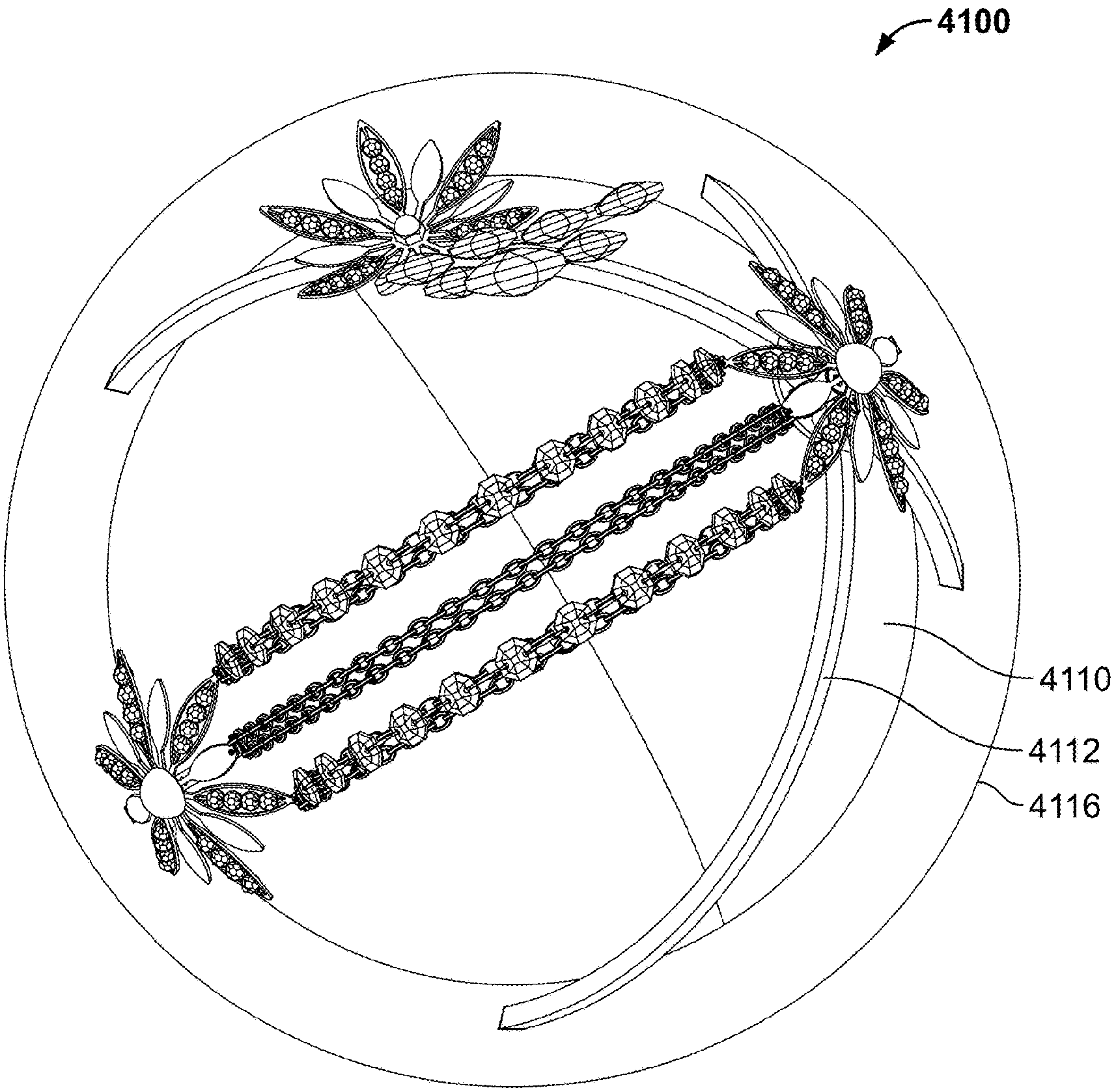

FIG. 49 shows illustrative apparatus in accordance with principles of the invention.

Figure 50:
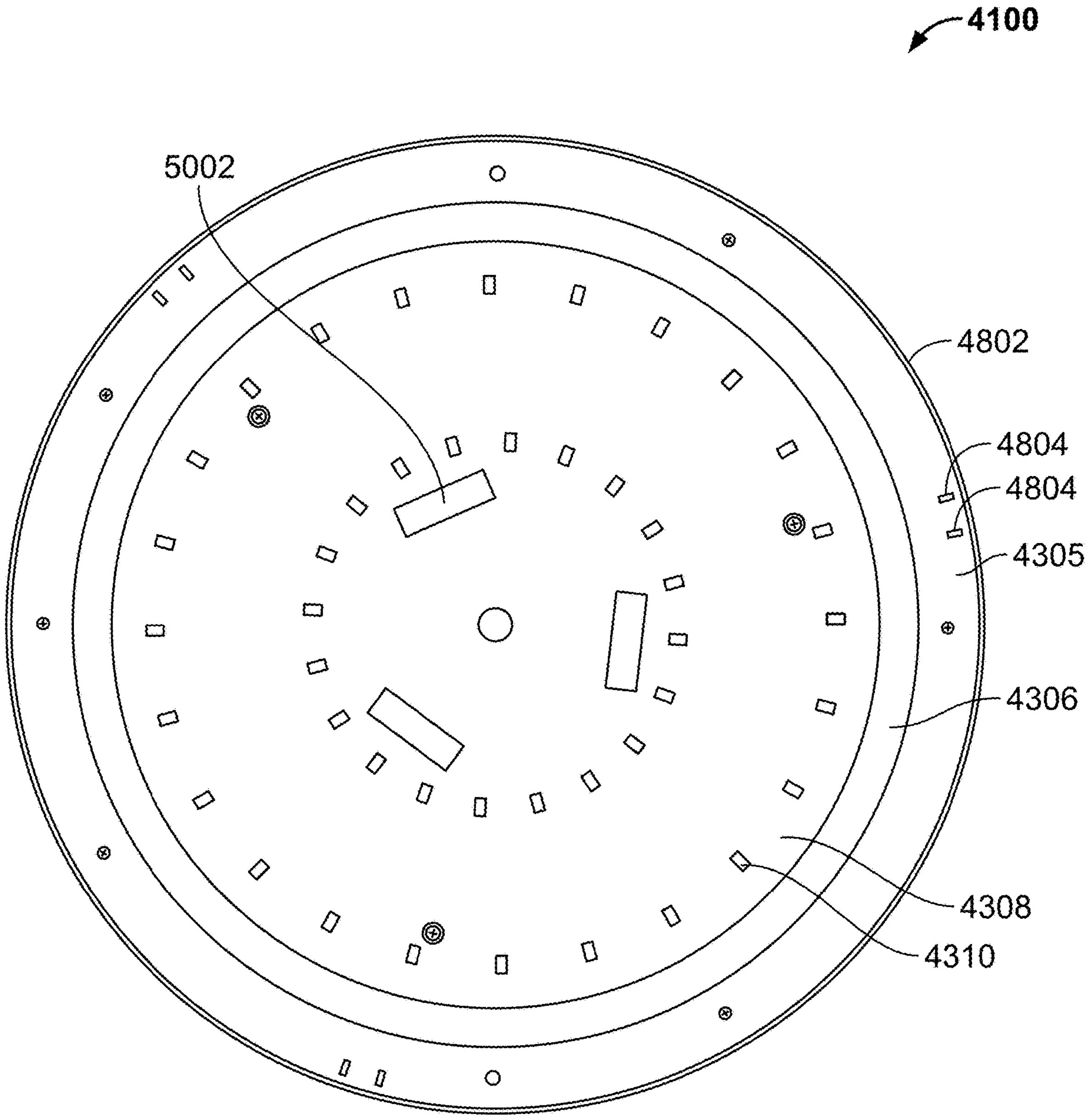

FIG. 50 shows illustrative apparatus in accordance with principles of the invention.

Figure 51:
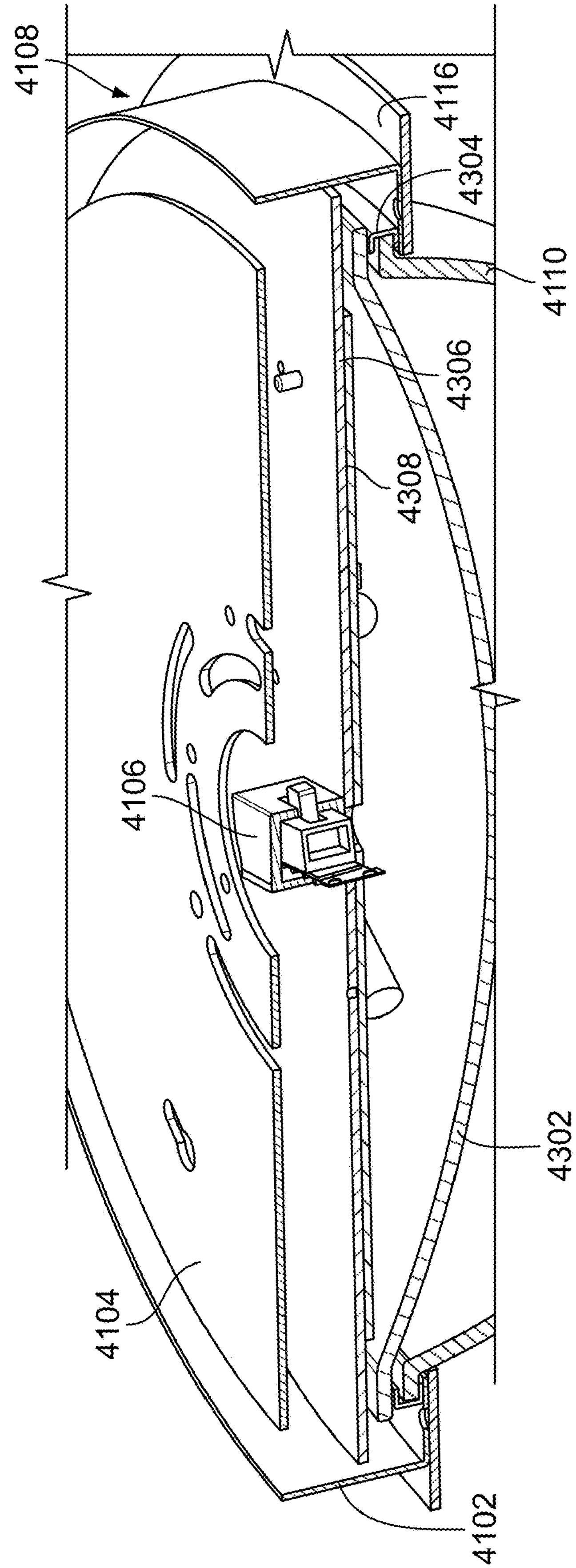

FIG. 51 is a partial cross-sectional view taken along view lines 51-51 shown in FIG. 1.

Figure 52:
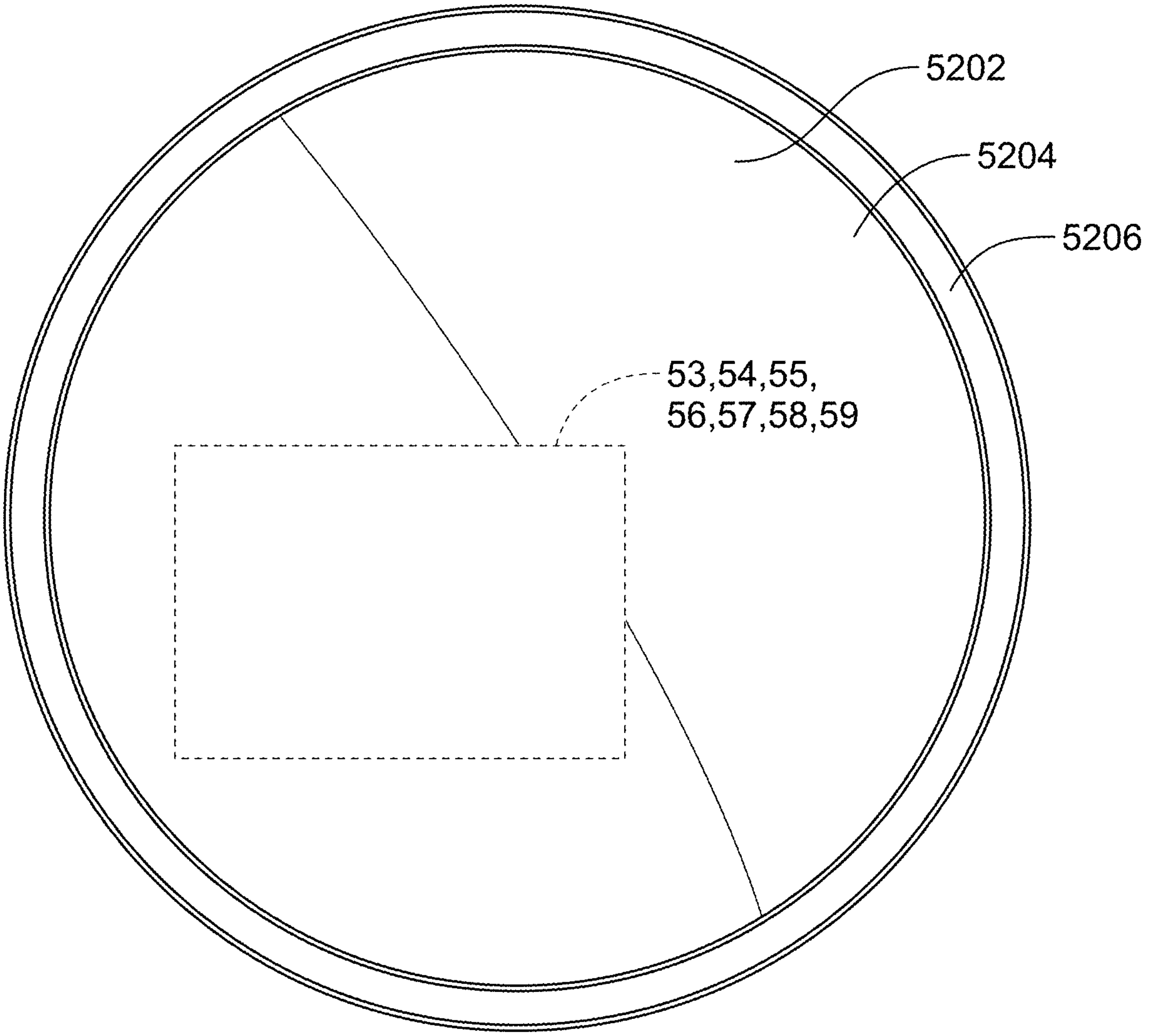

FIG. 52 shows illustrative apparatus in accordance with principles of the invention.

Figure 53:
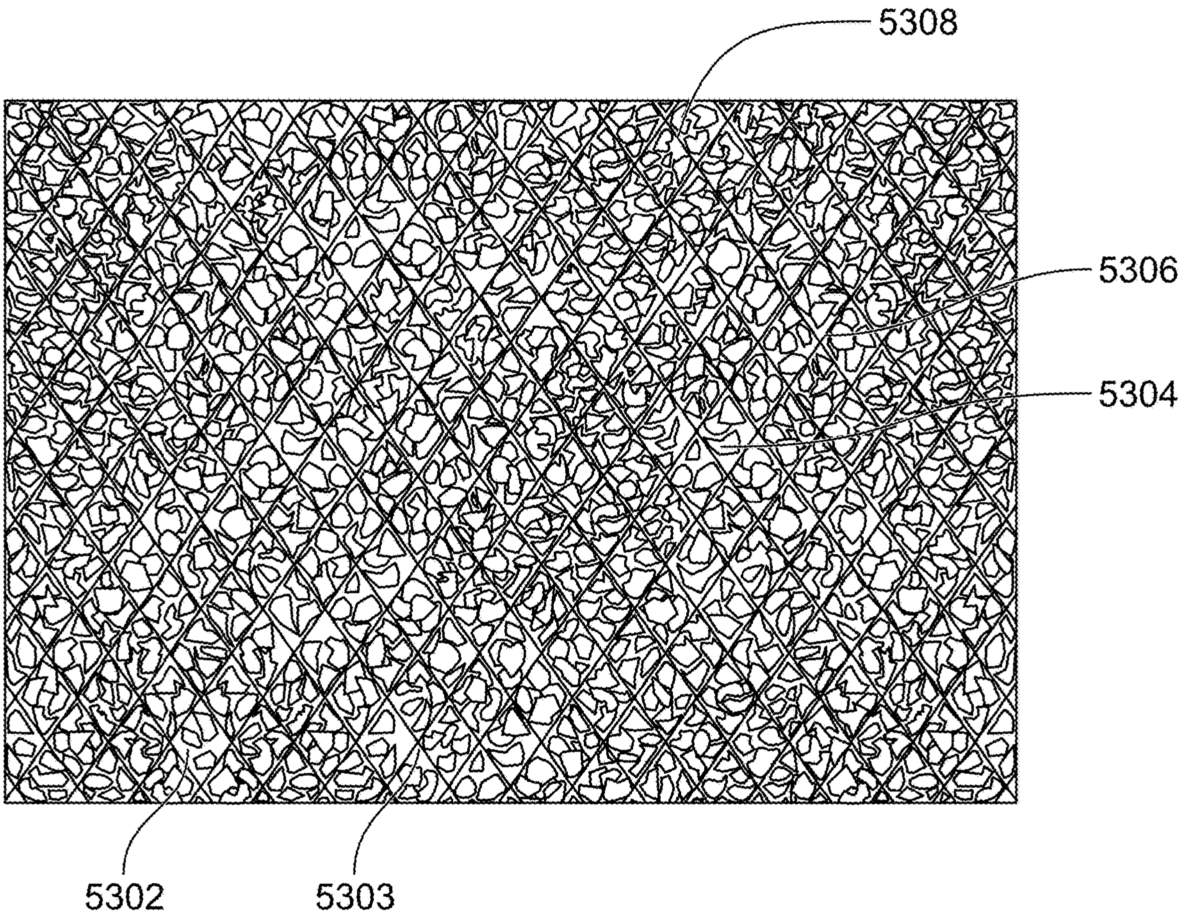

FIG. 53 shows illustrative apparatus in accordance with principles of the invention.

Figure 54:
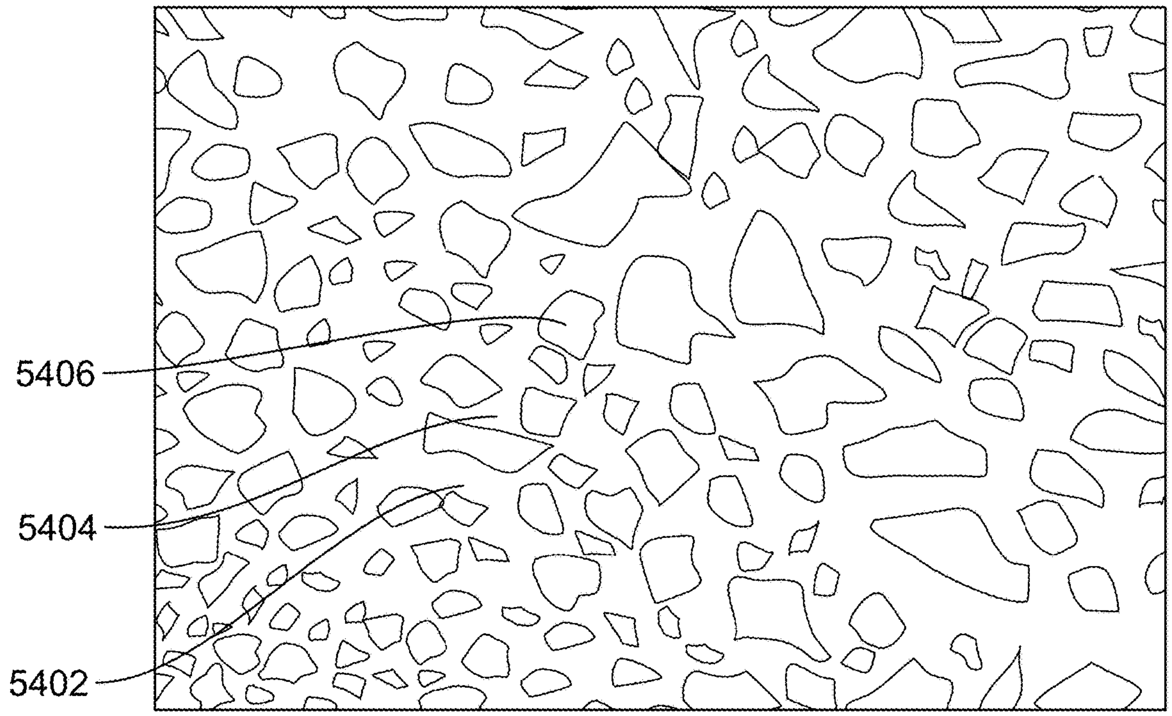

FIG. 54 shows illustrative apparatus in accordance with principles of the invention.

Figure 55:

FIG. 55 shows illustrative apparatus in accordance with principles of the invention.

Figure 56:
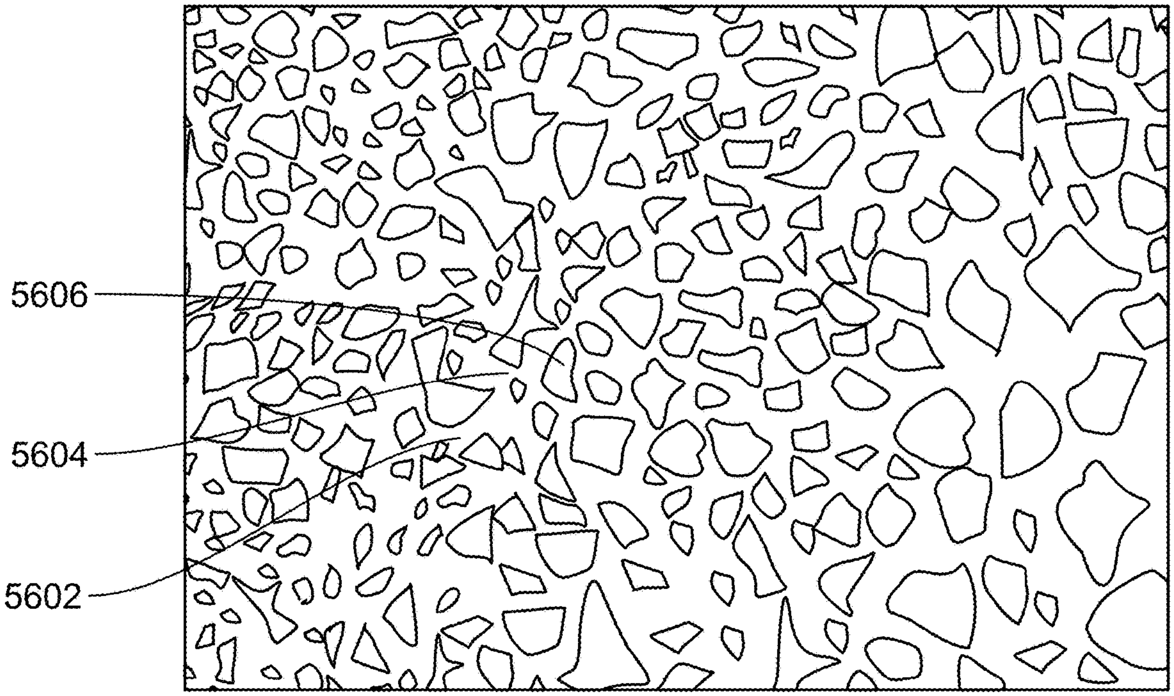

FIG. 56 shows illustrative apparatus in accordance with principles of the invention.

Figure 57:
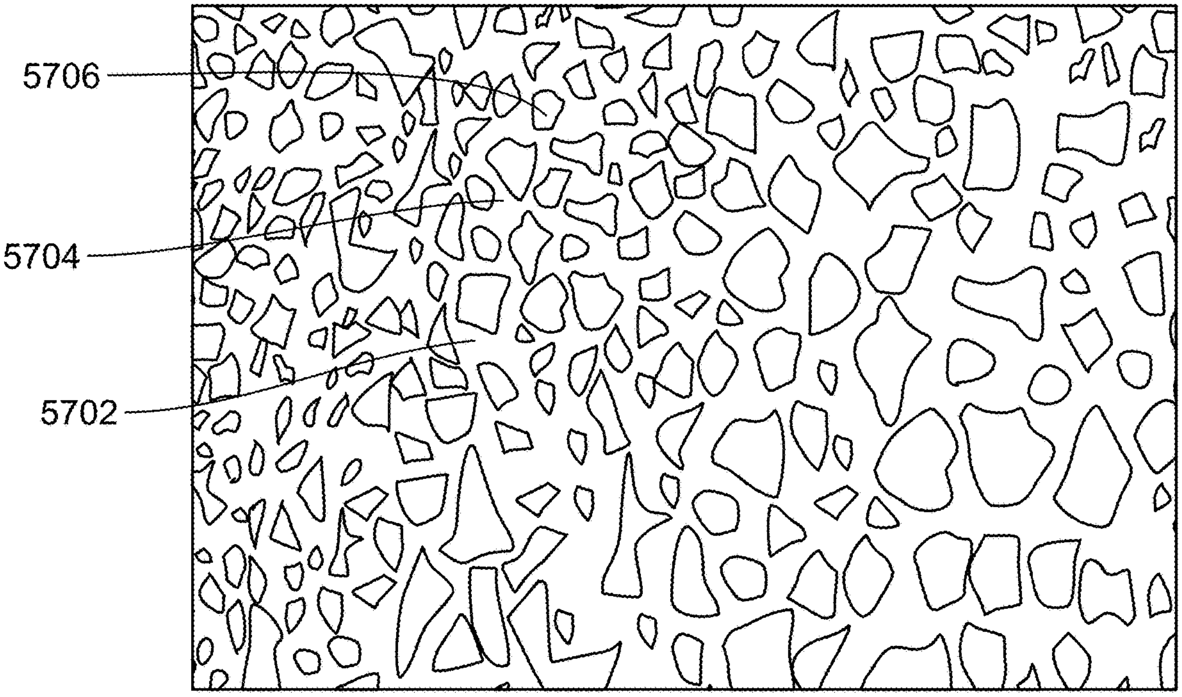

FIG. 57 shows illustrative apparatus in accordance with principles of the invention.

Figure 58:
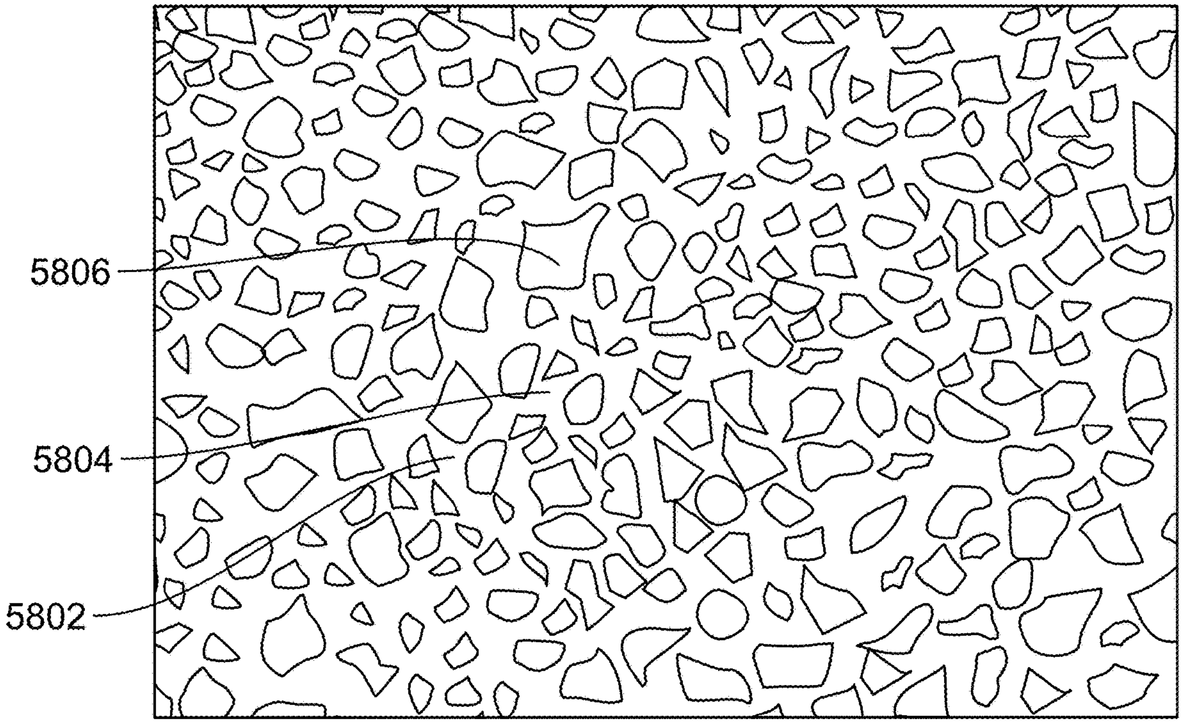

FIG. 58 shows illustrative apparatus in accordance with principles of the invention.

Figure 59:
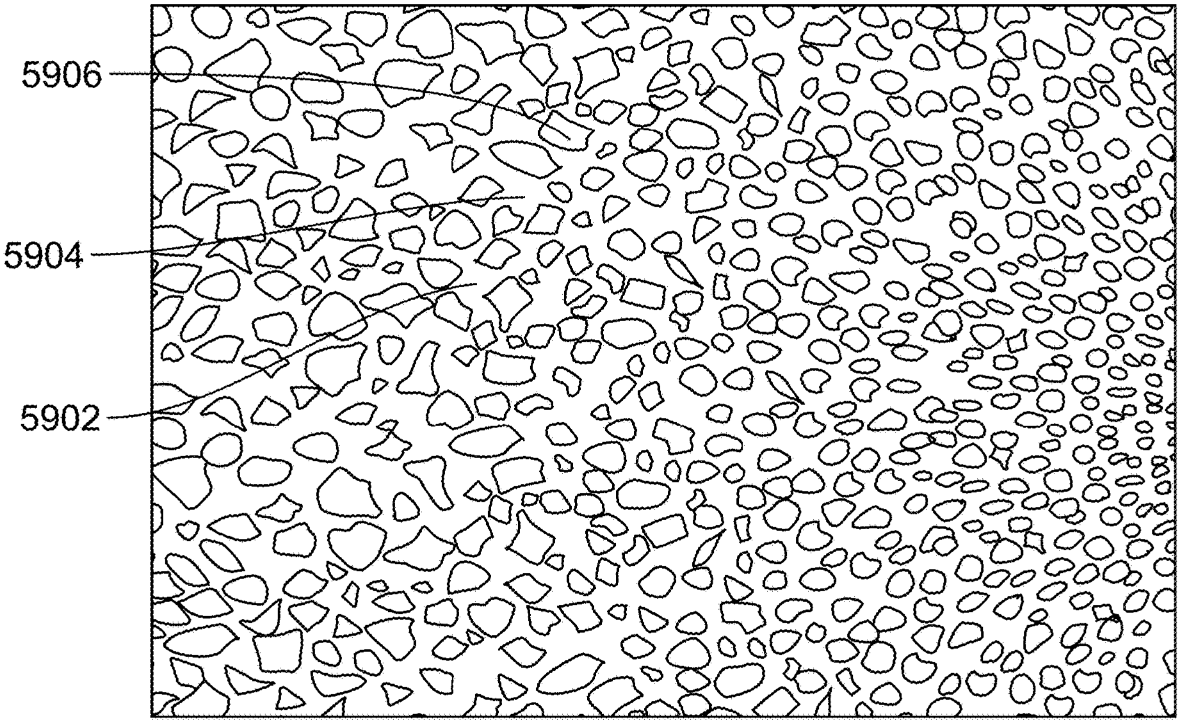

FIG. 59 shows illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for enhanced lighting are provided. The apparatus may include a light-transmitting body. The apparatus may include a light projector. The projector may be configured to propagate into the light-transmitting body an incoming incoherent light. The projector may be configured to propagate into the light-transmitting body an incoming visible coherent light. Emerging coherent light within a visible wavelength range attributable to the incoming visible coherent light may have a first intensity. The first intensity may be greater than a second intensity. The second intensity may be an intensity of any emerging coherent light that is within the wavelength range and is attributable to the incoming incoherent light. Emerging light may be light that emerges from the light-transmitting body.

The apparatus may include a diffusing element. The diffusing element may include a diffuser. The diffusing element may include grains. The grains may include facets. The grains may be spherical. The grains may be spheroidal. The grains may include refractive material. The refractive material may cause light from the LED light source to disperse into different colors of the spectrum. The refractive material may include crystal. The refractive material may include non-crystal material. The non-crystal material may include glass. The facets may be cut, the facets may be machine-cut. The facets may be cut, the facets may be molded.

The diffusing element may scatter light. The scattering may include reflection. The scattering may include diffraction. The scattering may be in the forward direction (going through the matter on which the light is incident). The scattering may be in the backward direction. The scattering may be in in a direction perpendicular to or oblique to the direction of light incident on the diffuser, or in any direction between the forward direction and the backward direction. The diffusing element may have dichroic properties.

The second intensity may be zero. The first intensity may be a multiple of the second intensity. The multiple may be expressed as a ratio of the first intensity to the second intensity.

Each of the first and second intensities may be defined as a sum of intensities of wavelengths in the range. Each of the first and second intensities may be defined as an average of intensities of wavelengths in the range. Each of the first and second intensities may be defined as a peak intensity of wavelengths in the range.

The light-transmitting body may have a refractive index that is not less than 1.52. The light-transmitting body may have a refractive index that is not greater than 1.69.

The light-transmitting body may have a refractive index that is no greater than 1.6. The light-transmitting body may have a refractive index that is no greater than 1.5.

The apparatus may include a fixture. The fixture may include the light-transmitting body. The fixture may include the light projector.

The projector may include a phosphor-converted light-emitting diode ("LED"). The phosphor-converted LED may produce the incoming incoherent light.

The projector may include LEDs that are configured to emit different colors to produce the incoming incoherent light.

The LEDs may include a red-green-blue ("RGB") LED group.

The LEDs may include LEDs configured to emit violet light. The LEDs may include LEDs configured to emit indigo light. The LEDs may include LEDs configured to emit blue light. The LEDs may include LEDs configured to emit green light. The LEDs may include LEDs configured to emit yellow light. The LEDs may include LEDs configured to emit orange light. The LEDs may include LEDs configured to emit red light. The LEDs may include LEDs of different correlated color temperatures ("CCT"). The different CCTs may include any CCTs in the range of 1800° K to 5000° K.

The apparatus may include a diffuser. The diffuser may be disposed between the projector and the light-transmitting body.

The apparatus may include a dichroic layer. The dichroic layer may be disposed between the projector and the light-transmitting body. The dichroic layer may be spaced apart from the light-transmitting body. The dichroic layer may be a coating. The coating may be on the grains.

The apparatus may include a translucent sheet. The translucent sheet may be disposed between the projector and the light-transmitting body. The translucent sheet may include one or more facets. The facets may be configured to direct the incoming incoherent light and the incoming visible coherent light to the light-transmitting body in more than one direction. The facets may be configured to reflect the incoming incoherent light and the incoming visible coherent light to the light-transmitting body in more than one direction. The facets may be configured to specularly reflect the incoming incoherent light and the incoming visible coherent light to the light-transmitting body in more than one direction. The translucent sheet may be configured to refract the incoming incoherent light and the incoming visible coherent light to the light-transmitting body in more than one direction.

The apparatus may include a reflector. The reflector may be configured to reflect the incoming incoherent light and the incoming visible coherent light from the projector to the light-transmitting body.

The reflector may be opaque. The reflector may be semi-opaque.

The projector may have a front. The projector may have a back. The projector may project frontally toward the reflector. The light-transmitting body may be disposed in back of the projector.

The dichroic filter may be disposed between the projector and the reflector.

The diffuser may include one or more perforations.

The apparatus may include an LED light source. The LED light source may be configured to emit a beam of light. The apparatus may include a diffusive element. The diffusive element may include grains. A grain may have a diameter. The diameter may be defined as a greatest linear dimension between two points of the grain.

The grains may be formed by chemical vapor deposition ("CVD").

Each grain may have a diameter D that is in a range from 2.0-3.1 mm. The diffusive element may be fixed at a position relative to the LED light source such that in operation the beam is incident on the diffusive element.

The grains may be grains that are not connected to each other by grain boundaries of a polycrystalline material. The grains may be grains that are not connected to each other by grain boundaries of a monolithic polycrystalline material.

Grain-to-grain bonds between the grains may be bonds that do not include material excluded from the grains during growth of the grains.

The apparatus may include space between the grains. The space may be occupied only by a fluid. The fluid may include air. The space may include a bonding material.

The grains may be spaced apart from each other at a distance from each other. The distance d between neighboring grains may be in the range 2.7-3.3 mm. d may be defined as the distance between the closest points of two grains. Table 1 lists illustrative distances between neighboring grains.

TABLE 1

Illustrative distances between neighboring grains.

| Illustrative distances between neighboring grains (mm) | | | |
|---|---|---|---|
| Range | | Range | |
| Lower | Upper | Lower | Upper |
| <1.7 | 1.7 | 2.7 | 3.3 |
| 1.7 | 2.3 | 2.8 | 3.4 |
| 1.8 | 2.4 | 2.9 | 3.5 |
| 1.9 | 2.5 | 3 | 3.6 |
| 2 | 2.6 | 3.1 | 3.7 |
| 2.1 | 2.7 | 3.2 | 3.8 |
| 2.2 | 2.8 | 3.3 | 3.9 |
| 2.3 | 2.9 | 3.4 | 4 |
| 2.4 | 3 | 3.5 | 4.1 |
| 2.5 | 3.1 | 3.6 | 4.2 |
| 2.6 | 3.2 | 3.7 | 4.3 |
| | | 4.3 | >4.3 |

TABLE 1-continued

Illustrative distances between neighboring grains.

| Illustrative distances between neighboring grains (mm) | | | |
|---|---|---|---|
| Range | | Range | |
| Lower | Upper | Lower | Upper |
| | | Other suitable lower limits | Other suitable upper limits |

The diffusive element may include a substrate that is configured to retain the grains. The apparatus may include a bonding material that fixes the grains to the substrate. The grains may be affixed to each other by a bonding material. The bonding material may include glue. The glue may be that glue available under the trade name LOCTITE from Henkel AG & Co. KGaA, Dusseldorf, Germany, for example, as model number 3926, or any other suitable glue.

The grains may be translucent. The substrate may include glass. The substrate may include crystal. The substrate may include polymer. The substrate may be translucent. The substrate may be opaque. The substrate may be partially optically transmissive. The apparatus may include a light blocking layer. The light blocking layer may be reflective. The light blocking layer may be non-reflective. The light blocking layer may be disposed on a surface of the substrate. The dichroic layer may be on the substrate. The dichroic layer may be on the substrate and not on the grains.

The substrate may have a thickness. Table 2 lists illustrative ranges that may include the thickness.

TABLE 2

Illustrative ranges that may include the substrate thickness.

| Illustrative ranges that may include the substrate thickness (mm) Range | |
|---|---|
| Lower | Upper |
| 1 | 1.5 |
| 1.5 | 2 |
| 2 | 2.5 |
| 2.5 | 3 |
| 3 | 3.5 |
| 3.5 | 4 |
| 4 | 4.5 |
| 4.5 | 5 |
| 5 | 10 |
| 10 | 50 |
| 50 | 100 |
| 100 | >100 |
| Other suitable lower limits | Other suitable upper limits |

The grains may be grains that are not bonded to the substrate.

The grains define a layer that has an average thickness. The bonding material, in a liquid phase, may whet the grains, on average, to height that is no less than 0.1 of the thickness; and no more than 0.3 of the thickness. The bonding material, in a bonded phase, may contact the grains up to a height that is: no less than 0.1 of the thickness and no more than 0.3 of the thickness.

Table 3 lists illustrative bonding material-grain contact heights.

TABLE 3

| Illustrative bonding material-grain contact heights. Illustrative bonding material-grain contact heights (relative to grain layer thickness) Range | |
|---|---|
| Lower | Upper |
| <0.05 | 0.05 |
| 0.05 | 0.1 |
| 0.1 | 0.15 |
| 0.15 | 0.2 |
| 0.2 | 0.25 |
| 0.25 | 0.3 |
| 0.3 | 0.35 |
| 0.35 | 0.4 |
| 0.4 | 0.45 |
| 0.45 | 0.5 |
| 0.5 | >0.5 |
| Other suitable lower limits | Other suitable upper limits |

The diffusive element includes a bed of grains. The bed may be disposed in the substrate. The grains may be grains that are not bonded to each other. The grains may be sintered to each other. The bed may include grains of different sizes. The bed may have a thickness, in grains, o any suitable number of grains. Table 4 lists illustrative ranges that may include the thickness, in number of grains, in the bed.

TABLE 4

| Illustrative ranges that may include the thickness, in number of grains, in the bed. Illustrative ranges that may include the thickness, in number of grains, in the bed Range | |
|---|---|
| Lower | Upper |
| 1 | 1.5 |
| 1.5 | 2 |
| 2 | 2.5 |
| 2.5 | 3 |
| 3 | 3.5 |
| 3.5 | 4 |
| 4 | 4.5 |
| 4.5 | 5 |
| 5 | >5 |
| Other suitable lower limits | Other suitable upper limits |

The diffusive element may have an LED-facing side. The diffusive element may have an illuminating side. In operation, an intensity of a light exiting the illuminating side, as measured across the area of the illuminating side, may have an amplitude that does not exceed 5% of an average intensity of a light entering the LED-facing side, as measured across the area of the LED-facing side.

The substrate may be translucent. Each of the grains may be translucent. The grains may have facets. The facets may be arranged to diffuse light. The diffusive element may be a first diffusive element. The apparatus may include no second diffusive element.

The first diffusive element may have a first side. The first diffusive element may have a second side. The LED light source in operation may emit light that is incident on the first side and is transmitted through the second side.

The second side may be parallel to the first side. The second side may be oblique to the first side. The second side may be perpendicular to the first side.

The substrate may define the first side and the second side.

A surface of the substrate may define the first side. The grains may define the second side.

The grains may define the first side. A surface of the substrate may define the second side.

An arrangement of the grains may face the LED light source. The arrangement may intervene between the LED light source and the substrate.

The grains may define the first side and the second side.

The substrate may be disposed between the LED light source and the grains.

The grains may be disposed between the LED light source and the substrate.

The substrate may define a face. The substrate may define, perpendicular to the face, an edge. The LED light source may be configured to emit light that is incident on the face. The grains may be disposed on the edge. The substrate may be configured to guide light from the LED light source through the grains.

The substrate may define a face. The substrate may define, perpendicular to the face, an edge. The grains may be disposed on the face. The LED light source may be configured to emit light that is incident on the grains. The grains may be configured to diffuse light from the light source. The substrate may be configured to receive diffused light from the grains and guide the diffused light through the edge.

The substrate may define a face. The substrate may define, perpendicular to the face, an edge. The grains may be disposed on the edge. The LED light source may be configured to emit light that is incident on the grains. The grains may be configured to diffuse light from the light source. The substrate may be configured to receive diffused light from the grains and guide the diffused light through the face.

The substrate may define a face. The substrate may define, perpendicular to the face, an edge. The LED light source may be configured to emit light that is incident on the edge. The grains may be disposed on the face. The substrate may be configured to guide light from the LED light source through the grains.

The substrate may define a recess. The grains may be disposed in the recess. The recess may be annular. The recess may be angular. The recess may be rectangular. The recess may have any suitable shape.

The substrate may define a region that is separated from the recess by a partition. The region may be bound by a surface having a cylindrical shape. The region may be bound by a surface having a rectilinear shape. The region may be bound by a surface having a concave shape. The region may be bound by a surface having a convex shape. The recess may circumscribe the region.

Each of the grains may be translucent. The grains may be arranged to diffuse light. The diffusive element may be a first diffusive element. The apparatus may be an apparatus that includes no second diffusive element.

The substrate may define a region. The grains may be disposed in the region. The LED light source may be configured to propagate light into the grains. The grains may be configured to diffuse the light.

The LED light source may be configured to propagate light through the substrate into the grains. The LED light source may be configured to propagate light into an interior of the region without propagating light into the region through the substrate.

The apparatus may include a reflector. The reflector may be configured to reflect light into an interior of the region. The reflector may be positioned at an end of the conduit. The LED light source may be positioned at the end of the conduit.

The region may have a first end. The region may have a second end opposite the first end. The reflector may be positioned at the first end. The LED light source may be positioned at the second end. The LED light source may face the reflector.

The reflector may be disposed on an interior surface of the region.

Apparatus and methods are provided. The apparatus may include a light-emitting diode ("LED") light source having a front and a back. The apparatus may include a light-transmitting body. The light-transmitting body may have a surface. The surface may define a pattern. The light-transmitting body may have light-scattering grains bonded to the surface. The light-transmitting body may be disposed in a position that is in front of the LED light source. It may be that no structure that is configured to maintain the position intervenes between the LED light source and the light-transmitting body. The light-transmitting body may include glass, polymer or any other suitable material. The pattern may be formed in the glass, polymer or other material. The pattern may be molded, blown, grinded, sawn, cut, milled, drilled, applied or of any other approach. The surface may define a texture. The texture may include the pattern. The texture may be a texture that does not include a pattern.

The light-transmitting body may have a back. The LED light source may have a front. The back may face the front of the LED light source. The grains may be bonded to the back.

The light-transmitting body may have a back that faces the front of the LED light source. The light-transmitting body may have a front opposite the back. The grains may be bonded to the front.

The light-transmitting body may define an axis. The axis may be a central axis. The axis may be perpendicular to the front. The axis may be perpendicular to the back. The axis may define a radius. The radius may be perpendicular to the axis.

The light-transmitting body may include a concave region. The concave region may face the LED light source. The light-transmitting body may include a flat region. The flat region may be outside the concave region. The flat region may be radially outside the concave region.

The light-transmitting body may be a light-transmitting body that is supported only at the flat region. The light-transmitting body may be a light-transmitting body that is not perforated.

The apparatus may include a housing. The housing may have a back. The housing may have a front. The back may be configured to be fastened to or against a structure. The structure may be an architectural structure. The structure may include an electrical junction box. The front may be configured to be supported away from the architectural structure. The LED light source may be an LED light source that is fastened only by urging the LED light source toward the back of the housing. The light-transmitting body may be a light-transmitting body that is fastened only by urging the LED light source toward the front of the housing.

The light-transmitting body may be a first light-transmitting body. The first light-transmitting body may include a surface. The surface may define a pattern. The first light-transmitting body may include light-scattering grains. The light-scattering grains may be bonded to the surface. The first light-transmitting body may include a first margin. The first light-transmitting body may be configured to diffuse light from the LED light source. The first light-transmitting body may be a light-transmitting body that is supported only at the first margin.

The apparatus may include a second light-transmitting body. The second light-transmitting body may include a second margin. The second light-transmitting body may be a light-transmitting body that is supported only at the second margin. The second light-transmitting body may be disposed such that the first light-transmitting body intervenes between the LED light source and the second light-transmitting body.

The first light-transmitting body may be a light-transmitting body that is not perforated. The second light-transmitting body may be a light-transmitting body that is not perforated.

The first light-transmitting body may include a first concave region. The first concave region may face the LED light source.

The first margin may be flat.

The second light-transmitting body may include a second concave region. The second concave region may face the LED light source.

The second margin may be flat.

The apparatus may include a support board. The support board may be configured to support the LED light source. The support board may be disposed such that the LED light source intervenes between the support board and the first light-transmitting body. The support board may be disposed such that the support board is not compressed against the first light-transmitting body.

The support board may be disposed parallel to the first margin. The support board may be disposed spaced apart from the first margin. The support board may be disposed parallel to the second margin. The support board may be disposed spaced apart from the second margin.

The first light-transmitting body may be disposed spaced apart from the second light-transmitting body. The first margin may be disposed parallel to the second margin. The first margin may be disposed spaced apart from the second margin.

The apparatus may include a C-channel. The C-channel may define a recess. The second margin may extend into the recess. The C-channel may form a hoop. The C-channel may form an arc. The C-channel may form a polygon.

The apparatus may define a back. The back may include a mounting plate. The apparatus may include a front. The front may include an outer surface of the second light-transmitting body. The LED light source may be supported at the back of the LED light source. The first light-transmitting body may be supported at the front of the first light-transmitting body. The second light-transmitting body may be supported at the front of the second light-transmitting body.

The apparatus may define a back that includes a mounting plate. The apparatus may define a front that includes an outer surface of the second light-transmitting body. The apparatus may include light-scattering grains. The grains may be disposed on a back of the first light-transmitting body. The grains may be disposed on a front of the first light-transmitting body. The grains may be disposed on a back of the second light-transmitting body. The grains may be disposed on a front of the second light-transmitting body.

The first light-transmitting body may include glass. The second light-transmitting body may include glass. The glass may be textured glass. The texture may include a diamond-cut texture. The texture may include protuberances. The texture may include depressions. The texture may include a pattern. The texture may be periodic. The texture may be non-periodic. The texture may be geometric. The texture may be non-geometric.

The glass may be sourced from a pressure-rolled sheet of glass. The glass may include a texture. The glass may include inclusions. The inclusions may include bubbles. The inclusions may include fragments. The fragments may include glass. The fragments may include any suitable material. The glass may have a first color. The inclusions may have a second color. The first and second colors may be different. The sheet may be cut to a desired size and two-dimensional shape. The sheet may be bent under heating into a desired three-dimensional shape.

Glue may be applied to a light-transmitting body. Grains may be disposed on the glue. A layer of glue may be applied over the grains.

LED lights may cause visual hotspots. The apparatus and methods may reduce or eliminate hotspots.

An enhanced light diffusion apparatus is provided.

The apparatus may include a housing.

The apparatus may include a mounting bracket.

The mounting bracket may be configured to attach the apparatus to a surface.

The surface may include a wall.

The surface may include a ceiling.

The surface may include a floor.

The housing may be circular.

The housing may be annular.

The housing may be cylindrical.

The housing may include a support board.

The housing may include one or more PCB boards.

Each PCB board may include one or more LEDs.

Each PCB board may be supported by the support board.

The housing may include an electrical connector.

The electrical connector may include a hollow portion.

One or more electrical wires may pass through the electrical connector.

The one or more electrical wires may be configured to power the one or more LEDs.

The apparatus may include a light transmitting body.

The light transmitting body may be a diffuser.

The light transmitting body may be configured to diffuse light.

The light transmitting body may be configured to reduce one or more LED hotspots.

The light transmitting body may be a substrate.

The light transmitting body may be curved.

The light transmitting body may be curved in a convex direction away from the one or more LEDs.

The light transmitting body may be curved to decrease a height of the housing.

The light transmitting body may be curved to decrease a height of the housing by 7 millimeters ("mm").

The light transmitting body may be configured to decrease a height of the housing.

The light transmitting body may be hemispherical.

The light transmitting body may include a curved portion.

The light transmitting body may include a planar portion.

A distance between the one or more LEDs and the light transmitting body may vary.

A distance between the one or more LEDs and the light transmitting body may be variable.

The distance between the one or more LEDs and the light transmitting body may be configured to reduce one or more LED hotspots.

A minimum distance between the one or more LEDs and the light transmitting body may be 5.2 mm.

The minimum distance between the one or more LEDs and the light transmitting body may range from 4 mm to 7 mm.

A maximum distance between the one or more LEDs and the light transmitting body may be 27.7 mm.

The maximum distance between the one or more LEDs and the light transmitting body may range from 25 mm to 30 mm.

The distance between the one or more LEDs and the light transmitting body may increase from 4 mm to 30 mm.

The distance between the one or more LEDs and the light transmitting body may decrease from 30 mm to 4 mm.

A distance between the PCB board and the light transmitting body may vary.

A distance between the PCB board and the light transmitting body may be variable.

The distance between the PCB board and the light transmitting body may be configured to reduce one or more LED hotspots.

A minimum distance between the PCB board and the light transmitting body may be 5.2 mm.

The minimum distance between the PCB board and the light transmitting may range from 4 mm to 7 mm.

A maximum distance between the PCB board and the light transmitting body may be 27.7 mm.

The maximum distance between the PCB board and the light transmitting body may range from 25 mm to 30 mm.

The distance between the PCB board and the light transmitting body may increase from 4 mm to 30 mm.

The distance between the PCB board and the light transmitting body may decrease from 30 mm to 4 mm.

The light transmitting body may include glass.

The light transmitting body may include acrylic.

The light transmitting body may include polycarbonate.

The light transmitting body may include plastic.

The light transmitting body may be translucent.

The light transmitting body may include textured glass.

The light transmitting body may include diamond textured glass.

The textured glass may comprise one or more patterns.

The textured glass may include diamond-cut glass.

The light transmitting body may include textured acrylic.

The light transmitting body may include diamond textured acrylic.

The textured acrylic may comprise one or more patterns.

The textured acrylic may include diamond-cut acrylic.

The light transmitting body may include textured polycarbonate.

The light transmitting body may include diamond textured polycarbonate.

The textured polycarbonate may comprise one or more patterns.

The textured polycarbonate may include diamond-cut polycarbonate.

The light transmitting body may include textured plastic.

The light transmitting body may include diamond textured plastic.

The textured plastic may comprise one or more patterns.

The textured plastic may include diamond-cut plastic.

The light transmitting body may include an inner surface

The light transmitting body may include an outer surface.

The inner surface may be textured.

The inner surface may include a textured glass area.

The inner surface may include a textured acrylic area.

The inner surface may include a textured polycarbonate area.

The inner surface may include a textured plastic area.

The outer surface may be textured.

The outer surface may include a textured glass area.

The outer surface may include a textured acrylic area.

The outer surface may include a textured polycarbonate area.

The outer surface may include a textured plastic area.

The light transmitting body may include crystal dust.

The crystal dust may be on the inner surface.

The crystal dust may be on the outer surface.

The crystal dust may be glued to a surface of the light transmitting body.

The crystal dust may vary in shape.

The crystal dust may vary in size.

The crystal dust may be configured to reduce one or more LED hotspots.

The textured glass may be configured to reduce one or more LED hotspots.

The distance between the one or more LEDs and the light transmitting body may be configured to reduce one or more LED hotspots.

The light transmitting body may be a first light transmitting body.

The apparatus may include a second light transmitting body below the first diffuser.

The second light transmitting body may be a diffuser.

The second light transmitting body may be configured to diffuse light.

The second light transmitting body may be configured to reduce one or more LED hotspots.

The second light transmitting body may be a substrate.

The second light transmitting body may be curved.

A distance between the one or more LEDs and the second light transmitting body may vary.

A distance between the one or more LEDs and the second light transmitting body may be variable.

The distance between the one or more LEDs and the second light transmitting body may be configured to reduce one or more LED hotspots.

A distance between the PCB board and the second light transmitting body may vary.

A distance between the PCB board and the second light transmitting body may be variable.

The distance between the PCB board and the second light transmitting body may be configured to reduce one or more LED hotspots.

A distance between the one or more LEDs and the second light transmitting body may be 101.4 mm.

A maximum distance between the one or more LEDs and the second light transmitting body may be 101.4 mm.

The maximum distance between the one or more LEDs and the second light transmitting body may range from 95 mm to 110 mm.

A minimum distance between the one or more LEDs and the second light transmitting body may be 5.2 mm.

The minimum distance between the one or more LEDS and the second light transmitting body may range from 4 mm to 15 mm.

The distance between the one or more LEDs and the second light transmitting body may vary from 4 mm to 110 mm.

A distance between the PCB board and the second light transmitting body may be 101.4 mm.

A maximum distance between the PCB board and the second light transmitting body may be 101.4 mm.

The maximum distance between the PCB board and the second light transmitting body may range from 95 mm to 110 mm.

A minimum distance between the PCB board and the second light transmitting body may be 5.2 mm.

The minimum distance between the PCB board and the second light transmitting body may range from 4 mm to 15 mm.

The distance between the PCB board and the second light transmitting body may vary from 4 mm to 110 mm.

The second light transmitting body may be curved in a convex direction away from the one or more LEDs.

The second light transmitting body may be hemispherical.

The second light transmitting body may include a curved portion.

The second light transmitting body may include a planar portion.

A distance between the one or more LEDs and the second light transmitting body may vary.

A distance between the one or more LEDs and the second light transmitting body may be variable.

The second light transmitting body may include a second light transmitting body inner surface and a second light transmitting body outer surface.

The second light transmitting body may include glass.

The second light transmitting body may include textured glass.

The second light transmitting body may include diamond textured glass.

The second light transmitting body textured glass may be diamond-cut glass.

The textured glass may comprise one or more patterns.

The second light transmitting body may include textured acrylic.

The second light transmitting body may include diamond textured acrylic.

The textured acrylic may comprise one or more patterns.

The textured acrylic may include diamond-cut acrylic.

The second light transmitting body may include textured polycarbonate.

The second light transmitting body may include diamond textured polycarbonate.

The textured polycarbonate may comprise one or more patterns.

The textured polycarbonate may include diamond-cut polycarbonate.

The second light transmitting body may include textured plastic.

The second light transmitting body may include diamond textured plastic.

The textured plastic may comprise one or more patterns.

The textured plastic may include diamond-cut plastic.

The second light transmitting body inner surface may be textured.

The second light transmitting body inner surface may include a textured glass area.

The second light transmitting body outer surface may be textured.

The second light transmitting body outer surface may include a textured glass area.

The second light transmitting body inner surface may include a textured acrylic area.

The second light transmitting body inner surface may include a textured polycarbonate area.

The second light transmitting body inner surface may include a textured plastic area.

The second light transmitting body outer surface may include a textured acrylic area.

The second light transmitting body outer surface may include a textured polycarbonate area.

The second light transmitting body outer surface may include a textured plastic area.

The second light transmitting body may include second crystal dust.

The second crystal dust may be on the second light transmitting body inner surface.

The second crystal dust may be on the second light transmitting body outer surface.

The second light transmitting body inner surface may be textured.

The second light transmitting body outer surface may be textured.

The second light transmitting body may be transparent.

The second crystal dust may be glued to a surface of the second light transmitting body.

The second crystal dust may vary in shape.

The second crystal dust may vary in size.

The second crystal dust may be configured to reduce one or more LED hotspots.

The textured glass may be configured to reduce one or more LED hotspots.

There may be a distance between the one or more LEDs and the second light transmitting body.

The distance between the one or more LEDs and the second light transmitting body may be configured to reduce one or more LED hotspots.

The distance between the one or more LEDs and the second light transmitting body may vary.

The distance between the one or more LEDs and the second light transmitting body may be variable.

The first light transmitting body may be between the one or more LEDs and the second light transmitting body.

The housing may include a c-channel.

The c-channel may have a first side, a second side, and a third side.

The c-channel may support the first light transmitting body.

The c-channel may support the second light transmitting body.

The housing may support the first light transmitting body.

The housing may support the second light transmitting body.

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

FIG. 1 shows schematically illustrative arrangement 100 for enhanced diffusion. Illustrative arrangement 100 may include projector 102. Illustrative arrangement 100 may include light transmitting body 104. Light-transmitting body 104 may be a decorative element of a light fixture. Light-transmitting body 104 may have diffusive properties.

Projector 102 may include light source 106. Projector 102 may include light optics 108. Projector 102 may include a structure for supporting light source 106. Projector 102 may include a structure for supporting light optics 108. Light source 106 may function as a projector. Light optics 108 may function as a projector. Light source 106 and light optics 108 may function together as a projector. One or more of light source 106, light optics 108 and any other suitable item may function together as a projector.

Projector 102 may project toward light-transmitting body 104 colored light 110. Colored light 110 may be coherent light. Colored light 110 may be in the visible spectrum. Colored light 110 may include light in wavelength range $\Delta\lambda_{coh}$ (in). $\Delta\lambda_{coh}$ (in) may be light that is input ("in") to light-transmitting body 104.

Projector 102 may project toward light-transmitting body 104 white light 112. White light 112 may be incoherent light. White light 112 may include wavelengths in the visible spectrum. White light 112 may include light in wavelength range $\Delta\lambda_{inc}$ (in). $\Delta\lambda_{inc}$ (in) may be light that is input ("in") to light-transmitting body 104.

$\Delta\lambda_{inc}$ (in) may be a broader wavelength range than $\Delta\lambda_{coh}$ (in). The intensity of white light 112 may be greater than the intensity of colored light 110.

Colored light 110 and white light 112 may by scattered by light-transmitting body 104. The scattering may include reflection. The scattering may include refraction. The scattering may be in the forward direction (the direction of propagation from projector 102). The scattering may be in the backward direction (opposite the direction of propagation from projector 102). The scattering may be in in a direction perpendicular to or oblique to the direction of propagation from projector 102.

Colored light 114 may emerge from light-transmitting body 104. Colored light 114 may be sourced from colored light 110. Colored light 114 may be coherent light. Colored light 114 may be in the visible spectrum. Colored light 114 may include light in wavelength range $\Delta\lambda_{coh}$ (out). $\Delta\lambda_{coh}$ (out) may partially or completely overlap $\Delta\lambda_{coh}$ (in).

Light 116 may emerge from light-transmitting body 104. Light 116 may be sourced from white light 112. Light 116 may include white light 118. White light 118 may be incoherent. White light 118 may include light in wavelength range $\Delta\lambda_{inc}$ (out).

Light 116 may include colored light 120. Colored light 120 may be coherent. Colored light 120 may include light in wavelength range $\Delta\lambda_{coh}$ (out). Colored light 120 may be sourced from white light 112. Colored light 120 may result from separation of white light 112 by light-transmitting body 104. The separation may be from refraction.

The intensity of colored light 114 may be greater than the intensity of colored light 120. The intensity of colored light 120 may be below perception of a human observer such as observer O. Observer O may perceive a juxtaposition of colored light 114 and white light 118. White light 118 may illuminate a space. Colored light 114 may appear as a colored region of light-transmitting body 104.

Light source 106 may include one or more LEDs. The LEDs may emit different light of different colors. The LEDs may emit white light.

Optics 108 may diffuse light emitted from light source 106. Optics 108 may permit the propagation of colored light 110 from projector 102. Optics 108 may permit the propagation of white light 110 from light source 106. Optics 108 may mix colored light emitted from light source 106 to produce white light 112. Table 5 lists illustrative optics 108 elements.

TABLE 5

| Illustrative optics 108 elements |
|---|
| Diffuser |
| Lens |
| Optical mixer |
| Dichroic element |
| Optical filter |
| Polarizer |
| Mirror |

TABLE 5-continued

| Illustrative optics 108 elements |
|---|
| Reflector |
| Other suitable elements |

Arrangement 100 may include one or more reflectors such as reflectors 122, 124, 126, 128 and 130. One or more of the reflectors may have dichroic properties. One or more of the reflectors may have a mirror finish. One or more of the reflectors may be translucent.

Light source 106 may include LED board 132. LED board 132 may support one or more LEDs. One or more of the LEDs may emit white light. The LEDs may include LEDs that emit white light of different coordinated color temperatures. One or more of the LEDs may emit colored light. All of the LEDs may emit white light. All of the LEDs may emit colored light. The colored light of the LEDs may be of the same color. The colored light of the LEDs may be of different colors.

Figure 2:
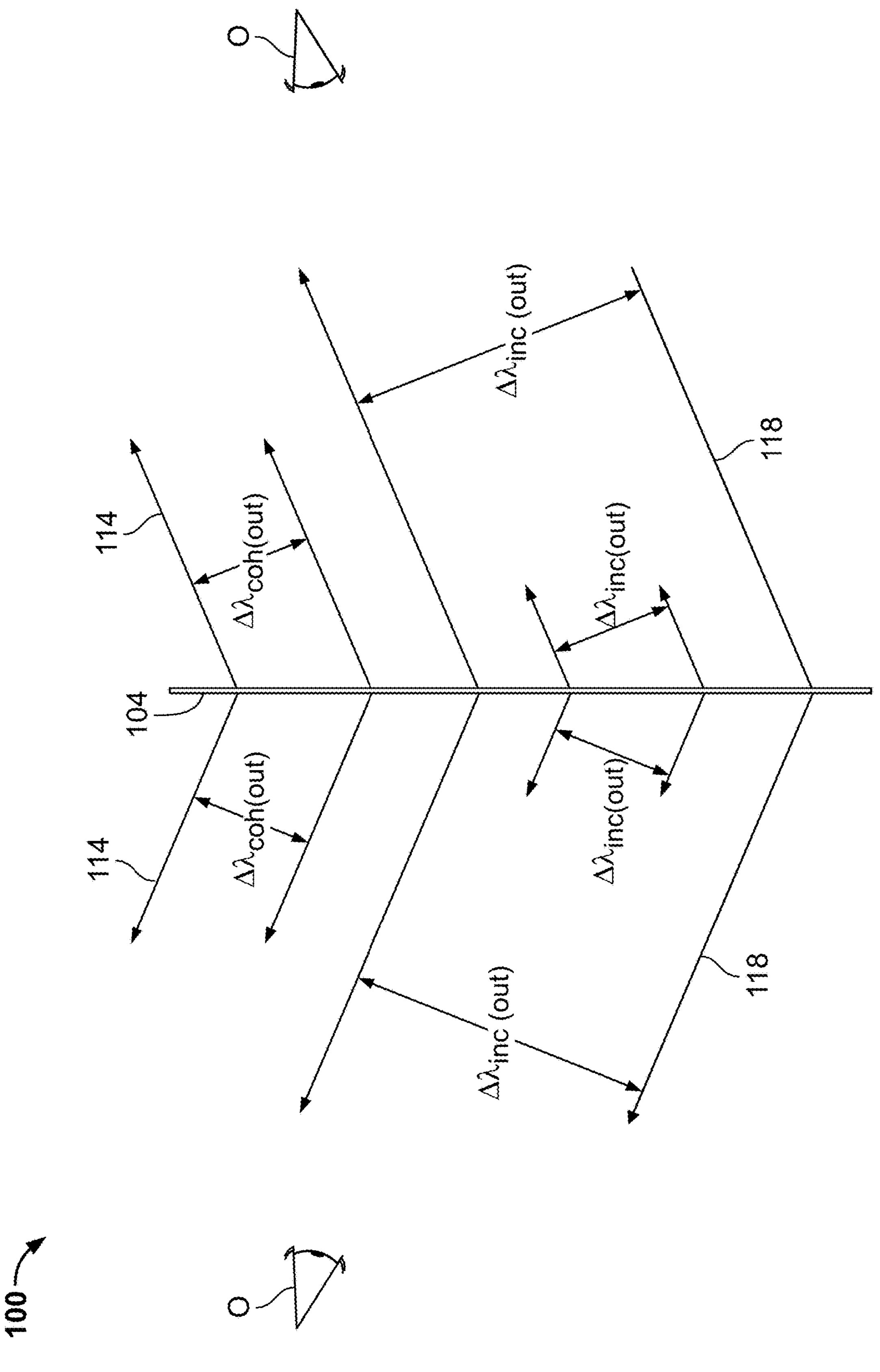
FIG. 2 shows schematically illustrative apparatus in accordance with principles of the invention.

FIG. 2 shows schematically colored light 114 and white light 118 emerging from light-transmitting body 104 in different directions. Projector 102 is not shown. Projector 106 may be located behind the plane of FIG. 2, in front of the plane of FIG. 2, to the left of light-transmitting body 104, to the right of light-transmitting body 104 or in any other suitable position. Observer O may observe colored light 114 and white light 118 from different positions, such as the two different positions shown.

Figure 3:
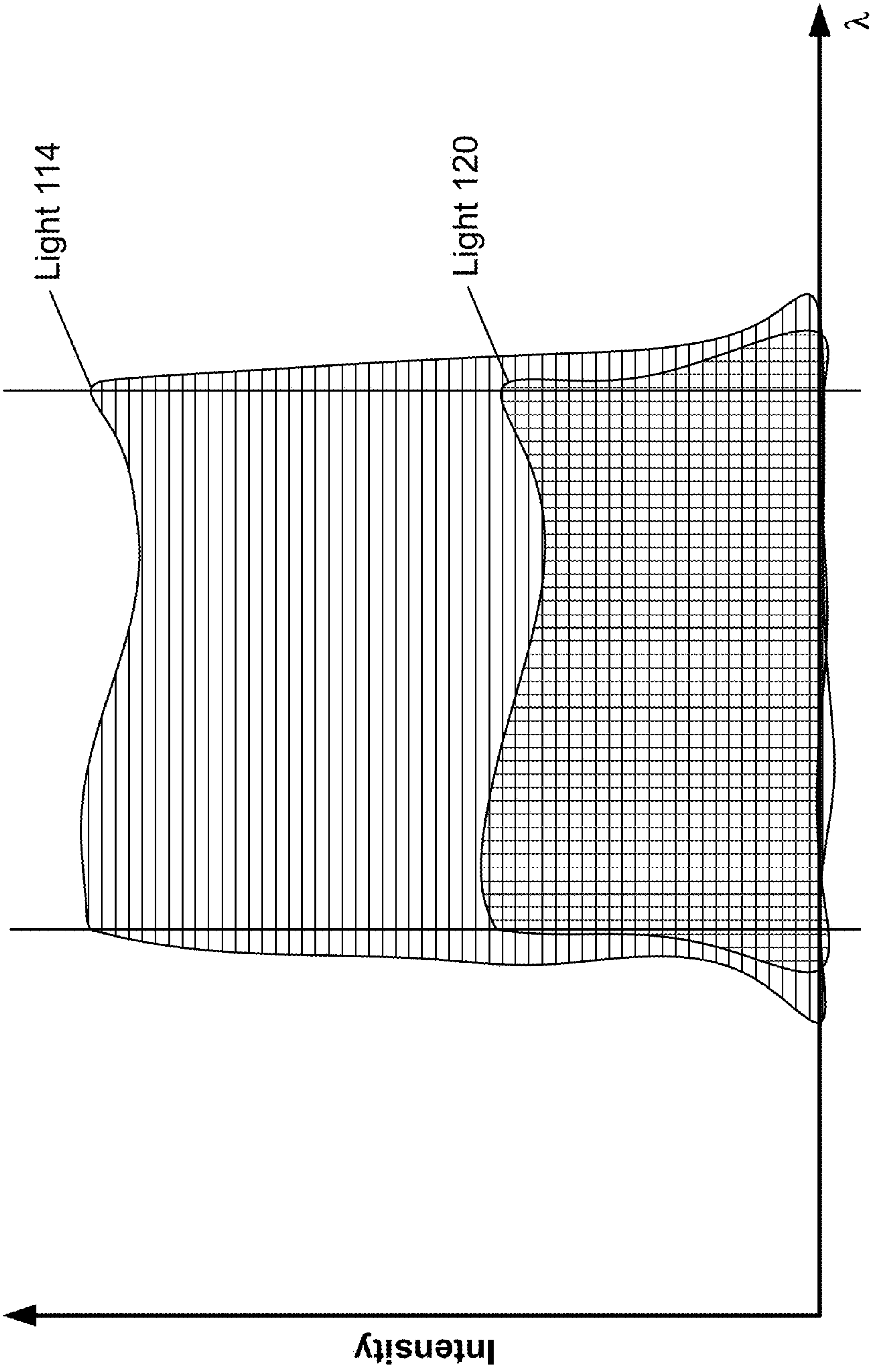
FIG. 3 shows illustrative information in accordance with principles of the invention.

FIG. 3 shows schematically the intensities of colored light 114 and colored light 120. Wavelength bands of light 114 and 120 may be defined as being identical.

Figure 4:
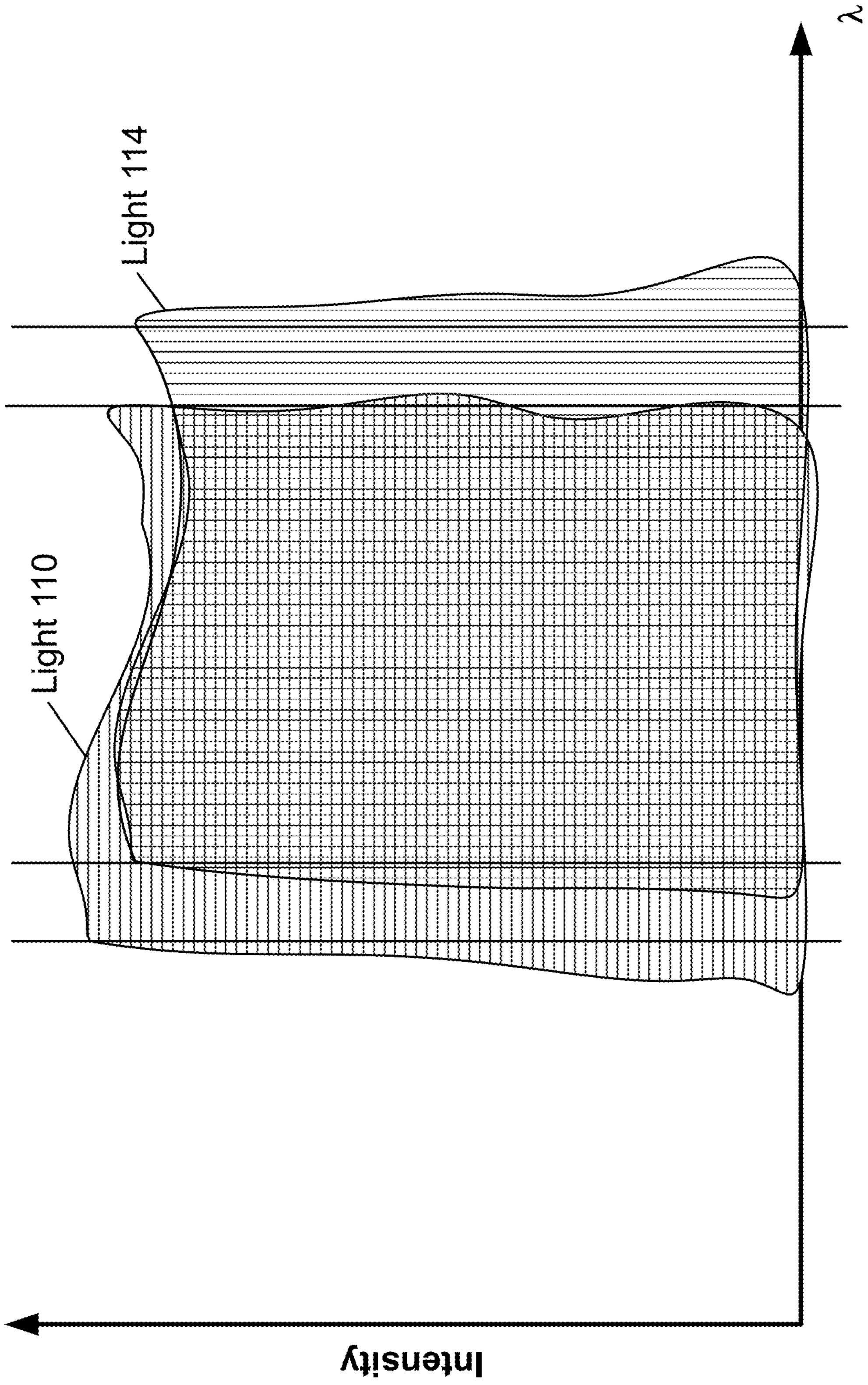
FIG. 4 shows illustrative information in accordance with principles of the invention.

FIG. 4 shows schematically the intensities of colored light 114 and colored light 110. The intensity of colored light 110 may be greater than the intensity of colored light 114. The diminished intensity of colored light 114 may be the result of scattering in light-transmitting body 104. The wavelength range of colored light 114 may be shifted relative to the wavelength range of colored light 110. The shift may be the result of refraction in light-transmitting body 104.

Figure 5:
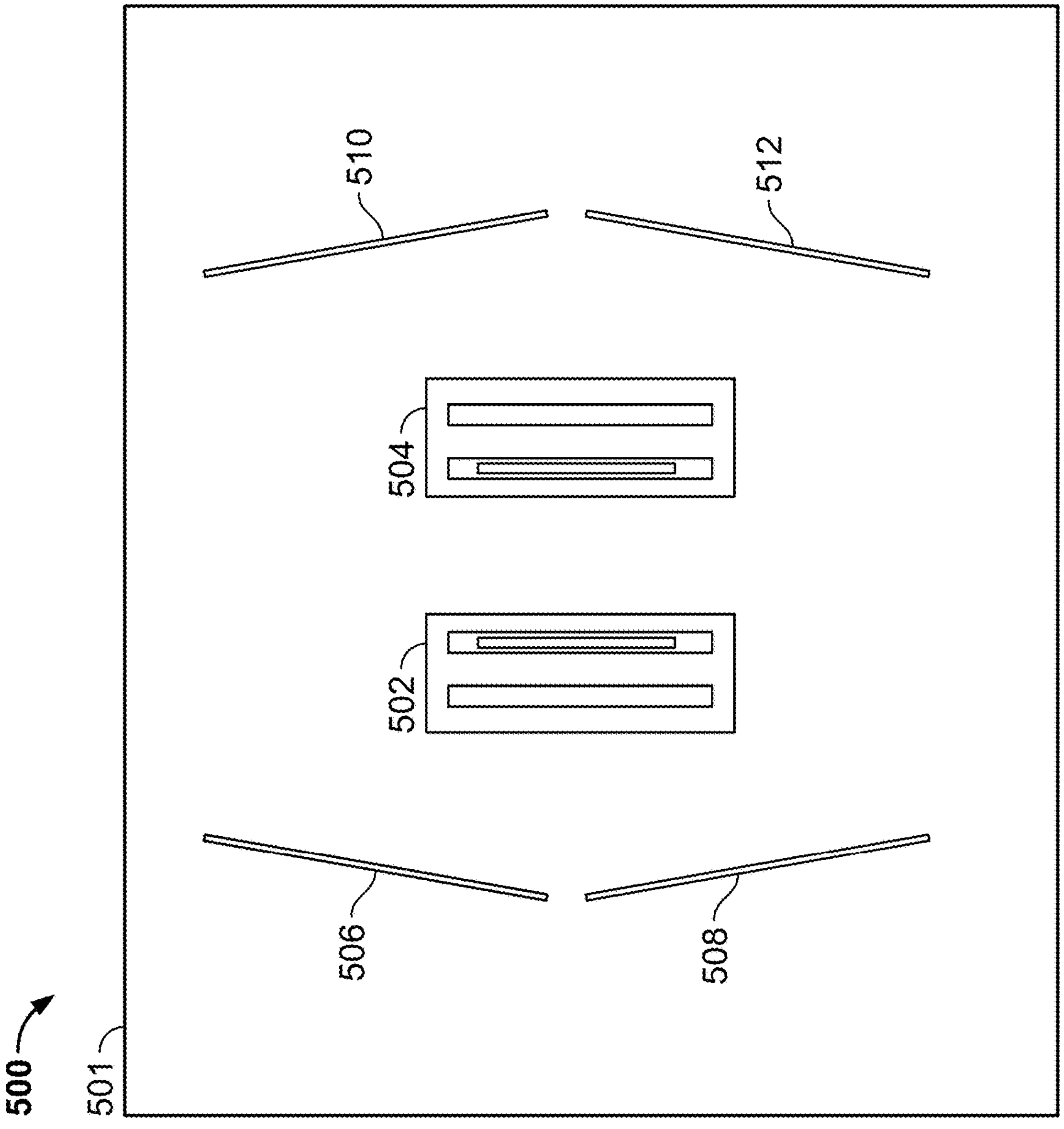
FIG. 5 shows schematically illustrative apparatus in accordance with principles of the invention.

FIG. 5 shows illustrative fixture 500. Illustrative fixture 500 may include frame 501. Illustrative fixture 500 may include projectors 502 and 504. Illustrative fixture 500 may include light-transmitting bodies 506, 508, 510 and 512. Projectors 502 and 504 may have one or more features in common with projector 102. Light-transmitting bodies 506, 508, 510 and 512 may have one or more features in common with light-transmitting body 104.

Figure 6:
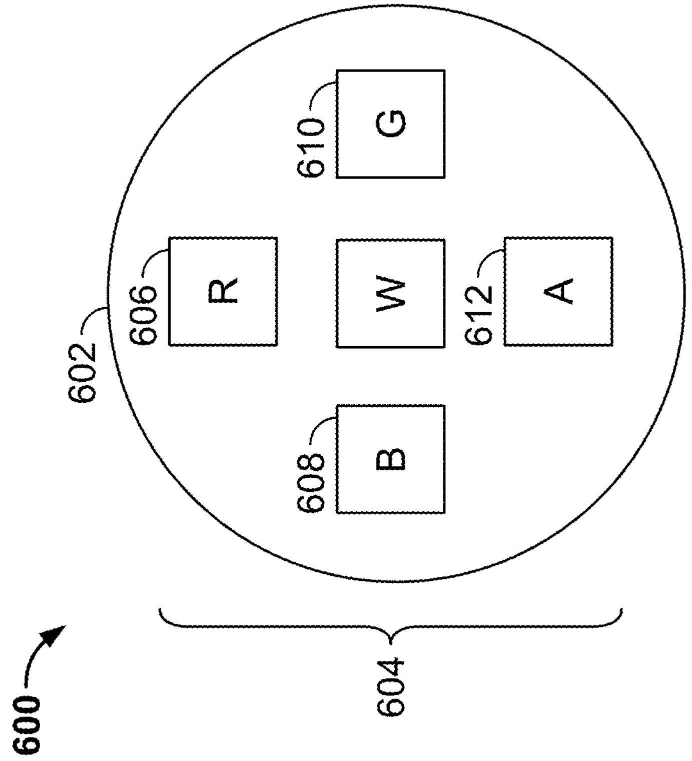
FIG. 6 shows schematically illustrative apparatus in accordance with principles of the invention.

FIG. 6 shows schematically illustrative LED board 600. Board 600 may be disposed in a light source such as 106. Board 600 may have one or more features in common with LED board 132. Board 600 may include LED holder 602. Board 600 may include one or more LEDs 604. LEDs 604 may include red LED 606 ("R"). LEDs 604 may include blue LED 608 ("B"). LEDs 604 may include green LED 610 ("G"). LEDs 604 may include amber LED 612 ("A"). LEDs 604 may include white LED 614 ("W"). LEDs 604 may define a pattern. Board 600 may include other LEDs arranged in the pattern. Board 600 may include other LEDs arranged in a different pattern.

Figure 7:
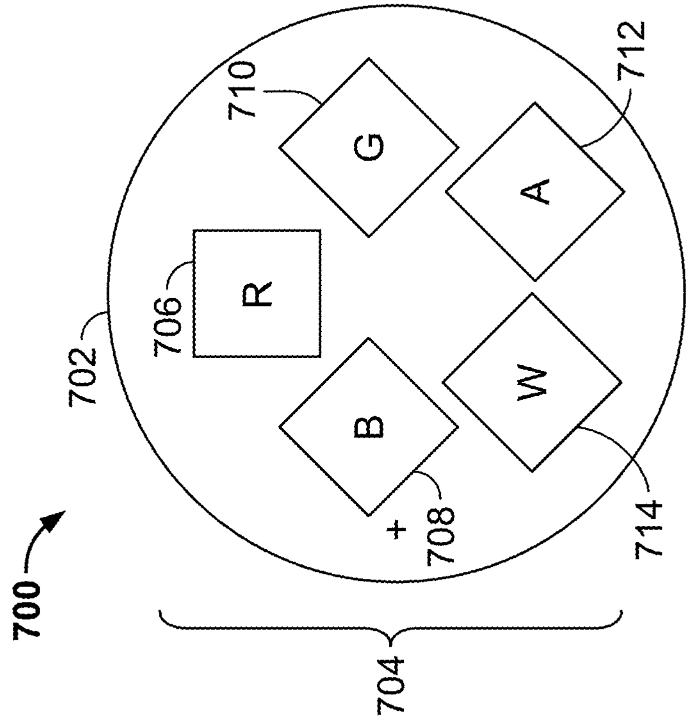
FIG. 7 shows schematically illustrative apparatus in accordance with principles of the invention.

FIG. 7 shows schematically illustrative LED board 700. Board 700 may be disposed in a light source such as 106. Board 700 may have one or more features in common with LED board 132. Board 700 may include LED holder 702. Board 700 may include one or more LEDs 704. LEDs 704 may be arranged in a pattern that is different from the pattern in which LEDs 604 are arranged. LEDs 704 may include red LED 706 ("R"). LEDs 704 may include blue LED 708 ("B"). LEDs 704 may include green LED 710 ("G"). LEDs 704 may include amber LED 712 ("A"). LEDs 704 may include white LED 714 ("W"). LEDs 704 may define a pattern. Board 700 may include other LEDs arranged in the pattern. Board 700 may include other LEDs arranged in a different pattern.

Figure 8:
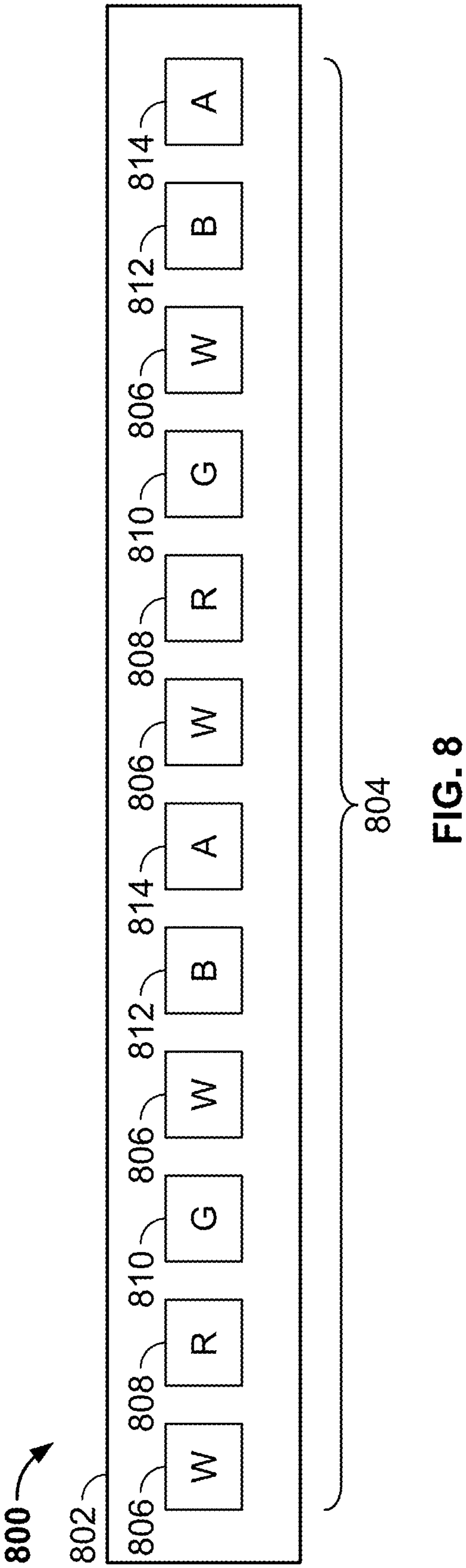
FIG. 8 shows schematically illustrative apparatus in accordance with principles of the invention.

FIG. 8 shows schematically illustrative LED board 800. Board 800 may be disposed in a light source such as 106. Board 800 may have one or more features in common with LED board 132. Board 800 may include LED holder 802. Board 800 may include one or more LEDs 804.

LEDs 804 may include white LEDs 806 ("W"). LEDs 804 may include red LED 808 ("R"). LEDs 804 may include green LEDs 810 ("G"). LEDs 804 may include blue LEDs 812 ("B"). LEDs 804 may include amber LEDs 814 ("A").

LEDs 804 may define a pattern. Board 800 may include other LEDs arranged in the pattern. Board 800 may include LEDs arranged in a different pattern. A pattern may be sequentially repeated.

Figure 9:
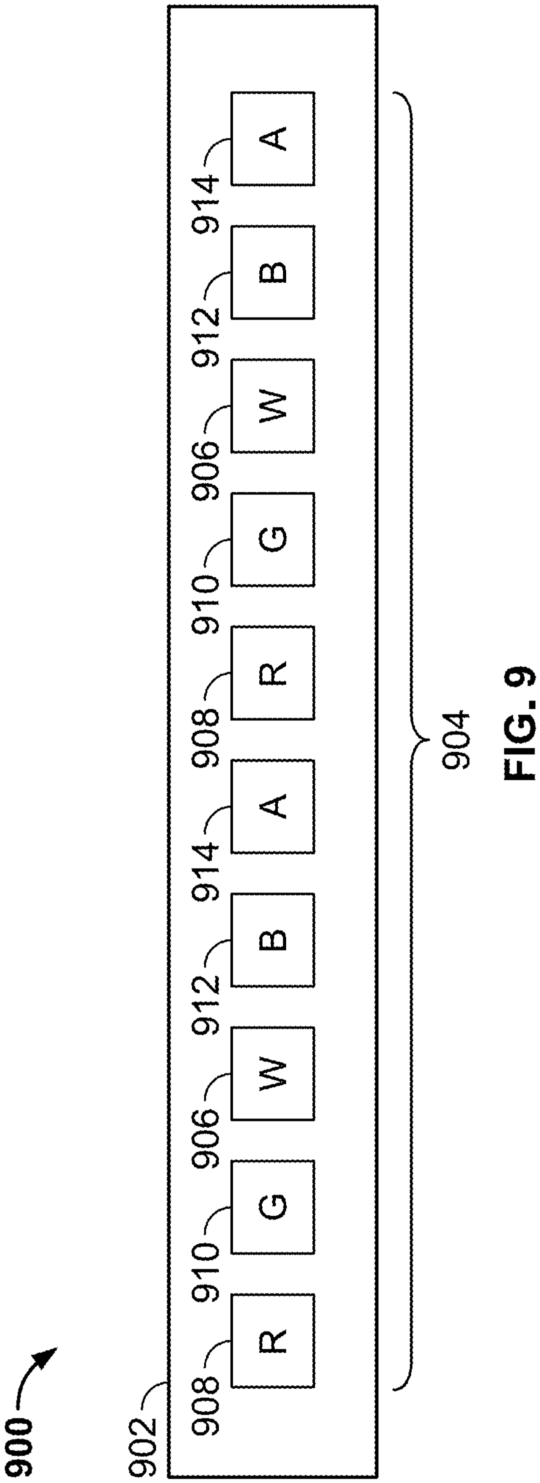
FIG. 9 shows schematically illustrative apparatus in accordance with principles of the invention.

FIG. 9 shows schematically illustrative LED board 900. Board 900 may be disposed in a light source such as 106. Board 900 may have one or more features in common with LED board 132. Board 900 may include LED holder 902. Board 900 may include one or more LEDs 904. LEDs 904 may be arranged in a pattern that is different from the pattern in which LEDs 804 are arranged.

LEDs 904 may include white LEDs 906 ("W"). LEDs 904 may include red LED 908 ("R"). LEDs 904 may include green LEDs 910 ("G"). LEDs 904 may include blue LEDs 912 ("B"). LEDs 904 may include amber LEDs 914 ("A").

LEDs 904 may define a pattern. Board 900 may include other LEDs arranged in the pattern. Board 900 may include LEDs arranged in a different pattern. A pattern may be sequentially repeated.

Figure 10:
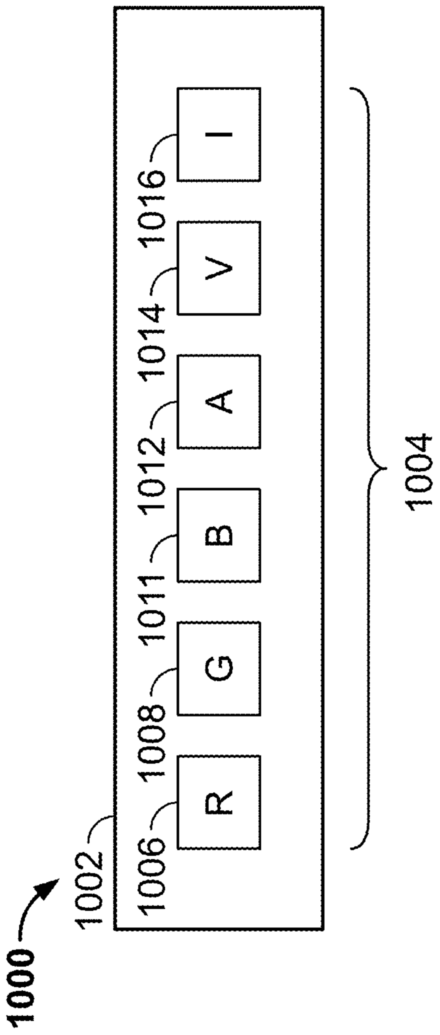
FIG. 10 shows schematically illustrative apparatus in accordance with principles of the invention.

FIG. 10 shows schematically illustrative LED board 1000. Board 1000 may be disposed in a light source such as 106. Board 1000 may have one or more features in common with LED board 132. Board 1000 may include LED holder 1002. Board 1000 may include one or more LEDs 1004.

LEDs 1004 may include red LED 1006 ("R"). LEDs 1004 may include green LED 1008 ("G"). LEDs 1004 may include blue LED 1011 ("B"). LEDs 1004 may include amber LED 1012 ("A"). LEDs 1004 may include violet LED 1014 ("V"). LEDs 1004 may include indigo LED 1016 ("I").

LEDs 1004 may define a pattern. Board 1000 may include other LEDs arranged in the pattern. Board 1000 may include LEDs arranged in a different pattern. A pattern may be sequentially repeated.

Figure 11:
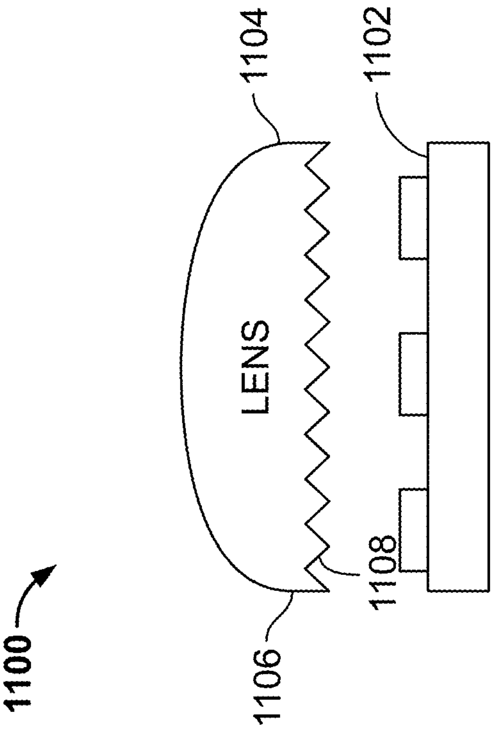
FIG. 11 shows schematically illustrative apparatus in accordance with principles of the invention.

FIG. 11 shows illustrative arrangement 1100 of a projector such as 112. Arrangement 1100 may include LED board 1102. LED board 1102 may be disposed in a light source such as 116. Board 1102 may have one or more features in common with LED board 132. Arrangement 1102 may include lens 1104. Lens 1104 may have one or more features in common with optics 108. Arrangement 1102 may include diffuser 1106 for diffusing light from LED board 1102 before the light enters lens 1104. Diffuser 1106 may have one or more features in common with optics 108. Diffuser 1106 may include surfaces such as 1108. Surfaces 1108 may include facets. Surfaces 1108 may include irregularly shaped faces. Surfaces 1108 may be of monolithic construction with lens 1104. Surfaces 1108 may be set in a layer of material that is not of monolithic construction with lens 1104.

Figure 12:
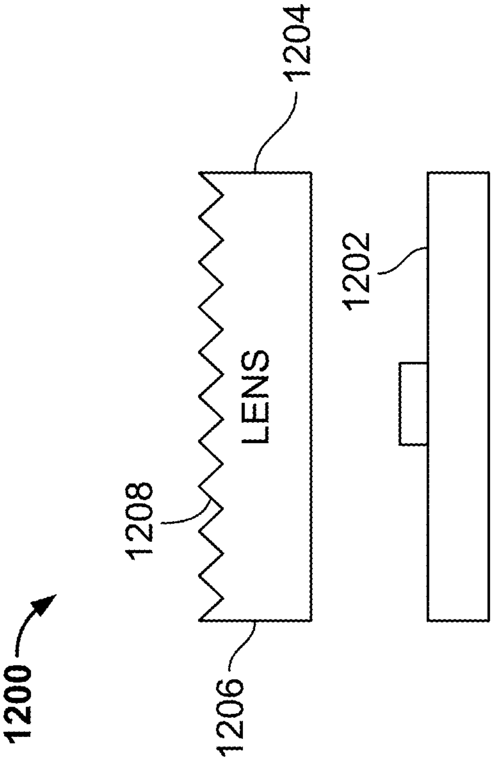
FIG. 12 shows schematically illustrative apparatus in accordance with principles of the invention.

FIG. 12 shows illustrative arrangement 1200 of a projector such as 122. Arrangement 1200 may include LED board 1202. LED board 1202 may be disposed in a light source such as 126. Board 1202 may have one or more features in common with LED board 132. Arrangement 1200 may include lens 1204. Lens 1204 may have one or more features in common with optics 108. Arrangement 1200 may include diffuser 1206 for diffusing light from LED board 1202 as the light emerges from lens 1104. Diffuser 1206 may have one or more features in common with optics 108. Diffuser 1206 may include surfaces such as 1208. Surfaces 1208 may include facets. Surfaces 1208 may include irregularly shaped faces. Facets 1208 may be of monolithic construction with lens 1204. Facets 1208 may be set in a layer of material that is not of monolithic construction with lens 1204.

Figure 13:
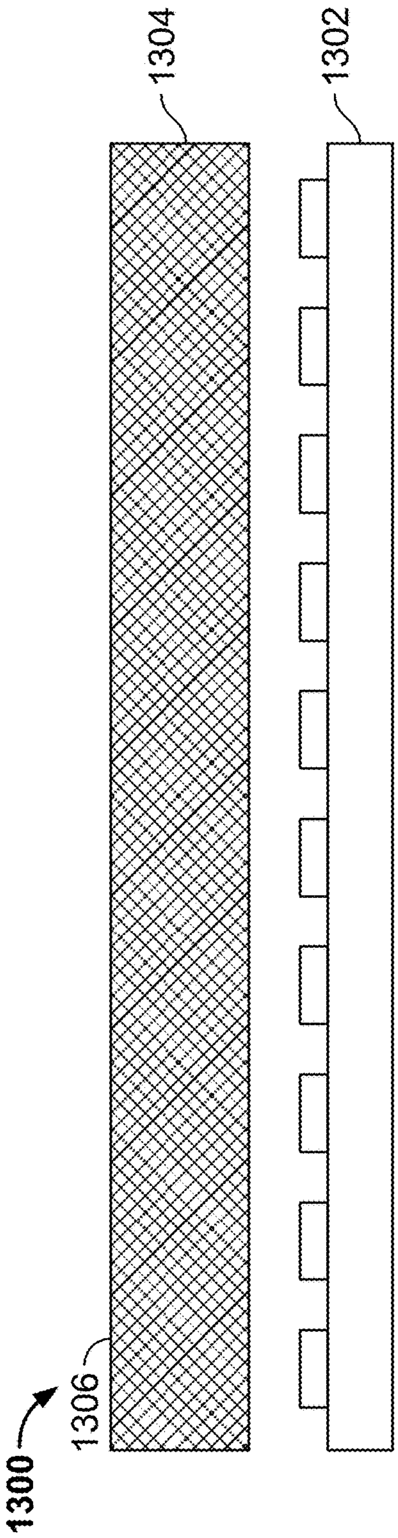
FIG. 13 shows schematically illustrative apparatus in accordance with principles of the invention.

FIG. 13 shows illustrative arrangement 1300 of a projector such as 112. Arrangement 1300 may include LED board 1302. LED board 1302 may be disposed in a light source such as 116. Board 1302 may have one or more features in common with LED board 132. Arrangement 1300 may include lens 1304. Lens 1304 may have one or more features in common with optics 108. Lens 1304 may include in its volume diffusive elements 1306 for diffusing light from LED board 1302 as the light propagates through lens 1304. Diffusive elements 1306 may have one or more features in common with optics 108. Diffusive elements 1306 may include facets. Diffusive elements 1306 may include irregularly shaped faces. Diffusive elements 1306 may be of monolithic construction with lens 1304. Facets may be interlayered within lens 1304.

Figure 14:
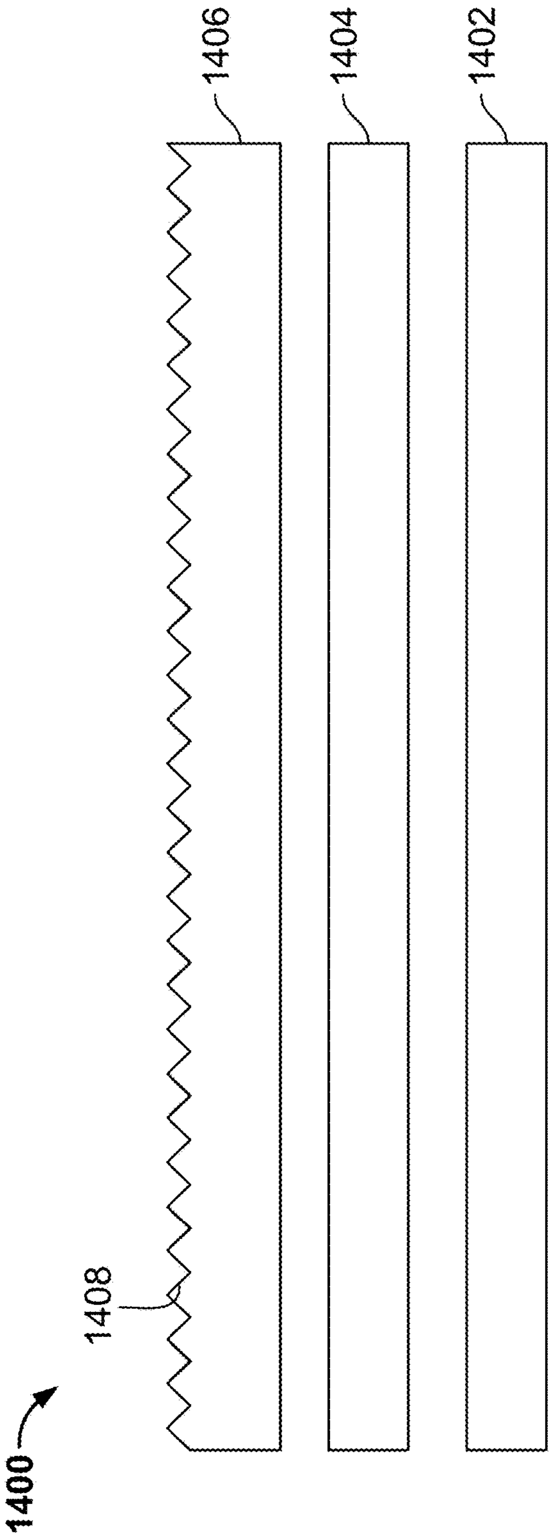
FIG. 14 shows schematically illustrative apparatus in accordance with principles of the invention.

FIG. 14 shows illustrative arrangement 1400 of a projector such as 112. Arrangement 1400 may include LED board 1402. LED board 1402 may be disposed in a light source such as 116. Board 1402 may have one or more features in common with LED board 132. Arrangement 1400 may include dichroic filter 1404. Dichroic filter 1404 may have one or more features in common with optics 108. Arrangement 1400 may include diffuser 1406. Diffuser 1406 may have one or more features in common with optics 108. Diffuser 1406 may diffuse light from LED board 1402 after the light emerges from dichroic filter 1404. Diffuser 1406 may include surfaces such as 1408. Surfaces 1408 may include facets. Surfaces 1408 may include irregularly shaped faces. Surfaces 1408 may be of monolithic construction with diffuser 1406. Surfaces 1408 may be set in a layer of material that is not of monolithic construction with diffuser 1406. Diffuser 1406 may be disposed between board 1402 and dichroic filter 1404.

Figure 15:
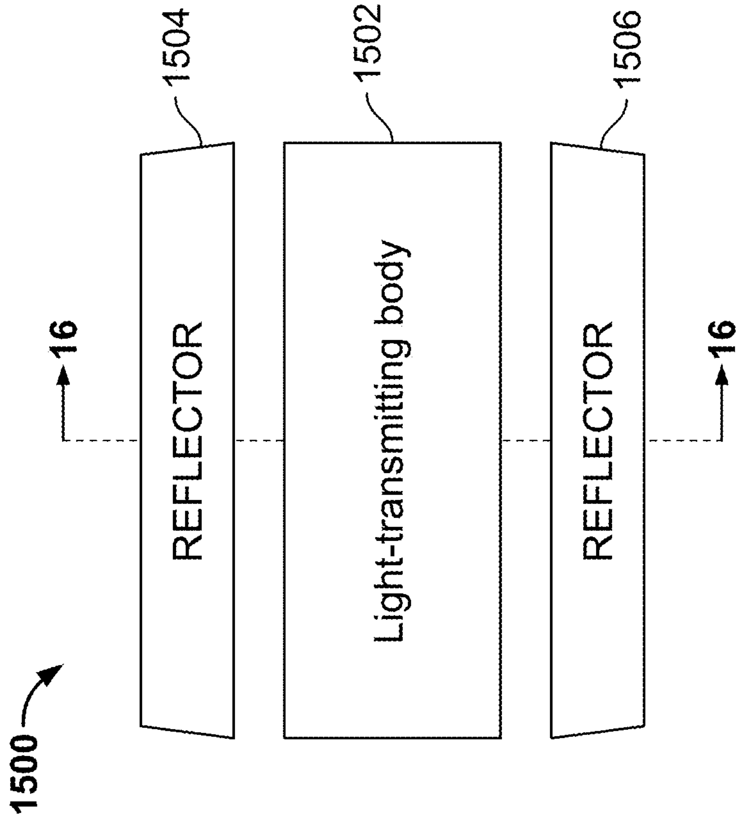
FIG. 15 shows schematically illustrative apparatus in accordance with principles of the invention.

FIG. 15 shows illustrative arrangement 1500. Arrangement 1500 may include a projector (not shown) such as 112. Arrangement 1500 may include light-transmitting body 1502. Light-transmitting body 1502 may have one or more features in common with light-transmitting body 114. Arrangement 1500 may include reflector 1504. Arrangement 1500 may include reflector 1506. One or both of reflectors 1504 and 1506 may have one or more features in common with one or more of reflectors 122, 124, 126, 128 and 130.

Figure 16:
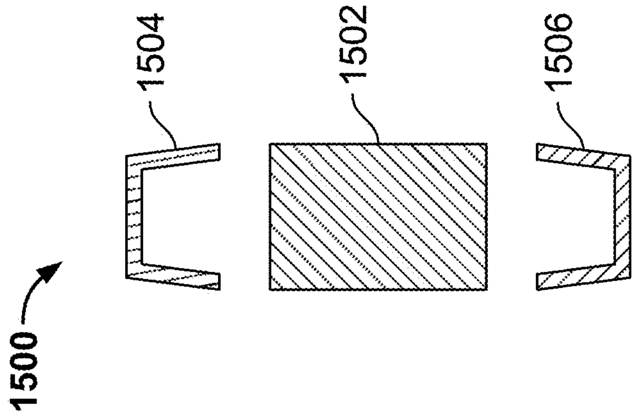
FIG. 16 is a view corresponding to that taken along lines 16-16 of FIG. 15.

FIG. 16 shows arrangement 1500 as if viewed along view lines 16-16 (shown in FIG. 15).

Figure 17:
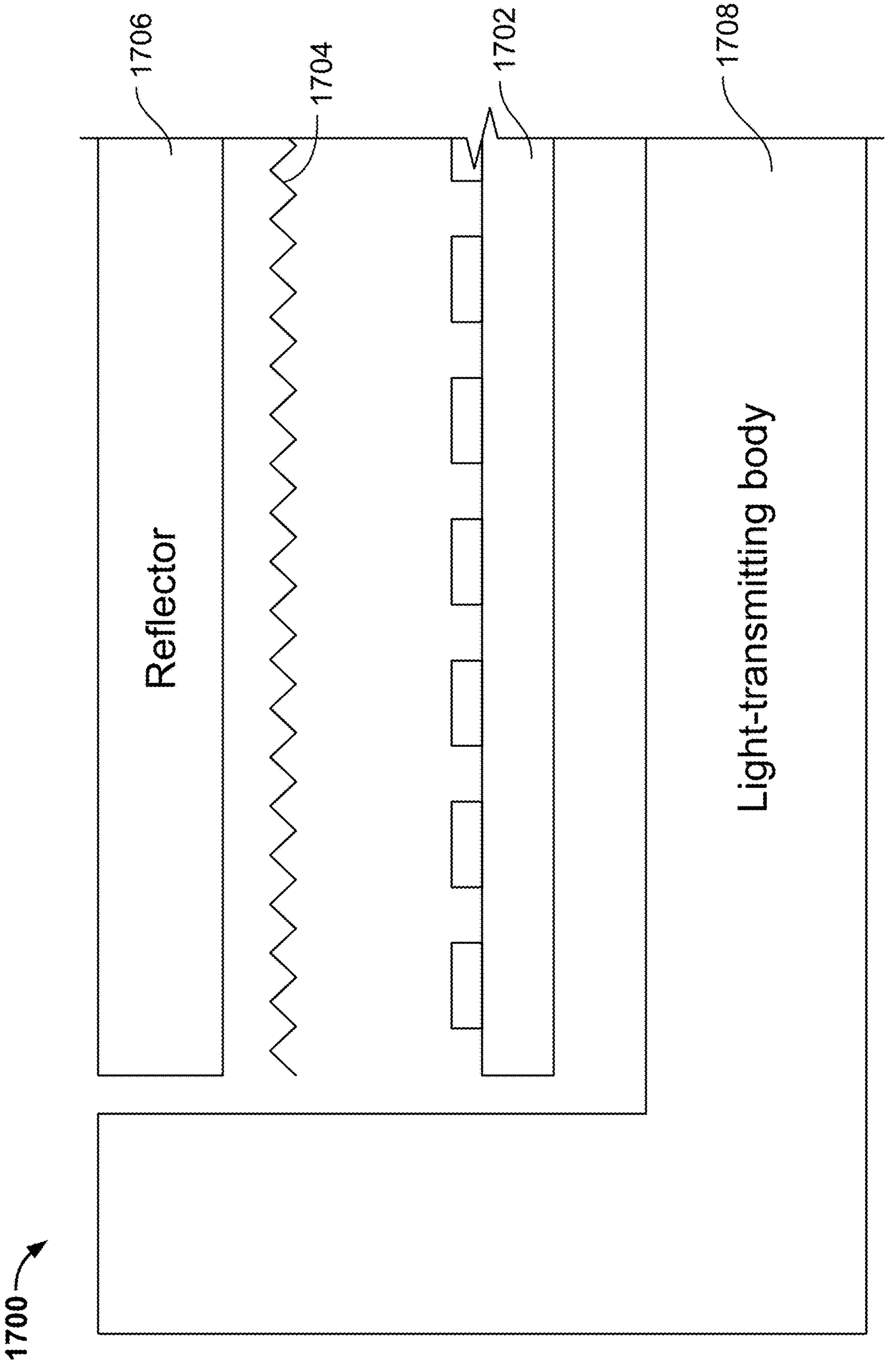
FIG. 17 shows schematically illustrative apparatus in accordance with principles of the invention.

FIG. 17 shows illustrative backlighting arrangement 1700. Arrangement 1700 may include LED board 1702. Board 1702 may be disposed in a light source such as 116. Board 1702 may have one or more features in common with LED board 132.

Arrangement 1700 may include diffusing element 1704. Diffusing element 1704 may have one or more features in common with optics 108. Arrangement 1700 may include reflector 1706. Reflector 1706 may have one or more features in common with one or more of reflectors 122, 124, 126, 128 and 130. Arrangement 1700 may include light-transmitting body 1708. Board 1702 may be opaque to light emitted from board 1702. Thus, light from board 1702 may be blocked from direct radiation to light-transmitting body 1708. Reflector 1706 may be part of or embodied as a light fixture back plate.

Figure 18:
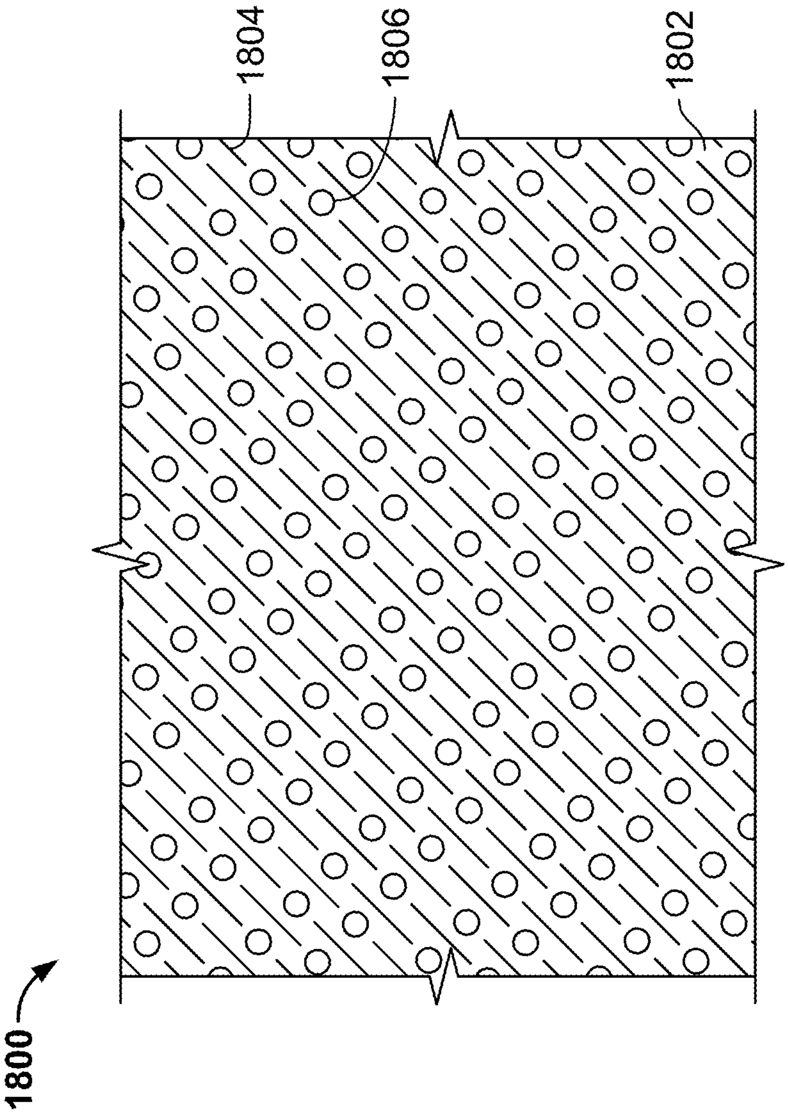
FIG. 18 shows schematically illustrative apparatus in accordance with principles of the invention.

FIG. 18 shows illustrative diffusive structure 1800. Structure 1800 may have one or more features in common with optics 108. Structure 1800 may include solid 1802. Solid 1802 may have a high thermal diffusivity. Solid 1802 may be configured as a heat sink. Structure 1800 may include slits such as slit 1804. Structure 1800 may include perforations such as perforation 1806. Solid 1802 may be translucent. Solid 1802 may have diffusive properties. Slits 1804 may have diffractive properties. Perforations 1806 may permit un-diffused light to propagate through structure 1800.

Figure 19:
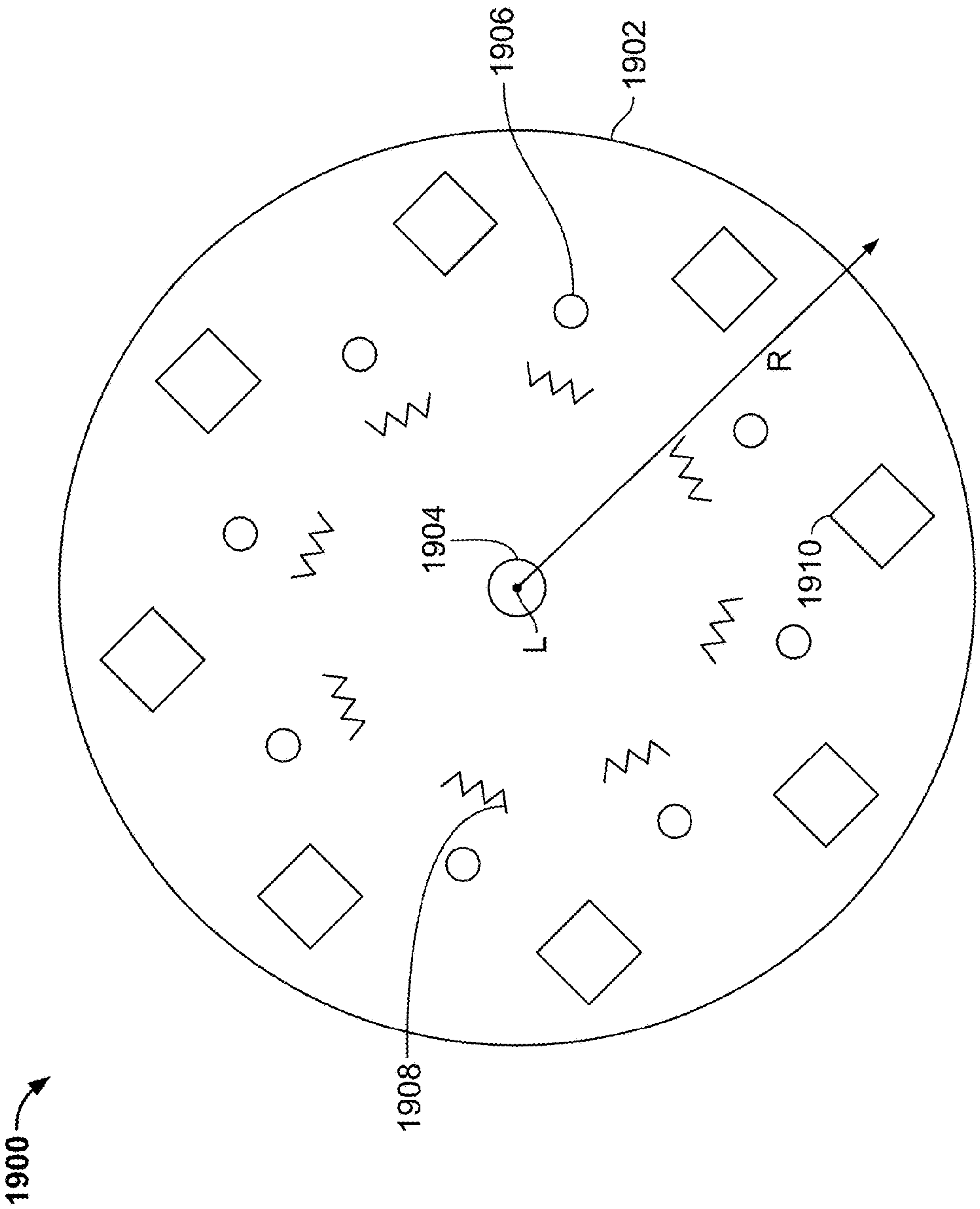
FIG. 19 shows schematically illustrative apparatus in accordance with principles of the invention.

FIG. 19 shows illustrative fixture 1900. Fixture 1900 may include support 1902. Support 1902 may include stem 1904. Stem 1904 may define vertical axis L. Stem 1904 may define radial direction R. Fixture 1900 may include one or more LED boards such as 1906. Boards 1906 may be disposed in a light source such as 116. Boards 1906 may have one or more features in common with LED board 132. Fixture 1900 may include one or more reflectors 1908. Reflectors 1908 may have one or more features in common with one or more of reflectors 122, 124, 126, 128 and 130. Reflectors 1908 may be disposed radially inward from boards 1906. Fixture 1900 may include one or more light-transmitting bodies 1910. Light-transmitting bodies 1910 may be disposed radially inward from boards 1906.

Figure 20:
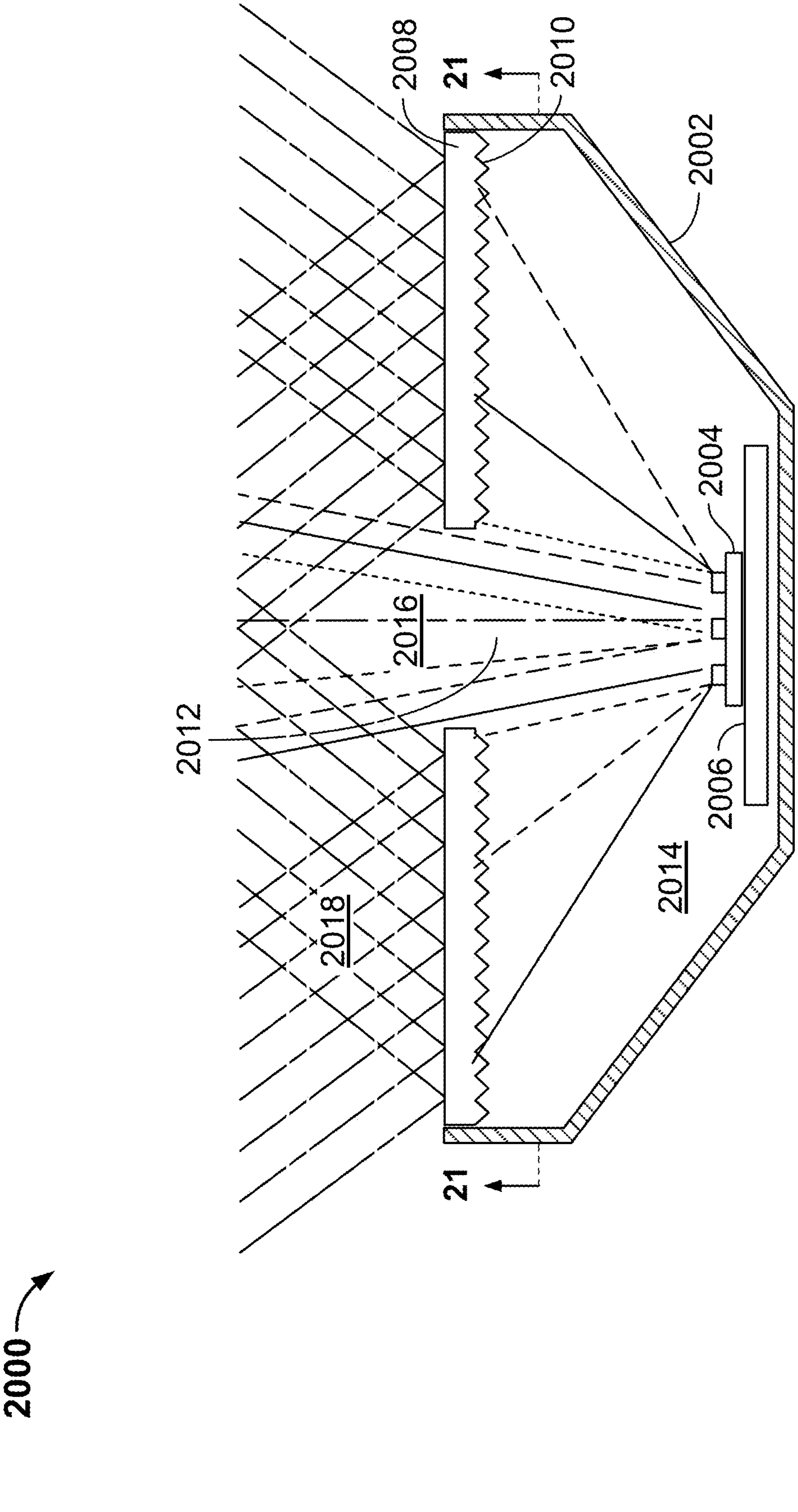
FIG. 20 shows schematically illustrative apparatus in accordance with principles of the invention.

FIG. 20 shows schematically illustrative projector 2000. Projector 2000 may have one or more features in common with projector 102. Projector 2000 may include lamp body 2002. Lamp body 2002 may include a reflector. The reflector may have one or more features in common with one or more of reflectors 122, 124, 126, 128 and 130. Projector 2000 may include LED board 2004. LED board 2004 may have one or more features in common with LED board 132. Projector 2000 may include heat sink 2006. Projector 2000 may include diffusive element 2008. Diffusive element 2008 may have one or more features in common with optics 108. Diffusive element 2008 may include surfaces 2010. Diffusive element 2008 may include aperture 2012. Aperture 2012 may be covered by a lens (not shown). Diffusive element 2008 may have one or more features in common with lens 1104. Diffusive element 2008 may have one or more features in common with lens 1204.

LEDs on LED board 2004 may emit light 2014. Light 2014 may include light of multiple different colors (represented by different line types). The light may be coherent light. Light 2014 may propagate through aperture 2012. Light 2016 may propagate above aperture 2012. Light 2016 may include light 2014. If a lens is present in aperture 2012, light 2016 may include a refraction of light 2014.

Diffusive element 2008 may mix light 2014 and light 2016 to produce light 2018. Light 2016 may correspond to light 110. Light 2018 may correspond to light 120.

Figure 21:
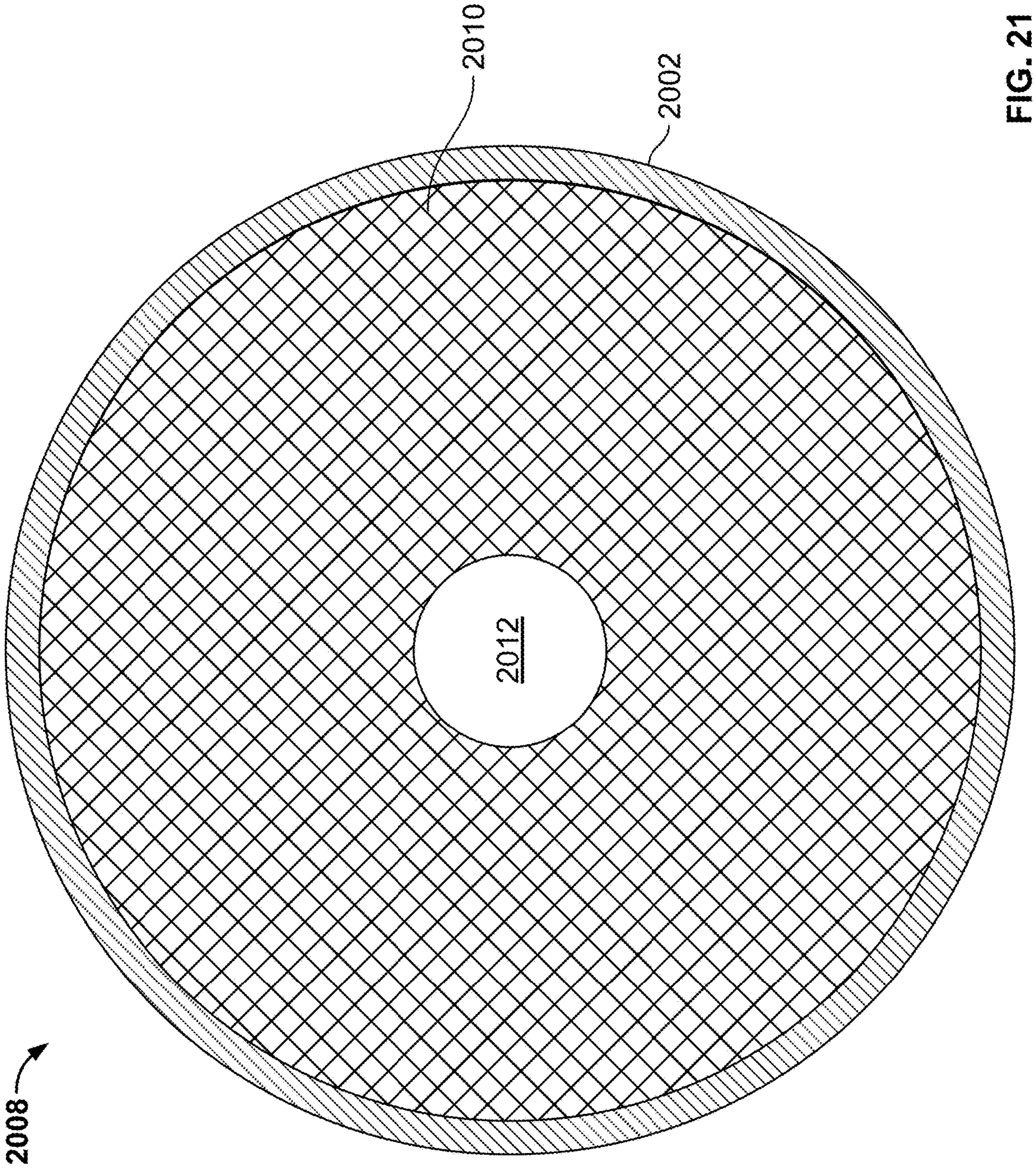
FIG. 21 is a view corresponding to a partial cross-sectional view taken along lines 21-21 of FIG. 20.

FIG. 21 shows schematically diffusive element 2008 as viewed along lines 21-21 in FIG. 20.

Figure 22:
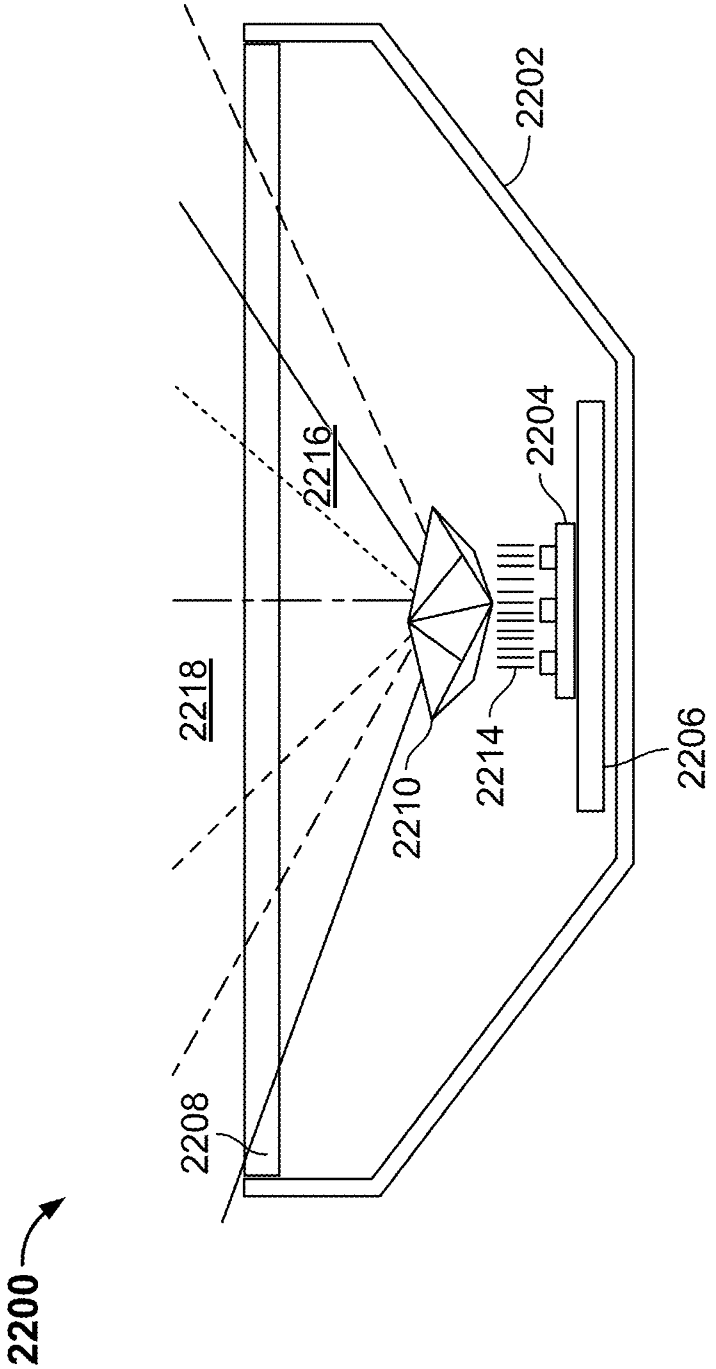
FIG. 22 shows schematically illustrative apparatus in accordance with principles of the invention.

FIG. 22 shows schematically illustrative projector 2200. Projector 2200 may have one or more features in common with projector 102. Projector 2200 may include lamp body 2202. Lamp body 2202 may include a reflector. The reflector may have one or more features in common with one or more of reflectors 122, 124, 126, 128 and 130. Projector 2200 may include LED board 2204. LED board 2204 may have one or more features in common with LED board 132. Projector 2200 may include heat sink 2206. Projector 2200 may include diffusive element 2208. Diffusive element 2208 may be clear. Diffuser 2208 may have one or more features in common with optics 108.

Projector 2200 may include lens 2210. Lens 2210 may have diffusive properties. Lens 2210 may have refractive properties. Lens 2210 may have one or more features in common with optics 108.

LEDs on LED board 2204 may emit light 2214. Light 2214 may include white light. Light 2214 may include incoherent light. Light 2216 may include colored light (represented by different line types) that results from refraction of light 2214 through lens 2210. Light 2218 may propagate above diffusive element 2208. Light 2218 may include light 2216. Light 2218 may include a refraction of light 2014.

Light 2218 may correspond to light 120. White light corresponding to light 112 may be provided by light 2214 that propagates through lens 2210, but is not separated into colored light. White light corresponding to light 112 may be provided by light 2214 that propagates around lens 2210. White light corresponding to light 112 may be provided by a light source that is separate from light 2214. The separate light source may be disposed in projector 2200. The separate light source may be disposed outside of projector 2200.

Figure 23:
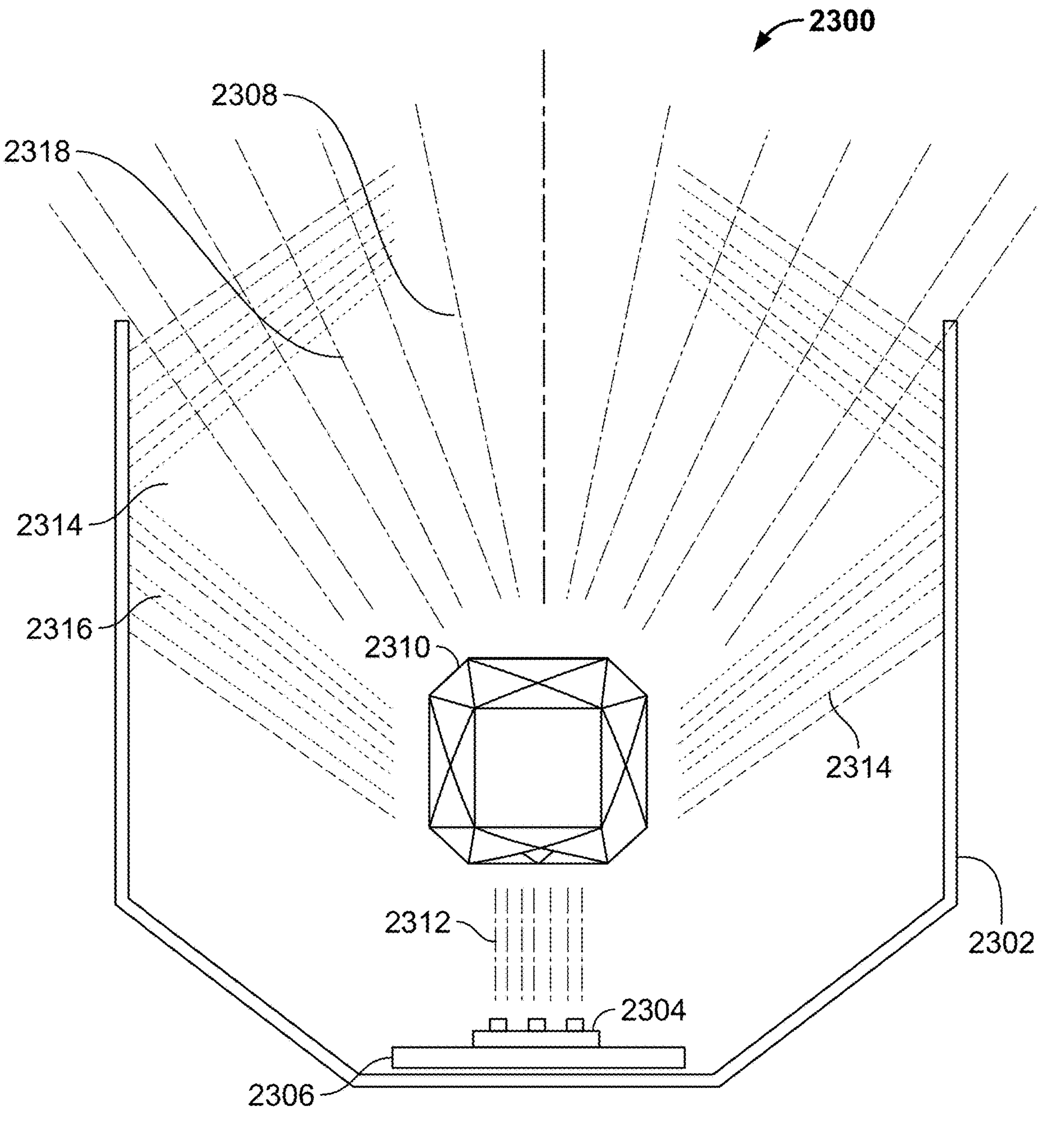
FIG. 23 shows schematically illustrative apparatus in accordance with principles of the invention.

FIG. 23 shows schematically illustrative projector 2300. Projector 2300 may have one or more features in common with projector 102. Projector 2300 may include lamp body 2302. Lamp body 2302 may include a reflector. The reflector may have one or more features in common with one or more of reflectors 122, 124, 126, 128 and 130. Projector 2300 may include LED board 2304. LED board 2304 may have one or more features in common with LED board 132. Projector 2300 may include heat sink 2306. Projector 2300 may include aperture 2308. Projector 2300 may include a diffusive element (not shown) in aperture 2308. The diffusive element may be clear.

Projector 2300 may include lens 2310. Lens 2310 may have diffusive properties. Lens 2310 may have refractive properties. Lens 2310 may have one or more features in common with optics 108.

LEDs on LED board 2304 may emit light 2312. Light 2312 may include white light. Light 2312 may include incoherent light.

Light 2314 may include colored light 2316 (represented by different line types). Colored light 2316 may result from separation of light 2312 by lens 2310.

Light 2314 may include white light 2318. White light 2318 may result from light 2312 that passes through lens 2310, but does not separate into colored light.

Light 2316 may correspond to light 110. Light 2318 may correspond to light 112.

Light 2316 may reflect off lamp body 2302 before exiting through aperture 2308. Light 2318 may reflect off lamp body 2302 before exiting through aperture 2308.

Light 2316 may reflect off lamp body 2302 and a surface of lens 2310 before exiting through aperture 2308. Light 2318 may reflect off lamp body 2302 and a surface of lens 2310 before exiting through aperture 2308.

Figure 24:
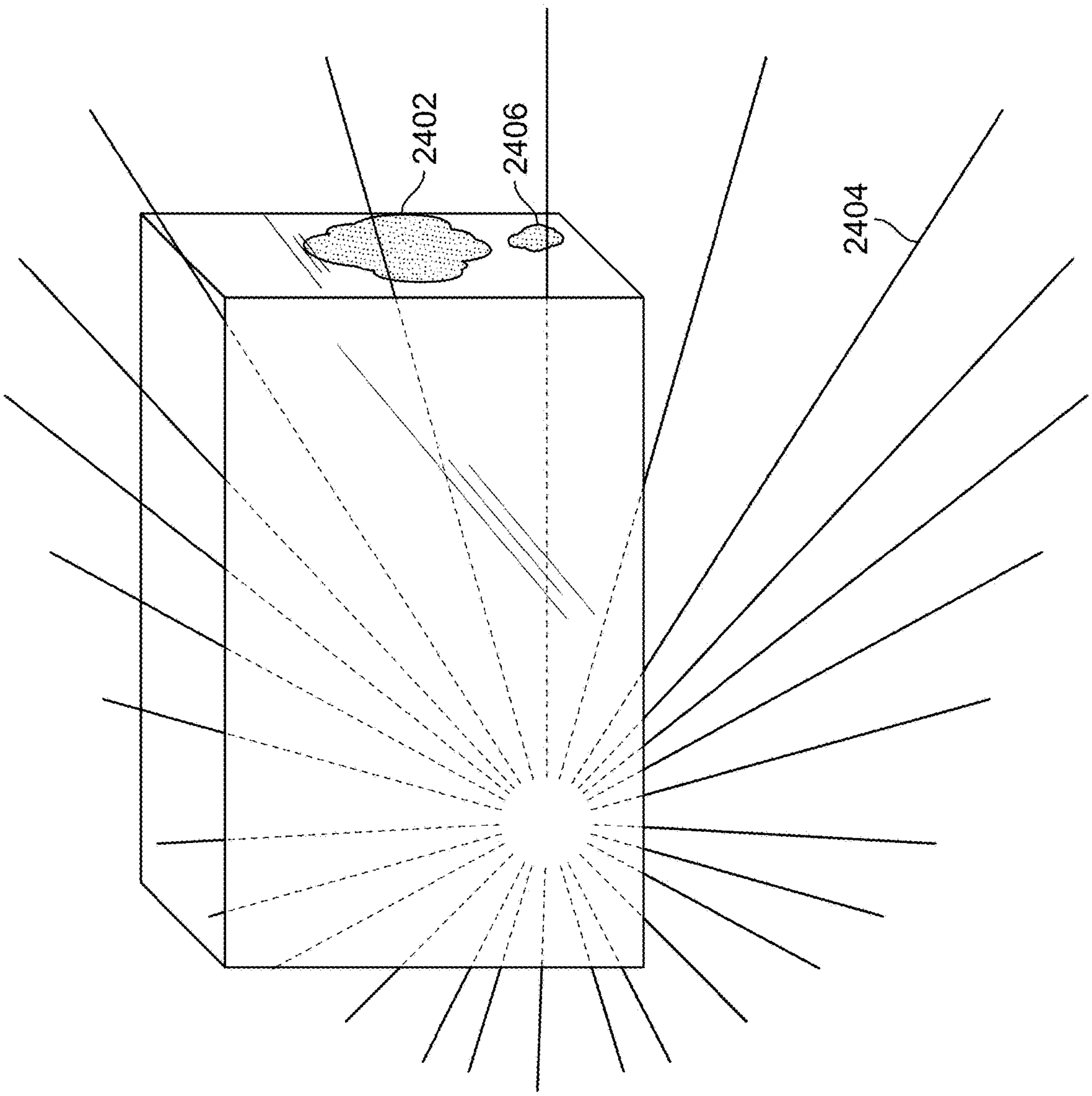
FIG. 24 shows schematically illustrative apparatus in accordance with principles of the invention.

FIG. 24 shows schematically illustrative decorative light-transmitting body 2400. Light-transmitting body 2400 may have one or more features in common with light-transmitting body 104. A projector (not shown) may provide light such as light 110 and light 112 to light-transmitting body 2400. Light 2402 may emerge from light-transmitting body 2400. Light 2404 may emerge from light-transmitting body 2400. Light 2406 may emerge from light-transmitting body 2400.

Light 2402 may correspond to light 114. Light 2404 may correspond to light 118. Light 2406 may correspond to light 120.

FIG. A24 shows schematically illustrative LED light source A2400. Illustrative light source A2400 may have one or more features in common with light source 106. Light source A2400 may include an array of LEDs. The array may be one-dimensional (e.g., along an axis y). The array may be two-dimensional (which may include a 2-D array on a curved surface; along axes x and y, not shown). Each of the LEDs may emit a beam of light. The beam may have an axis $L_{i,j}$, where i indicates a logical column in the array and j indicates a logical row in the array. The light may define an intensity field. The intensity field may have high values at axes $L_{i,j}$. The intensity field may have low values between $L_{i,j}$. The highs and lows may define a variation in intensity across the field. The variation may be quantified as an amplitude.

Illustrative light source A2400 may include LED strips such as A2402. Each of the strips may include one or more LEDs such as A2404. One or more of the LEDs may be a chip-on-board ("COB") LED. LED A2404 may emit a beam of light. The beam may have axis $L_{1,2}$ (coming out of the page), which may be one of numerous $L_{i,j}$ axes corresponding to other LEDs in light source A2404. The LEDs may be arranged with a uniform center-to-center distance. The LEDs may be arranged with a non-uniform center-to-center distance. The center-to-center distance in the y-direction is "a." The LEDs may be arranged with a uniform separation. The LEDs may be arranged with a non-uniform separation. The separation in the y-direction may be "b." "f" may indicate a center-to-center distance between adjacent strips, such as A2406 and A2408. "g" may represent an LED "cell," the center-to-center distance in the y-direction between gaps between the LEDs. "h" may be an LED diameter.

Table 6 lists illustrative ranges which may include a.

TABLE 6

| Illustrative ranges of a. Illustrative ranges of a (mm) | |
|---|---|
| Lower | Upper |
| <4 | 4 |
| 4.5 | 5 |
| 5 | 5.5 |
| 5.5 | 6 |
| 6.5 | 7 |
| 7.5 | 8 |
| 8 | 8.5 |
| 8.5 | 9 |
| 9.5 | 10 |
| 10 | >10 |
| Other suitable lower limits | Other suitable upper limits |

Table 7 lists illustrative ranges which may include b.

TABLE 7

| Illustrative ranges of b. Illustrative ranges of b (mm) | |
|---|---|
| Lower | Upper |
| 0 | .5 |
| .5 | 1 |
| 1 | 1.5 |
| 1.5 | 2 |
| 2 | 2.5 |
| 2.5 | 3 |
| 3 | 3.5 |
| 3.5 | 4 |
| 4 | 4.5 |
| 4.5 | 5 |
| 5 | 5.5 |
| 5.5 | 6 |
| 6.5 | 7 |
| 7.5 | 8 |
| 8 | 8.5 |
| 8.5 | 9 |
| 9.5 | 10 |
| 10 | >10 |
| Other suitable lower limits | Other suitable upper limits |

Table 8 lists illustrative ranges which may include f.

TABLE 8

| Illustrative ranges of f. Illustrative ranges of f (mm) | |
|---|---|
| Lower | Upper |
| 0 | .5 |
| .5 | 1 |
| 1 | 1.5 |
| 1.5 | 2 |
| 2 | 2.5 |
| 2.5 | 3 |
| 3 | 3.5 |
| 3.5 | 4 |
| 4 | 4.5 |
| 4.5 | 5 |
| 5 | 5.5 |
| 5.5 | 6 |
| 6.5 | 7 |
| 7.5 | 8 |
| 8 | 8.5 |
| 8.5 | 9 |
| 9.5 | 10 |
| 10 | >10 |
| Other suitable lower limits | Other suitable upper limits |

Table 9 lists illustrative ranges which may include h.

TABLE 9

| Illustrative ranges of h. Illustrative ranges of h (mm) | |
|---|---|
| Lower | Upper |
| <1 | 1 |
| 1 | 1.5 |
| 1.5 | 2 |
| 2 | 2.5 |
| 2.5 | 3 |
| 3 | 3.5 |
| 3.5 | 4 |
| 4 | 4.5 |
| 4.5 | 5 |
| 5 | 5.5 |
| 5.5 | 6 |
| 6.5 | 7 |
| 7.5 | 8 |
| 8 | 8.5 |
| 8.5 | 9 |
| 9.5 | 10 |
| 10 | >10 |
| Other suitable lower limits | Other suitable upper limits |

FIG. 25 shows illustrative grain 2500. Top, elevational and bottom views are shown. Grain 2500 may have a diameter D. Grain 2500 may have a height H. Grain 2500 may have a depth U below girdle G. Grain 2500 may be a grain that has no facets, one facet or more than one facet. Grain 2500 may include crown facets CF. Grain 2500 may include crown break facets CBF. Grain 2500 may include pavilion facets PF. Grain 2500 may include pavilion break facets PBF. Grain 2500 may be a grain that does not include a table. Grain 2500 may include crown pyramid 2506. Grain 2500 may include pavilion pyramid 2508. Grain 2500 may be bi-pyramidal. Grain 2500 may include one or more star, kite, girdle or culet facets.

Crown 2502 may include 3, 4, 5, 6, 7, 8, 9, 10 or any other suitable number of crown facets or crown break facets. Pavilion 2504 may include 3, 4, 5, 6, 7, 8, 9, 10 or any other suitable number of pavilion facets or pavilion break facets. Pavilion facets may be angularly offset from corresponding crown facets by angle $\alpha$. Table 10 lists illustrative ranges of angles that may include $\alpha$.

TABLE 10

| Illustrative values of angle $\alpha$. Illustrative values of angle $\alpha$ (° of arc) | |
|---|---|
| Lower | Upper |
| <11.3 | 11.3 |
| 11.3 | 12 |
| 12 | 12.9 |
| 12.9 | 13.8 |
| 13.8 | 15 |
| 15 | 16.4 |
| 16.4 | 18 |
| 18 | 20 |
| 20 | 22.5 |
| 22.5 | 25.7 |
| 25.7 | 30 |
| 30 | 36 |
| 36 | 45 |
| 45 | 60 |
| 60 | >60 |

TABLE 10-continued

| Illustrative values of angle α. Illustrative values of angle α (° of arc) | |
|---|---|
| Lower | Upper |
| Other suitable lower limits | Other suitable upper limits |

Pyramid angle β may indicate an angle of a crown or pavilion facet relative to axis c. Crown 2502 and pavilion 2504 may have the same pyramid angle. Crown 2502 and pavilion 2504 may have different pyramid angles. The pyramid angle may be 49.8°. Table 11 lists illustrative ranges that may include pyramid angle β.

TABLE 11

| Illustrative values of angle β. Illustrative values of angle β (° of arc) | |
|---|---|
| Lower | Upper |
| >50 | 50 |
| 50 | 49 |
| 49 | 48 |
| 48 | 47 |
| 47 | <47 |
| Other suitable upper limits | Other suitable lower limits |

Table 12 lists illustrative dimensions of grains such as 2500 for different sizes of grain 2500.

TABLE 12

Illustrative dimensions of grain 2500.

| | D | | H | | U | |
|---|---|---|---|---|---|---|
| Size | D (mm) | Tolerance (mm) | H (mm) | Tolerance (mm) | U (mm) | Tolerance (mm) |
| 2.5 | 1.325 | ±0.025 | 0.88 | ±0.08 | 0.57 | ±0.01 |
| 3 | 1.375 | ±0.025 | 0.92 | ±0.09 | 0.59 | ±0.01 |
| 3.5 | 1.45 | ±0.05 | 0.95 | ±0.10 | 0.62 | ±0.02 |
| 4 | 1.55 | ±0.05 | 1.00 | ±0.10 | 0.66 | ±0.02 |
| 4.5 | 1.65 | ±0.05 | 1.10 | ±0.10 | 0.71 | ±0.02 |
| 5 | 1.75 | ±0.05 | 1.15 | ±0.10 | 0.75 | ±0.02 |
| 5.5 | 1.85 | ±0.05 | 1.20 | 10.10 | 0.79 | ±0.02 |
| 6 | 1.95 | ±0.05 | 1.30 | ±0.10 | 0.84 | ±0.02 |
| 6.5 | 2.05 | ±0.05 | 1.35 | ±0.10 | 0.88 | ±0.02 |
| 7 | 2.15 | ±0.05 | 1.40 | ±0.10 | 0.92 | ±0.02 |
| 7.5 | 2.25 | ±0.05 | 1.50 | ±0.10 | 0.96 | ±0.02 |
| 8 | 2.35 | ±0.05 | 1.55 | ±0.10 | 1.01 | ±0.02 |
| 8.5 | 2.45 | ±0.05 | 1.60 | ±0.10 | 1.05 | ±0.02 |
| 9 | 2.55 | ±0.05 | 1.70 | ±0.10 | 1.09 | ±0.02 |
| 9.5 | 2.65 | ±0.05 | 1.75 | ±0.10 | 1.14 | ±0.02 |
| 10 | 2.75 | ±0.05 | 1.80 | ±0.10 | 1.18 | ±0.02 |
| 11 | 2.85 | ±0.05 | 1.90 | ±0.10 | 1.22 | ±0.02 |
| 11.5 | 2.95 | ±0.05 | 1.95 | ±0.10 | 1.27 | ±0.02 |
| 12 | 3.10 | ±0.10 | 2.03 | ±0.13 | 1.33 | ±0.04 |
| 13 | 3.25 | ±0.05 | 2.15 | ±0.10 | 1.39 | ±0.02 |
| 13.5 | 3.35 | ±0.05 | 2.20 | ±0.10 | 1.44 | ±0.02 |
| 14 | 3.45 | ±0.05 | 2.25 | ±0.10 | 1.48 | ±0.02 |
| 14.5 | 3.55 | ±0.05 | 2.35 | ±0.10 | 1.52 | ±0.02 |
| 15 | 3.65 | ±0.05 | 2.40 | ±0.10 | 1.57 | ±0.02 |
| 15.5 | 3.75 | ±0.05 | 2.45 | ±0.10 | 1.61 | ±0.02 |
| 16 | 3.90 | ±0.10 | 2.55 | ±0.15 | 1.67 | ±0.04 |
| 17 | 4.10 | ±0.10 | 2.70 | ±0.15 | 1.76 | ±0.04 |
| 18 | 4.30 | ±0.10 | 2.85 | ±0.15 | 1.85 | ±0.04 |

TABLE 12-continued

Illustrative dimensions of grain 2500.

| | D | | H | | U | |
|---|---|---|---|---|---|---|
| Size | D (mm) | Tolerance (mm) | H (mm) | Tolerance (mm) | U (mm) | Tolerance (mm) |
| 19 | 4.50 | ±10.10 | 2.95 | ±0.15 | 1.93 | ±0.04 |
| 20 | 4.70 | ±0.10 | 3.10 | ±0.15 | 2.02 | ±0.04 |
| 21 | 4.85 | ±0.05 | 3.20 | ±0.15 | 2.08 | ±0.02 |
| 22 | 5.00 | ±0.10 | 3.30 | ±0.15 | 2.15 | ±0.04 |
| 23 | 5.175 | ±0.75 | 3.40 | ±0.15 | 2.22 | ±0.03 |
| 24 | 5.35 | ±0.10 | 3.50 | ±0.15 | 2.30 | ±0.04 |
| 25 | 5.525 | ±0.75 | 3.65 | ±0.15 | 2.37 | ±0.03 |
| 26 | 5.70 | ±0.10 | 3.75 | ±0.15 | 2.45 | ±0.04 |
| 27 | 5.90 | ±0.10 | 3.90 | ±0.15 | 2.53 | ±0.04 |
| 28 | 6.75 | ±0.75 | 4.00 | ±0.15 | 2.61 | ±0.03 |
| 29 | 6.25 | ±0.10 | 4.10 | ±0.15 | 2.68 | ±0.04 |
| 30 | 6.425 | ±0.75 | 4.20 | ±0.15 | 2.76 | ±0.03 |

The grains may include one or more grains such as grain 2500. The grains may include grains of one or more different sizes. Different grains may include different facets.

Table 13 lists illustrative materials that may be included a grain.

TABLE 13

| Illustrative materials that may be included in a grain. Illustrative material |
|---|
| Silica sand |
| Quartz sand |
| Sodium |
| Potassium carbonate |
| Minium |
| Red lead |
| Sodium carbonate |
| Potash |
| Other suitable materials |

FIG. 26 shows schematically illustrative arrangement 2600 for diffusing light. Arrangement 2600 may include LED light source 2602. LED light source 2602 may include LED 2603. LED light source 2602 may have one or more features in common with light source 106 or arrangement A2400. Arrangement 2600 may include diffusive element 2604.

LED light source 2602 may be attached to a light fixture (not shown). Diffusive element 2604 may be attached to the light fixture. LED light source 2602 may be offset from diffuser 2604 by an offset "q." Table 14 lists illustrative ranges that may include offset q.

TABLE 14

| Illustrative ranges that may include offset q. Illustrative ranges that may include offset q (mm) | |
|---|---|
| Lower | Upper |
| 0 | 1 |
| 1 | 2 |
| 2 | 3 |
| 3 | 4 |
| 4 | 5 |
| 5 | 10 |
| 10 | 20 |
| 20 | 50 |
| 50 | 100 |
| 100 | >100 |

TABLE 14-continued

| Illustrative ranges that may include offset q. Illustrative ranges that may include offset q (mm) | |
|---|---|
| Lower | Upper |
| Other suitable lower limits | Other suitable upper limits |

Diffusive element 2604 may have one or more features in common with optics 108. Diffusive element 2604 may include grains 2606. Diffusive element 2604 may include substrate 2608. Grains 2606 may have one or more features in common with grain 2500. Diffusive element 2604 may include bonding material 2610. Bonding material 2610 may fix grains 2606 to substrate 2608. LED light source 2602 may project light at diffusive element 2604. Diffusive element 2604 may include side 2612 facing LED light source 2602. Grains 2606 in aggregate may define side 2612. Diffusive element 2604 may include side 2614 facing away from LED light source 2602. Substrate 2608 may define side 2614. One or both of sides 2612 and 2614 may be planar. One or both of sides 2612 and 2614 may be curved. Substrate 2608 may have a plate or plate-like form.

Grains 2606 may be applied to substrate 2608 by applying glue or bonding agent to substrate 2608 and then disposing grains 2606 on the glue or bonding agent. The grains may be oriented in an ordered fashion. The grains may be oriented in an unordered fashion. The grains may be oriented with a crown face parallel to substrate 2608. The grains may be oriented with a pavilion face parallel to substrate 2608. The grains may be distributed in an ordered fashion. The grains may be distributed in an unordered fashion.

The grains may be applied to substrate 2608 with a grain density. Table 15 lists illustrative ranges that may include the grain density.

TABLE 15

| Illustrative ranges that may include the grain density. Illustrative ranges that may include the grain density (grain/$cm^2$) | |
|---|---|
| Lower | Upper |
| <9 | 10 |
| 10 | 11 |
| 11 | 12 |
| 12 | 13 |
| 13 | 14 |
| 14 | 15 |
| 15 | >15 |
| Other suitable lower limits | Other suitable upper limits |

A facet density may be calculated as a number of facets per grain times a number of grains per unit area.

Light from light source 2602 may be incident on side 2612. The light may be transmitted through grains 2606. Grains 2606 may diffuse the light. The diffused light may pass substrate 2608. The light may exit substrate 2608 via side 2614.

FIG. 27 shows schematically arrangement 2600 in cross-section.

FIG. A27 shows arrangement A2700. In arrangement A2700 diffusive element 2604 may be oriented so that grains 2606 face away from LED light source 2602.

FIG. 28 illustrates an effect of grains 2606 on light from LED light source 2602. $I_L$ (broken line, curves) is intensity of light, from LED light source 2602, as measured, for example before incidence on side 2612. AVE ($I_L$) (broken line, flat) is the spatial average of $I_L$. $I_G$ (solid line, curves) is intensity of light exiting grains 2606. AVE ($I_G$) (solid line, flat) is the spatial average intensity of $I_G$.

$I_{REF}$ is intensity of light exiting a reference diffuser (not shown) after a light such as $I_L$ is incident on the reference diffuser. AVE ($I_{REF}$) is the spatial average intensity of $I_{REF}$. The reference diffuser may include a diffuser such as a polymer (e.g., acrylic) or glass diffuser.

Peak $P_L$ of $I_L$ may correspond to one of the $L_{i,j}$ axes of light source 2602, cell g of arrangement light source 2602, and corresponding region g' of diffusive element 2604. Grains 2606 may give rise to peaks $P_{Gk}$. Five peaks $P_{Gk}$ are shown. Table 16 lists ranges that may include the number of peaks $P_{Gk}$.

TABLE 16

| Illustrative ranges that include the number of peaks $P_{Gk}$. Illustrative ranges that may include the number of peaks $P_{Gk}$ | |
|---|---|
| Lower | Upper |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 100 |
| 100 | 1000 |
| 1000 | >1000 |
| Other suitable lower limits | Other suitable upper limits |

The number and form of peaks $P_{Gk}$ may vary with viewing angle. The number and form of peaks $P_{Gk}$ may vary with wavelength.

Loss of light energy through grains 2606 may be represented as a ratio of AVE ($I_G$)/AVE ($I_L$). The loss may increase with the number of grain layers. Loss of light energy through substrate 2608 may be represented as a ratio of AVE ($I_S$)/AVE ($I_L$). The loss may increase with the thickness of substrate 2608. Loss of light energy through the reference diffuser may be represented as a ratio of AVE ($I_{ref}$)/AVE ($I_L$).

Table 17 lists illustrative ranges that may include the foregoing ratios.

TABLE 17

| Illustrative ranges that may include the foregoing ratios. | | | | | |
|---|---|---|---|---|---|
| AVE($I_G$)/ AVE($I_L$) | | AVE($I_S$)/ AVE($I_L$) | | AVE($I_{ref}$)/ AVE($I_L$) | |
| Upper | Lower | Upper | Lower | Upper | Lower |
| >0.99 | 0.99 | >0.99 | 0.99 | >0.9 | 0.9 |
| 0.99 | 0.98 | 0.99 | 0.98 | 0.9 | 0.8 |

TABLE 17-continued

Illustrative ranges that may include the foregoing ratios.

| AVE($I_G$)/AVE($I_L$) | | AVE($I_S$)/AVE($I_L$) | | AVE($I_{ref}$)/AVE($I_L$) | |
|---|---|---|---|---|---|
| Upper | Lower | Upper | Lower | Upper | Lower |
| 0.98 | 0.97 | 0.98 | 0.97 | 0.8 | 0.7 |
| 0.97 | 0.95 | 0.97 | 0.95 | 0.7 | 0.6 |
| 0.95 | 0.9 | 0.95 | 0.9 | 0.6 | 0.5 |
| 0.9 | 0.85 | 0.9 | 0.85 | 0.5 | 0.4 |
| 0.85 | 0.8 | 0.85 | 0.8 | 0.4 | 0.3 |
| 0.8 | 0.75 | 0.8 | 0.75 | 0.3 | <0.3 |
| 0.75 | 0.7 | 0.75 | 0.7 | | |
| 0.7 | <0.7 | 0.7 | <0.7 | | |
| Other suitable upper limits | Other suitable lower limits | Other suitable upper limits | Other suitable lower limits | Other suitable upper limits | Other suitable lower limits |

FIG. 29 shows schematically illustrative arrangement 2900 for diffusing light. Arrangement 2900 may include LED light source 2902. LED light source 2902 may have one or more features in common with one or both of light source 106 and light LED light source 2602. Arrangement 2900 may include diffusive element 2904. Diffusive element 2904 may have one or more features in common with one or both of optics 108 and diffusive element 2604. Diffusive element 2904 may include grains 2906. Diffusive element 2904 may include substrate 2908. Grains 2906 may have one or more features in common with grain 2500. Diffusive element 2904 may include bonding material 2910. Bonding material 2910 may fix grains 2906 to substrate 2908. LED light source 2902 may project light at diffusive element 2904.

Diffusive element 2904 may include side 2912 facing LED light source 2902. Grains 2906 in aggregate may define side 2912. Side 2912 may follow edge 2913 of substrate 2908. Diffusive element 2904 may include side 2914. Side 2914 may be perpendicular to edge 2913. Side 2914 may be oblique to edge 2913. Diffusive element 2904 may include a second side (not shown; behind substrate 2908). The second side may be parallel to side 2914. Substrate 2908 may define one or both of side 2914 and the second side. One or both of sides 2912 and 2914 may be planar. One or both of sides 2912 and 2914 may be curved. Substrate 2908 may have a plate or plate-like form.

Light from light source 2902 may be incident on side 2912. The light may be transmitted through grains 2906. Grains 2906 may diffuse the light. The diffused light may pass into substrate 2908. The light may exit substrate 2908 via one or both of side 2914 and the second side. Arrangement 2900 may include an opaque layer along one or both of side 2914 and the second side. The opaque layer may include a reflector. The reflector may be configured to reflect light from substrate 2908 back into substrate 2908.

The intensity variations and averages shown in FIG. 28 may apply analogously to arrangement 2900 with side 2912 in place of side 2612 and one or both of sides 2914 and the second side in place of side 2614. (When both sides are considered, each side would be expected to account for half of the overall exiting intensity.)

FIG. 30 shows schematically arrangement 2900 in cross-section.

FIG. 31 shows schematically illustrative arrangement 3100 for diffusing light. Arrangement 3100 may have one or more features in common with arrangement 2600. Arrangement 3100 may include LED light source 3102. LED light source 3102 may have one or more features in common with one or both of light source 106 and light LED light source 2602. Arrangement 3100 may include diffusive element 3104. Diffusive element 3104 may have one or more features in common with one or both of optics 108 and diffusive element 2604. Diffusive element 3104 may include grains 3106. Diffusive element 3104 may include substrate 3108. Grains 3106 may have one or more features in common with grain 2500. LED light source 3102 may project light at diffusive element 3104.

Diffusive element 3104 may include side 3112 facing LED light source 3102. Grains 3106 in aggregate may define side 3112. Grains 3106 in aggregate may define side 3114.

Substrate 3108 may include wall 3116. Wall 3116 may define region 3118. Grains 3106 may be disposed in region 3118. Grains 3106 may be disposed in region 3118 as loose fill. Grains 3106 may be bonded to each other. Arrangement 3100 may include a support (not shown) at the bottom of region 3118 to support grains 3106. The support may be fixed to substrate 3108. The support may be translucent.

Light from light source 3102 may be incident on side 3112. The light may be transmitted through grains 3106. Grains 3106 may diffuse the light. Substrate 3108 may transmit the diffused light. Substrate 3108 may be configured to not transmit the diffused light. The light may exit grains 3106 via one or both of sides 3112 and 3114. Arrangement 3100 may include an opaque layer along one or both of sides 3112 and 3114. The opaque layer may include a reflector. The reflector may be configured to reflect light from substrate 3108 into region 3118. Light source 3102 may be disposed in region 3118. Light source 3102 may be disposed beneath the opaque layer.

The intensity variations and averages shown in FIG. 28 may apply analogously to arrangement 3100.

FIG. 32 shows schematically a partial cross section of illustrative arrangement 3100.

FIG. 33 shows schematically illustrative arrangement 3300 for diffusing light. Arrangement 3300 may have one or more features in common with arrangement 2600. Arrangement 3300 may include LED light source 3302. LED light source 3302 may have one or more features in common with one or both of light source 106 and light LED light source 2602. Arrangement 3300 may include diffusive element 3304. Diffusive element 3304 may have one or more features in common with one or both of optics 108 and diffusive element 2604. Diffusive element 3304 may include grains 3306. Diffusive element 3304 may include substrate 3308. Grains 3306 may have one or more features in common with grain 2500. LED light source 3302 may project light at diffusive element 3304.

Diffusive element 3304 may include side 3312 facing LED light source 3302. Grains 3306 in aggregate may define side 3312.

Substrate 3308 may include wall 3316. Wall 3316 may define region 3318. Grains 3306 may be disposed in region 3318. Grains 3306 may be disposed in region 3318 as loose fill. Grains 3306 may be bonded to each other. Arrangement 3300 may include a support (not shown) at the bottom of region 3318 to support grains 3306. The support may be fixed to substrate 3308. The support may be translucent.

Light from light source 3302 may be transmitted through substrate 3308. The light may be incident on side 3312. The light may be transmitted through grains 3306. Grains 3306 may diffuse the light. Substrate 3308 may transmit the diffused light. Substrate 3308 may be configured to not transmit the diffused light. The light may exit grains 3306 via one or both of sides 3320 and 3322. Arrangement 3300 may include an opaque layer along one or both of sides 3312, 3320 and 3322. The opaque layer may include a reflector. The reflector may be configured to reflect light into region 3318.

The intensity variations and averages shown in FIG. 28 may apply analogously to arrangement 3300.

FIG. 34 shows schematically illustrative arrangement 3400 for diffusing light. Arrangement 3400 may include LED light source 3302. Arrangement 3400 may include diffusive element 3304. Arrangement 3400 may include opaque layer 3402. Opaque layer 3402 may include a reflector. The reflector may be configured to reflect light from grains 3306 into region 3318.

The intensity variations and averages shown in FIG. 28 may apply analogously to arrangement 3400.

FIG. 35 shows schematically illustrative arrangement 3500 for diffusing light. Arrangement 3500 may have one or more features in common with arrangement 2600. Arrangement 3500 may include LED light source 3502. LED light source 3502 may have one or more features in common with one or both of light source 106 and light LED light source 2602. Arrangement 3500 may include diffusive element 3304. Arrangement 3400 may include opaque layer 3402. Opaque layer 3402 may include a reflector. The reflector may be configured to reflect light from grains 3306 into region 3318.

Light source 3502 may emit light that is incident on side 3322. Grains 3306 may diffuse the light. The light may reflect off opaque layer 3402. The light may return through grains 3306 and exit through side 3322.

FIG. 36 shows schematically illustrative arrangement 3600 for diffusing light. Arrangement 3600 may have one or more features in common with arrangement 2600. Arrangement 3600 may include LED light source 3602. LED light source 3602 may have one or more features in common with one or both of light source 106 and light LED light source 2602. Arrangement 3600 may include diffusive element 3604. Diffusive element 3604 may have one or more features in common with one or both of optics 108 and diffusive element 2604. Diffusive element 3604 may include grains 3606. Diffusive element 3604 may include substrate 3608. Grains 3606 may have one or more features in common with grain 2500. LED light source 3602 may project light at diffusive element 3604.

Diffusive element 3604 may include side 3612 facing LED light source 3602. Grains 3606 in aggregate may define side 3612.

Substrate 3608 may include wall 3616. Substrate 3608 may include wall 3618. Walls 3616 and 3618 may define recess 3620. Grains 3606 may be disposed in recess 3620. Grains 3606 may be disposed in recess 3620 as loose fill. Grains 3606 may be bonded to each other. Substrate 3608 may include a support (not shown) at the bottom of recess 3620 to support grains 3606. The support may be fixed to substrate 3608. The support may be annular. Region 3622 may be a region that has no grains. The support may be translucent.

Light from light source 3602 may be transmitted through substrate 3608. The light may be incident on side 3612. The light may be transmitted through grains 3606. Grains 3606 may diffuse the light. Substrate 3608 may transmit the diffused light. Substrate 3608 may be configured to not transmit the diffused light. The light may exit grains 3606 via one or both of the top and bottom annular openings of recess 3620.

The intensity variations and averages shown in FIG. 28 may apply analogously to arrangement 3600.

FIG. 37 shows schematically a partial cross section of illustrative arrangement 3600.

FIG. 38 shows schematically illustrative arrangement 3800 for diffusing light. Arrangement 3800 may include LED light source 3602. Arrangement 3800 may include diffusive element 3604. Arrangement 3800 may include opaque layer 3802. Opaque layer 3802 may include a reflector. The reflector may be configured to reflect light from grains 3606 into region 3620. The reflector may be configured to reflect light from grains 3606 into region 3622.

The intensity variations and averages shown in FIG. 28 may apply analogously to arrangement 3800.

FIG. 39 show illustrative light fixture 3900. Fixture 3900 may include canopy 3902. Fixture 3900 may include supports 3904. Fixture 3900 may include substrate 3906. Fixture 3900 may include enclosure 3908. Fixture 3900 may include an LED light source in enclosure 3908. Fixture 3900 may include grains (not shown) on substrate 3906 inside enclosure 3908. The arrangement of the LED light source, the grains and the substrate may correspond to that shown in FIG. 27 when fixture 3900 is viewed along view lines 27-27.

FIG. 40 shows illustrative LED mounting layout 4000. LED layout 4000 may correspond to arrangement A2400. Layout 4000 includes double weld spots for mounting LEDs. Weld spots marked as "A" are configured for a circuit to power a first string of LEDs. Weld spots marked as "B" are configured for a circuit to power a second string of LEDs. The first string may have LEDs of a first CCT. The second string may have LEDs of a second CCT. The first CCT may be 3,000° K. The first CCT may be 4,000° K. A power supply, a dimming circuit, a CCT mixing control and other components may be provided separately. Dielectric material between the LED mounting spaces may be absent or reduced in comparison to standard layouts. Space on the layout for those components may then be used for additional LEDs to increase uniformity of intensity incident on grains. The first and second strings may include, for example, parts SEOUL 3528 SAW9A62E-E2 HMCE 2790 3 and SEOUL 3528 SAW9A62E-E2 FMCE 3590 3, respectively.

The intensity variations and averages shown in FIG. 28 may apply analogously to arrangement 3500.

FIG. 41 shows illustrative light fixture 4100. Fixture 4100 may include housing 4102. Fixture 4100 may include mounting bracket 4104. Fixture 4100 may include switch box 4106. Fixture 4100 may include switch 4108. A user may use switch 4108 to select a color correlated temperature ("CCT") at which to operate an LED light source (not shown) in fixture 4100. The LED light source may have one, two or more LEDs that emit light of a different CCT. The LED light source may provide a total current to the LEDs. Different positions of the switch may correspond to different distributions of current among the LEDs of the different colors. The switch may have 2, 3, 4, 5 or more different positions. For example, when fixture 4100 includes LEDs of two different colors, a warm CCT and a cool CCT, the positions may correspond to different percentages of current that are allocated to the warm- and cool-CCT LEDs. A first position may allocate 100% of the current to the warm-CCT LEDs (and 0% of the current to the cool-CCT LEDs). A second position may allocate 70% of the current to the warm-CCT LEDs (and 30% of the current to the warm-CCT LEDs).

Fixture 4100 may include light-transmitting body 4110.

Light-transmitting body 4110 may have one or more features in common with one or more of light-transmitting bodies 104, 114, 506, 508, 510, 512, 1910, 1502, 1708, and 2400. Light-transmitting body 4302 may have one or more features in common with one or more of diffusers and diffusive elements 1106, 1206, 1306, 1406, 2208, 2604, 2008, 2208, 2604, 2904, 3104, 3304, and 3604. Light-transmitting body 4302 may have one or more features in common with one or more of substrates 2608, 2908, 3108, 3308, 3608 and 3906.

Fixture 4100 may include decorative elements such as decorative element 4112.

Housing 4102 may include wall 4114.

Fixture 4100 may include platform 4116. One or more of decorative elements 4112 may depend from platform 4116.

Axis L indicates "back" direction L (B) and "front" direction L (F). R is a radial direction defined with respect to L. C is a circumferential direction about L.

FIG. 42 shows fixture 4100 from a perspective that is different from that shown in FIG. 41.

FIG. 43 shows that fixture 4100 may include light transmitting body 4302. Fixture 4100 may include light transmitting body 4110.

Light-transmitting body 4302 may have one or more features in common with one or more of light-transmitting bodies 104, 114, 506, 508, 510, 512, 1910, 1502, 1708, and 2400. Light-transmitting body 4302 may have one or more features in common with one or more of diffusers and diffusive elements 1106, 1206, 1306, 1406, 2208, 2604, 2008, 2208, 2604, 2904, 3104, 3304 and 3604. Light-transmitting body 4302 may have one or more features in common with one or more of substrates 2608, 2908, 3108, 3308, 3608 and 3906.

Fixture 4100 may include C-channel 4304. Fixture 4100 may include support board 4306. Fixture 4100 may include PCB board 4308.

PCB board 4308 may include LEDs 4310.

Bracket 4104 may be configured to be mounted to a structure. The structure may be an architectural structure. The structure may be a landscape structure. The structure may include a wall. The structure may include a ceiling. The structure may include a joist. The structure may include a stud. The structure may include masonry. The structure may include a post.

Fastener 4302 may fix housing 4102 to bracket 4104. Support board 4306 may be fixed to floor 4305 of housing 4102 via a support (not shown). Floor 4305 may support C-channel 4304. C-channel 4304 may be welded to floor 4305. C-channel 4304 may retain margin 4307 of light-transmitting body 4110. Margin 4307 may rest on lower ring 4312 may of C-channel 4304. C-channel 4304 may C-channel 4304 may circumscribe margin 4307. C-channel 4304 may include a split to that C-channel 4304 may be opened to receive margin 4307. C-channel may include two or more separate arcs. The arcs may be assembled around margin 4307. Margin 4307 may be retained solely by C-channel 4304. The retention of margin 4307 by C-channel 4304 may be without adhesive, welding, clamping, perforation of light-transmitting body 4110, or the like. The retention of margin 4307 by C-channel 4304 may include one or more of adhesive, welding, clamping, perforation of light-transmitting body 4110, and the like.

C-channel 4304 may include upper ring 4309. Upper ring 4309 may support margin 4311 of light-transmitting body 4302. Margin 4311 may rest on upper ring 4309.

Margin 4311 may be supported solely by upper ring 4309. The support of margin 4311 by upper ring 4309 may be without adhesive, welding, clamping, perforation of light-transmitting body 4302, or the like. The retention of margin 4311 by upper ring 4309 may include one or more of adhesive, welding, clamping, perforation of light-transmitting body 4302, and the like.

Switch box 4106 may be wired to line power provided in or at the structure. Switch 4108 may control a mixed CCT of light that is to be emitted by LEDs 4310. LEDs 4310 may be mounted on PCB board 4308.

LEDs 4310 may be part of an LED light source that may have one or more features in common with other LED light sources shown and described herein.

PCB board 4308 may be configured to receive power from switch box 4106. PCB board 4308 may be mounted to support board 4306.

Switch box 4106 may be fixed to bracket 4104. Bracket 4104 may be configured to be mounted to the architectural structure.

Distance $d_1$ between PCB board 4308 and light transmitting body 4302 may be a minimum distance between PCB board 4308 and light transmitting body 4302.

Distance $d_1$ may be about 5.2 mm. Distance $d_1$ may range from about 4 mm to about 7 mm.

Distance $d_2$ between PCB board 4308 and light transmitting body 4302 may be a maximum distance between PCB board 4308 and light transmitting body 4302.

Distance $d_2$ may be about 27.7 mm. Distance $d_2$ may range from about 25 mm to about 30 mm.

Distance $d_3$ between PCB board 4308 and light transmitting body 4110 may be a maximum distance between PCB board 4308 and light transmitting body 4110.

Distance $d_3$ may be about 101.4 mm. Distance $d_3$ between may range from about 95 mm to about 110 mm.

Light-transmitting body 4110 may include back surface 4314. Back surface 4314 may be concave. Light-transmitting body 4110 may include front surface 4316. Front surface 4316 may be convex. Light-transmitting body 4110 may include back surface 4318. Back surface 4318 may be concave. Light-transmitting body 4110 may include front surface 4320. Front surface 4320 may be convex.

One or more of surfaces 4314, 4316, 4318 and 4320 may embody a pattern. One or more grains may be bonded to one or more of surfaces 4314, 4316, 4318 and 4320.

FIG. 44 shows that light-transmitting body 4302 may define interior region $I_1$. Interior region $I_1$ may exclude structures that retain light-transmitting body 4302 in a position relative to housing 4102.

FIG. 45 shows that light-transmitting body 4110 may define interior region $I_2$ (light-transmitting body 4302 not shown). Interior region $I_1$ may exclude structures that retain light-transmitting body 4110 in a position relative to housing 4102.

FIG. 46 shows detailed view 46 (shown in FIG. 43) of fixture 4100.

FIG. 47 shows that fixture 4100 may include support 4702. Support 4702 may be fixed to floor 4305. Support 4702 may be fixed to wall 4114. Support 4702 may support support board 4306. Fastener 4704 may fasten support board 4306 to support 4702. Fastener 4706 may fasten housing 4102 to decorative element 4112. Platform 4116 may be fastened to floor 4305.

FIG. 48 show that support 4702 may include tabs such 4802. Tabs such as 4802 may be inserted into slots 4804 in floor 4305.

FIG. 49 shows a view of fixture 4100 along direction $L_B$.

FIG. 50 shows a view of fixture 4100, along direction $L_B$, with decorative elements 4112, light-transmitting body 4302, light-transmitting body 4110 and platform 4116 removed. Fixture 4100 may include LED light source module circuit elements such as 5002. Circuit elements 5002 may be mounted on PCB board 4308.

FIG. 51 shows that switch box 4106 may be mounted to support board 4306. Switch box 4106 may be mounted to bracket 4104. Switch box 4106 may be mounted to housing 4102. Switch box 4106 may be mounted to wall 4114. Switch box 4106 may be mounted to platform 4116.

FIG. 52 shows light-transmitting body 5202 from the front. Surface 5204 may be convex. Light-transmitting body 5202 may include margin 5206 Light-transmitting body 5202 may have one or more features in common with one or both of light-transmitting body 4302 and light-transmitting body 4110.

FIG. 53 shows in part (corresponding to "53" in light-transmitting body 5202, shown in FIG. 52) light-transmitting body 5302, which may have one or more features in common with light-transmitting body 5202. Grains such as grain 5304 may be bonded to light-transmitting body 5302. Grains 5304 may have one or more features in common with one or more of grain 2500, grains 2606 grains 2906 grains 3106, grains 3306, grains 3606 or any other suitable grains.

Light-transmitting body 5302 may have a textured surface. The surface may include smooth areas such as smooth area 5303. The surface may include grooves 5306. The surface may include grooves 5308. Grooves 5306 and 5308 may represent families of grooves. The families of grooves may intersect to form a diamond-shaped pattern.

FIG. 54 shows in part (corresponding to "54" in light-transmitting body 5202, shown in FIG. 52) light-transmitting body 5402, which may have one or more features in common with light-transmitting body 5202.

Light-transmitting body 5402 may have a textured surface. The surface may include smooth areas such as 5404. The surface may include protrusions such as protrusion 5406.

FIG. 55 shows in part (corresponding to "55" in light-transmitting body 5202, shown in FIG. 52) light-transmitting body 5502, which may have one or more features in common with light-transmitting body 5202.

Light-transmitting body 5502 may have a textured surface. The surface may include smooth areas such as 5504. The surface may include protrusions such as protrusion 5506.

FIG. 56 shows in part (corresponding to "56" in light-transmitting body 5202, shown in FIG. 52) light-transmitting body 5602, which may have one or more features in common with light-transmitting body 5202. Light-transmitting body 5602 may have a textured surface. The surface may include smooth areas such as 5604. The surface may include protrusions such as protrusion 5606.

FIG. 57 shows in part (corresponding to "57" in light-transmitting body 5202, shown in FIG. 52) light-transmitting body 5702, which may have one or more features in common with light-transmitting body 5202. Light-transmitting body 5702 may have a textured surface. The surface may include smooth areas such as 5704. The surface may include protrusions such as protrusion 5706.

FIG. 58 shows in part (corresponding to "58" in light-transmitting body 5202, shown in FIG. 52) light-transmitting body 5802, which may have one or more features in common with light-transmitting body 5202. Light-transmitting body 5802 may have a textured surface. The surface may include smooth areas such as 5804. The surface may include protrusions such as protrusion 5806.

FIG. 59 shows in part (corresponding to "59" in light-transmitting body 5202, shown in FIG. 52) light-transmitting body 5902, which may have one or more features in common with light-transmitting body 5202. Light-transmitting body 5902 may have a textured surface. The surface may include smooth areas such as 5904. The surface may include protrusions such as protrusion 5906.

ILLUSTRATIVE EMBODIMENTS

1. Apparatus comprising: a housing, wherein the housing includes: an LED light source; and a light transmitting body configured to diffuse light from the LED light source.
2. The apparatus of embodiment 1 wherein the light transmitting body includes a first surface and a second surface.
3. The apparatus of embodiment 2 wherein crystal dust is on the first surface.
4. The apparatus of embodiment 2 wherein crystal dust is on the second surface.
5. The apparatus of embodiment 1 wherein the light transmitting body comprises textured glass.
6. The apparatus of embodiment 5 wherein the textured glass is diamond-cut.
7. The apparatus of embodiment 1 wherein the housing includes a mounting bracket.
8. The apparatus of embodiment 1 wherein the housing includes a c-channel.
9. The apparatus of embodiment 1 wherein the light transmitting body is a first light transmitting body and the housing includes a second light transmitting body.
10. The apparatus of embodiment 1 wherein the housing includes a support board.
11. The apparatus of embodiment 10 wherein the support board supports a PCB board.
12. The apparatus of embodiment 10 wherein the light source is on the PCB board.
13. The apparatus of embodiment 1 wherein the housing includes a connector support.
14. The apparatus of embodiment 1 wherein the LED light source comprises a plurality of LEDs.
15. The apparatus of embodiment 9 wherein the second light transmitting body is transparent.
16. The apparatus of embodiment 1 wherein the first light transmitting body is transparent.
17. The apparatus of embodiment 9 wherein the second light transmitting body comprises textured glass.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9 and 10 contained within the range.

Thus, methods and apparatus for enhanced lighting have been provided. Persons skilled in the art will appreciate that the present invention may be practiced by other than the described embodiments, which are presented for purposes of illustration rather than of limitation.

What is claimed is:

1. Apparatus comprising:
a light-emitting diode ("LED") light source having a front and a back; and
a light-transmitting body that:
has:
a surface that defines a pattern; and
light-scattering grains bonded to the surface; and
is disposed in a position that is in front of the LED light source;
wherein any structure that is configured to maintain the position does not intervene between the LED light source and the light-transmitting body.

2. The apparatus of claim 1 wherein:
the light-transmitting body has a back that faces the front of the LED light source; and
the grains are bonded to the back.

3. The apparatus of claim 1 wherein:
the light-transmitting body has:
a back that faces the front of the LED light source; and
a front opposite the back; and
the grains are bonded to the front.

4. The apparatus of claim 1 wherein the light-transmitting body includes:
a concave region that faces the LED light source; and
a flat region outside the concave region.

5. The apparatus of claim 4 wherein the light-transmitting body is supported only at the flat region.

6. The apparatus of claim 1 wherein the light-transmitting body is not perforated.

7. The apparatus of claim 1 further comprising a housing that has:
a back that is configured to be fastened against an architectural structure; and
a front that is configured to be supported away from the architectural structure; wherein:
the LED light source is fastened only toward the back of the housing; and
the light-transmitting body is fastened only toward the front of the housing.

8. Apparatus comprising:
a light-emitting diode ("LED") light source;
a first light-transmitting body that:
includes:
a surface that defines a pattern;
light-scattering grains bonded to the surface; and
a first margin; and
is:
configured to diffuse light from the LED light source; and
supported only at the first margin; and
a second light-transmitting body that:
includes a second margin;
is supported only at the second margin; and
is disposed such that the first light-transmitting body intervenes between the LED light source and the second light-transmitting body.

9. The apparatus of claim 8 wherein the first light-transmitting body is not perforated.

10. The apparatus of claim 9 wherein the second light-transmitting body is not perforated.

11. The apparatus of claim 8 wherein the second light-transmitting body is not perforated.

12. The apparatus of claim 8 wherein the first light-transmitting body further includes a concave region facing the LED light source.

13. The apparatus of claim 12 wherein the first margin is flat.

14. The apparatus of claim 8 wherein the second light-transmitting body further includes a concave region facing the LED light source.

15. The apparatus of claim 14 wherein the second margin is flat.

16. The apparatus of claim 8 further comprising a support board that is configured to support the LED light source;
wherein the support board is disposed such that:
the LED light source intervenes between the support board and the first light-transmitting body; and
the support board is not compressed against the first light-transmitting body.

17. The apparatus of claim 16 wherein the support board is parallel to and spaced apart from the first margin.

18. The apparatus of claim 8 wherein the first light-transmitting body is spaced apart from the second light-transmitting body.

19. The apparatus of claim 18 wherein the first margin is parallel to and spaced apart from the second margin.

20. The apparatus of claim 18 further comprising a C-channel that defines a recess;
wherein the second margin extends into the recess.

21. The apparatus of claim 8 defining a back including a mounting plate and a front including an outer surface of the second light-transmitting body;
wherein:
the LED light source is supported from the back of the LED light source; and
the first light-transmitting body is supported at the front of the first light-transmitting body.

22. The apparatus of claim 21 wherein the second light-transmitting body is supported at the front of the second light-transmitting body.

23. The apparatus of claim 8 defining a back including a mounting plate and a front including an outer surface of the second light-transmitting body, the apparatus further comprising crystal dust that is disposed on a back of the first light-transmitting body.

24. The apparatus of claim 8 defining a back including a mounting plate and a front including an outer surface of the second light-transmitting body, the apparatus further comprising light-scattering grains that are disposed on a front of the first light-transmitting body.

25. The apparatus of claim 8 defining a back including a mounting plate and a front including an outer surface of the second light-transmitting body, the apparatus further comprising light-scattering grains that are disposed on a back of the first second-transmitting body.

26. The apparatus of claim 8 defining a back including a mounting plate and a front including an outer surface of the second light-transmitting body, the apparatus further comprising light-scattering grains that are disposed on a front of the second light-transmitting body.

27. The apparatus of claim 8 wherein the first light-transmitting body includes textured glass.

28. The apparatus of claim 27 wherein a texture of the textured glass is a diamond-cut texture.

29. The apparatus of claim 8 wherein the second light-transmitting body includes textured glass.

30. The apparatus of claim 29 wherein a texture of the textured glass is a diamond-cut texture.

* * * * *